(12) United States Patent
Chang et al.

(10) Patent No.: US 10,901,204 B2
(45) Date of Patent: *Jan. 26, 2021

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Chien-Hsun Lai, Taichung (TW); Yao-Wei Liu, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 162 days.

This patent is subject to a terminal disclaimer.

(21) Appl. No.: 16/121,270

(22) Filed: Sep. 4, 2018

(65) Prior Publication Data

US 2019/0361229 A1 Nov. 28, 2019

(30) Foreign Application Priority Data

May 22, 2018 (TW) .............................. 107117423 A

(51) Int. Cl.
*G02B 13/00* (2006.01)
*G02B 9/62* (2006.01)
*G02B 13/14* (2006.01)
*G02B 27/00* (2006.01)

(52) U.S. Cl.
CPC ........... *G02B 27/0081* (2013.01); *G02B 9/62* (2013.01); *G02B 13/0045* (2013.01); *G02B 13/14* (2013.01)

(58) Field of Classification Search
CPC ...... G02B 27/0081; G02B 13/14; G02B 9/62; G02B 13/0015; G02B 13/002; G02B 13/0045
USPC ................. 359/356, 357, 713, 755, 756–762
See application file for complete search history.

(56) References Cited

U.S. PATENT DOCUMENTS

2016/0341933 A1* 11/2016 Liu .......................... G02B 9/62

* cited by examiner

*Primary Examiner* — Marin Pichler
(74) *Attorney, Agent, or Firm* — Muncy, Geissler, Olds & Lowe, P.C.

(57) ABSTRACT

An optical image capturing system is provided. In order from an object side to an image side, the optical image capturing system includes a first lens, a second lens, a third lens, a fourth lens, a fifth lens, and a sixth lens. At least one lens among the first lens to the fifth lens has positive refractive power. The sixth lens may have negative refractive power and an object side and an image side thereof are aspherical wherein at least one surface of the sixth lens has an inflection point. The optical image capturing system has six lenses with refractive power. When meeting some certain conditions, the optical image capturing system may have outstanding light-gathering ability and an adjustment ability about the optical path in order to elevate the image quality.

22 Claims, 30 Drawing Sheets

OPTICAL IMAGE CAPTURING SYSTEM

CROSS-REFERENCE TO RELATED APPLICATION

This application claims priority from Taiwan Patent Application No. 107117423, filed on May 22, 2018, in the Taiwan Intellectual Property Office, the content of which is hereby incorporated by reference in its entirety for all purposes.

BACKGROUND OF THE INVENTION

1. Field of the Invention

The present disclosure relates to an optical image capturing system, and more particularly is about a compact optical image capturing system which can be applied to electronic products.

2. Description of the Related Art

In recent years, with the rise of portable electronic devices having camera functionalities, the demand for an optical image capturing system has gradually been raised. The image sensing device of the ordinary photographing camera is commonly selected from a charge coupled device (CCD) or a complementary metal-oxide semiconductor sensor (CMOS Sensor). Also, as advanced semiconductor manufacturing technology enables the minimization of the pixel size of the image sensing device, the development of the optical image capturing system has gravitated towards the field of high pixels. Therefore, the requirement for high imaging quality has been rapidly increasing.

The traditional optical image capturing system of a portable electronic device comes with different designs, including a four-lens or a fifth-lens design. However, since the pixel density has continuously increased, more end-users are demanding a large aperture for such functionalities as micro filming and night view. The optical image capturing system of prior art cannot meet these high requirements and require a higher order camera lens module.

Therefore, how to effectively increase quantity of incoming light of the optical lenses, and further improve image quality for the image formation, has become an important issue.

SUMMARY OF THE INVENTION

The aspect of embodiment of the present invention directs to an optical image capturing system which is able to use combination of refractive power, convex and concave surfaces of six optical lenses (the convex or concave surface in the disclosure is the change of geometric shape of an object side or an image side of each lens at different heights from an optical axis in principle) to increase the amount of light admitted into the optical image capturing system and to improve imaging quality, so that the optical image capturing system can be applied to the minimized electronic products.

Furthermore, in certain applications of optical imaging, there will be a need to conduct the image formation for the light of the visible wavelength and the infrared wavelength, for example, an IP video surveillance camera. The IP video surveillance camera is equipped with the Day & Night function. The main reason is that the visible light spectrum for human vision is in the wavelength range from 400 to 700 nm, but the image formed on the camera sensor includes infrared light, which is invisible to the human eye. Therefore, based on the circumstances, an IR cut filter removable (ICR) is placed in front of the camera lens of the IP video surveillance camera in order to increase the "fidelity" of the image, which can not only prevent infrared light and color shift in the daytime, but also allow the infrared light incident on the camera lens at night to elevate luminance. Nevertheless, the elements of the ICR occupy a significant amount of space and are expensive, which impedes the design and manufacture of miniaturized surveillance cameras in the future.

One aspect of embodiment of the present invention directs to an optical image capturing system, which is able to utilize the combination of refractive power, convex surfaces and concave surfaces of six lenses, as well as the selection of materials thereof, to reduce the difference between the image focal length of visible light and image focal length of infrared light, that is, to achieve a near "confocal" effect without the ICR.

The terms and the definition for the lens parameters in the embodiment of the present invention are shown as below for further reference.

The Lens Parameters Related to the Magnification of the Optical Image Capturing System The optical image capturing system may be designed for the application of the biometric characteristics identification, for example, facial recognition. When the embodiment of the present invention is configured to capture an image for facial recognition, infrared light may be selected as the operational wavelength. At the same time, for a face of about 15 centimeters (cm) wide at a distance of 25-30 cm, at least 30 horizontal pixels can be formed in the horizontal direction of an photosensitive element (pixel size of 1.4 micrometers ($\mu$m)). The linear magnification of the image plane for infrared light is LM, which meets the following conditions: LM=(30 horizontal pixels)*(1.4 $\mu$m pixel size)/(15 cm, width of the photographed object); LM≥0.0003. When the visible light is adopted as the operation wavelength, for a face of about 15 cm wide at a distance of 25-30 cm, at least 50 horizontal pixels can be formed in the horizontal direction of a photosensitive element (pixel size of 1.4 micrometers ($\mu$m)).

The Lens Parameters Related to a Length or a Height

For visible light spectrum, the present invention may select the wavelength of 555 nm as the primary reference wavelength and the basis for the measurement of focus shift. For infrared spectrum (700 nm-1300 nm), the present invention may select the wavelength of 850 nm as the primary reference wavelength and the basis for the measurement of focus shift.

The optical image capturing system may have a first image plane and a second image plane. The first image plane which is perpendicular to the optical axis is an image plane specifically for the visible light, and the through focus modulation transfer rate (value of MTF) at the first spatial frequency has a maximum value at the central field of view of the first image plane; and the second image plane which is perpendicular to the optical axis is an image plane specifically for the infrared light, and the through focus modulation transfer rate (value of MTF) at the first spatial frequency has a maximum value at the central field of view of the second image plane. The optical image capturing system may further have a first average image plane and a second average image plane. The first average image plane which is perpendicular to the optical axis is an image plane specifically for the visible light. And the first average image plane may be disposed at the average position of the defocusing positions, where the values of MTF of the visible light at central field of view, 0.3 field of view, and 0.7 field of view are at their respective maximum at the first spatial frequency. The second average image plane which is perpendicular to the optical axis is an image plane specifically for the infrared light. The second average image plane is disposed at the average position of the defocusing positions, where the values of MTF of the infrared light at central field of view, 0.3 field of view, and 0.7 field of view are at their respective maximum at the first spatial frequency.

The aforementioned the first spatial frequency is set to be a half spatial frequency (half frequency) of a photosensitive element (sensor) used in the present invention. For example, the photosensitive element having the pixel size of 1.12 μm or less, of which the quarter spatial frequency, half spatial frequency (half frequency) and full spatial frequency (full frequency) in the characteristic diagram of modulation transfer function are respectively at least 110 cycles/mm, 220 cycles/mm and 440 cycles/mm. Rays from any field of view can be further divided into sagittal rays and tangential rays.

The focus shifts, where the through focus MTF values of the visible sagittal ray at the central field of view, 0.3 field of view, and 0.7 field of view of the optical image capturing system, are at their respective maxima, are respectively expressed as VSFS0, VSFS3, and VSFS7 (unit of measurement: mm). The maximum values of the through focus MTF of the visible tangential ray at the central field of view, 0.3 field of view, and 0.7 field of view of the optical image capturing system may be respectively expressed as VTMTF0, VTMTF3, and VTMTF7 (unit of measurement: mm). The average focus shift (position) of both the aforementioned focus shifts of the visible sagittal ray at three fields of view and focus shifts of the visible tangential ray at three fields of view may be expressed as AVFS (unit of measurement: mm), which meets the absolute value |(VSFS0+VSFS3+VSFS7+VTFS0+VTFS3+VTFS7)/6|.

The focus shifts, where the through focus MTF values of the infrared sagittal ray at the central field of view, 0.3 field of view, and 0.7 field of view of the optical image capturing system are at their respective maxima, may be respectively expressed as ISFS0, ISFS3, and ISFS7 (unit of measurement: mm). The average focus shift (position) of the aforementioned focus shifts of the infrared sagittal ray at three fields of view may be expressed as AISFS (unit of measurement: mm). The maximum values of the through focus MTF of the infrared sagittal ray at the central field of view, 0.3 field of view, and 0.7 field of view of the optical image capturing system may be respectively expressed as ISMTF0, ISMTF3, and ISMTF7. The focus shifts, where the through focus MTF values of the infrared tangential ray at the central field of view, 0.3 field of view, and 0.7 field of view of the optical image capturing system are at their respective maxima, may be respectively expressed as ITFS0, ITFS3, and ITFS7 (unit of measurement: mm). The average focus shift (position) of the aforementioned focus shifts of the infrared tangential ray at three fields of view may be expressed as AITFS (unit of measurement: mm). The maximum values of the through focus MTF of the infrared tangential ray at the central field of view, 0.3 field of view, and 0.7 field of view of the optical image capturing system may be respectively expressed as ITMTF0, ITMTF3, and ITMTF7. The average focus shift (position) of both of the aforementioned focus shifts of the infrared sagittal ray at three fields of view and focus shifts of the infrared tangential ray at the three fields of view may be expressed as AIFS (unit of measurement: mm), which meets the absolute value of |(ISFS0+ISFS3+ISFS7+ITFS0+ITFS3+ITFS7)/6|.

The focus shift between the focal points of the visible light and the focal points of the infrared light at their central fields of view (RGB/IR) of the entire optical image capturing system (i.e. wavelength of 850 nm versus wavelength of 555 nm, unit of measurement: mm) may be expressed as FS, which meets the absolute value |(VSFS0+VTFS0)/2−(ISFS0+ITFS0)/2|. The difference (focus shift) between the average focus shift of the visible light at the three fields of view and the average focus shift of the infrared light at the three fields of view (RGB/IR) of the entire optical image capturing system may be expressed as AFS (i.e. wavelength of 850 nm versus wavelength of 555 nm, unit of measurement: mm), which meets the absolute value of |AIFS−AVFS|.

The maximum image height of the optical image capturing system may be expressed as HOI. The height of the optical image capturing system may be expressed as HOS. The distance from the object side of the first lens to the image side of the sixth lens of the optical image capturing system may be expressed as InTL. The distance from a fixed aperture (stop) of the optical image capturing system to the first image plane of the optical image capturing system may be expressed as InS. The distance from the first lens to the second lens of the optical image capturing system may be expressed as In12 (example). The thickness of the first lens of the optical image capturing system on the optical axis may be expressed as TP1 (example).

The Lens Parameters Related to the Material

A coefficient of dispersion of the first lens in the optical image capturing system may be expressed as NA1 (example); a refractive index of the first lens may be expressed as Nd1 (example).

The Lens Parameters Related to the Angle of View

An angle of view may be expressed as AF. A half angle of view may be expressed as HAF. An angle of a chief ray may be expressed as MRA.

The Lens Parameters Related to Exit/Entrance Pupil

An entrance pupil diameter of the optical image capturing system may be expressed as HEP. The maximum effective half diameter (EHD) of any surface of a single lens refers to a perpendicular height between the optical axis and an intersection point, where the incident ray at the maximum angle of view passing through the most marginal entrance pupil intersects with the surface of the lens. For example, the maximum effective half diameter of the object side of the first lens may be expressed as EHD11. The maximum effective half diameter of the image side of the first lens may be expressed as EHD12. The maximum effective half diameter of the object side of the second lens may be expressed as EHD21. The maximum effective half diameter of the image side of the second lens may be expressed as EHD22. The maximum effective half diameters of any surfaces of other lens in the optical image capturing system are expressed in the similar way.

The Lens Parameters Related to the Surface Depth of the Lens

The distance parallel to the optical axis, which is measured from the intersection point where the object side of the sixth lens crosses the optical axis to the terminal point of the maximum effective half diameter on the object side of the sixth lens, may be expressed as InRS61 (depth of the EHD). The distance parallel to the optical axis, which is measured from the intersection point where the image side of the sixth lens crosses the optical axis to the terminal point of the maximum effective half diameter on the image side of the sixth lens, may be expressed as InRS62 (depth of the EHD).

The depths of the EHD (sinkage values) on the object side or the image side of other lens are expressed in similar way.

The Lens Parameters Related to the Shape of the Lens

The critical point C is a point which is tangential to the tangential plane and perpendicular to the optical axis on the specific surface of the lens except that an intersection point which crosses the optical axis on the specific surface of the lens. In addition to the description above, the perpendicular distance between the critical point C51 on the object side of the fifth lens and the optical axis may be expressed as HVT51 (example). The perpendicular distance between a critical point C52 on the image side of the fifth lens and the optical axis may be expressed as HVT52 (example). The perpendicular distance between the critical point C61 on the object side of the sixth lens and the optical axis may be expressed as HVT61 (example). The perpendicular distance between a critical point C62 on the image side of the sixth lens and the optical axis may be expressed as HVT62 (example). The perpendicular distances between the critical point on the image side or the object side of other lens and the optical axis are expressed in similar way.

The inflection point on the object side of the sixth lens that is the first nearest to the optical axis may be expressed as IF611, and the sinkage value of that inflection point IF611 may be expressed as SGI611 (example). That is, the sinkage value SGI611 is a horizontal distance parallel to the optical axis, which is measured from the intersection point where the object side of the sixth lens crosses the optical axis to the inflection point the first nearest to the optical axis on the object side of the sixth lens. The perpendicular distance between the inflection point IF611 and the optical axis may be expressed as HIF611 (example). The inflection point on the image side of the sixth lens that is the first nearest to the optical axis may be expressed as IF621, and the sinkage value of that inflection point IF621 may be expressed as SGI621 (example). That is, the sinkage value SGI621 is a horizontal distance parallel to the optical axis, which is measured from the intersection point where the image side of the sixth lens crosses the optical axis to the inflection point on the image side of the sixth lens that is the first nearest to the optical axis. The perpendicular distance between the inflection point IF621 and the optical axis may be expressed HIF621 (example).

The inflection point on the object side of the sixth lens that is the second nearest to the optical axis may be expressed as IF612, and the sinkage value of that inflection point IF612 may be expressed as SGI612 (example). That is, the sinkage value SGI612 is a horizontal distance parallel to the optical axis, which is measured from the intersection point where the object side of the sixth lens crosses the optical axis to the inflection point the second nearest to the optical axis on the object side of the sixth lens. The perpendicular distance between the inflection point IF612 and the optical axis may be expressed as HIF612 (example). The inflection point on the image side of the sixth lens that is the second nearest to the optical axis may be expressed as IF622, and the sinkage value of that inflection point IF622 may be expressed as SGI622 (example). That is, the sinkage value SGI622 is a horizontal distance parallel to the optical axis, which is measured from the intersection point where the image side of the sixth lens crosses the optical axis to the inflection point second nearest to the optical axis on the image side of the sixth lens. The perpendicular distance between the inflection point IF622 and the optical axis may be expressed as HIF622 (example).

The inflection point on the object side of the sixth lens that is the third nearest to the optical axis may be expressed as IF613, and the sinkage value of that inflection point IF613 may be expressed as SGI613 (example). The sinkage value SGI613 is a horizontal distance parallel to the optical axis, which is measured from the intersection point where the object side of the sixth lens crosses the optical axis to the inflection point the third nearest to the optical axis on the object side of the sixth lens. The perpendicular distance between the inflection point IF613 and the optical axis may be expressed as HIF613 (example). The inflection point on the image side of the sixth lens that is the third nearest to the optical axis may be expressed as IF623, and the sinkage value of that inflection point IF623 may be expressed as SGI623 (example). That is, the sinkage value SGI623 is a horizontal distance parallel to the optical axis, which is measured from the intersection point where the image side of the sixth lens crosses the optical axis to the inflection point the third nearest to the optical axis on the image side of the sixth lens. The perpendicular distance between the inflection point IF623 and the optical axis may be expressed as HIF623 (example).

The inflection point on the object side of the sixth lens that is the fourth nearest to the optical axis may be expressed as IF614, and the sinkage value of the inflection point IF614 may be expressed as SGI614 (example). That is, the sinkage value SGI614 is a horizontal distance parallel to the optical axis, which is measured from the intersection point where the object side of the sixth lens crosses the optical axis to the inflection point the fourth nearest to the optical axis on the object side of the sixth lens. The perpendicular distance between the inflection point IF614 and the optical axis may be expressed as HIF614 (example). The inflection point on the image side of the sixth lens that is the fourth nearest to the optical axis may be expressed as IF624, and the sinkage value of that inflection point IF624 may be expressed as SGI624 (example). That is, the sinkage value SGI624 is a horizontal distance parallel to the optical axis, which is measured from the intersection point where the image side of the sixth lens crosses the optical axis to the inflection point the fourth nearest to the optical axis on the image side of the sixth lens. The perpendicular distance between the inflection point IF624 and the optical axis may be expressed as HIF624 (example).

The inflection points on the object side or the image side of the other lens and the perpendicular distances between them and the optical axis, or the sinkage values thereof are expressed in the similar way described above. The inflection point, the distance perpendicular to the optical axis between the inflection point and the optical axis, and the sinkage value thereof on the object-side surface or image-side surface of other lenses are denoted in the same manner.

The Lens Parameters Related to the Aberration

Optical distortion for image formation in the optical image capturing system may be expressed as ODT. TV distortion for image formation in the optical image capturing system may be expressed as TDT. Furthermore, the degree of aberration offset within a range of 50% to 100% of the field of view of the image can be further illustrated. The offset of the spherical aberration may be expressed as DFS. The offset of the coma aberration may be expressed as DFC.

The characteristic diagram of modulation transfer function of the optical image capturing system is used for testing and evaluating the contrast ratio and the sharpness ratio of the image. The vertical coordinate axis of the characteristic diagram of modulation transfer function indicates a contrast transfer rate (with values from 0 to 1). The horizontal coordinate axis indicates a spatial frequency (cycles/mm; lp/mm; line pairs per mm). Theoretically, an ideal image capturing system can clearly and distinctly show the line contrast of a photographed object. However, the values of the contrast transfer rate at the vertical coordinate axis are smaller than 1 in the actual optical image capturing system. In addition, it is generally more difficult to achieve a fine degree of recovery in the edge region of the image than in the central region of the image. The contrast transfer rates (MTF values) with spatial frequencies of 55 cycles/mm at the optical axis, 0.3 field of view and 0.7 field of view of visible light spectrum on the first image plane may be expressed as MTFE0, MTFE3 and MTFE7, respectively. The contrast transfer rates (MTF values) with spatial frequencies of 110 cycles/mm at the optical axis, 0.3 field of view and 0.7 field of view of visible light spectrum on the first image plane may be respectively expressed as MTFQ0, MTFQ3 and MTFQ7. The contrast transfer rates (MTF values) with spatial frequencies of 220 cycles/mm at the optical axis, 0.3 field of view and 0.7 field of view of visible light spectrum on the first image plane may be respectively expressed as MTFH0, MTFH3 and MTFH7. The contrast transfer rates (MTF values) with spatial frequencies of 440 cycles/mm at the optical axis, 0.3 field of view, and 0.7 field of view of visible light spectrum on the first image plane may be respectively expressed as MTF0, MTF3 and MTF7. The three fields of view described above are representative to the center, the internal field of view and the external field of view of the lens. Therefore, the three fields of view described above may be used to evaluate whether the performance of the specific optical image capturing system is excellent. If the design of the optical image capturing system corresponds to a sensing device which pixel size is below and equal to 1.12 micrometers, the quarter spatial frequencies, the half spatial frequencies (half frequencies) and the full spatial frequencies (full frequencies) of the characteristic diagram of modulation transfer function are respectively at least 110 cycles/mm, 220 cycles/mm and 440 cycles/mm.

If an optical image capturing system needs to satisfy conditions with images of the infrared spectrum and the visible spectrum simultaneously, such as the requirements for night vision in low light, the used wavelength may be 850 nm or 800 nm. Because the main function is to recognize the shape of an object formed in a black-and-white environment, high resolution is unnecessary and thus the spatial frequency which is less than 110 cycles/mm may be selected to evaluate the performance of the specific optical image capturing system on the infrared light spectrum. When the foregoing wavelength 850 nm focuses on the first image plane, the contrast transfer rates (MTF values) with a spatial frequency of 55 cycles/mm where the images are at the optical axis, 0.3 field of view and 0.7 field of view may be respectively expressed as MTFI0, MTFI3 and MTFI7. However, because the difference between the infrared wavelength of 850 nm or 800 nm and the general visible light wavelength is large, the optical image capturing system which not only has to focus on the visible light and the infrared light (dual-mode) but also has to achieve a certain function in the visible light and the infrared light respectively has a significant difficulty in design.

The invention provides an optical image capturing system, which is capable of focusing visible light and infrared light (dual-mode) simultaneously and achieving certain functions individually. An object side or an image side of the sixth lens may have inflection points, such that the incident angle from each field of view to the sixth lens can be adjusted effectively and the optical distortion and the TV distortion are amended as well. Furthermore, the surfaces of the sixth lens may be endowed with better capability to adjust the optical path in order to elevate the image quality.

The invention provides an optical image capturing system, in the order from an object side to an image side including a first lens, a second lens, a third lens and a fourth lens, a fifth lens, a sixth lens, a first image plane, and a second image plane. The first image plane is an image plane specifically for visible light and perpendicular to the optical axis, and a through focus modulation transfer rate (MTF) of central field of view of the first image plane has a maximum value at a first spatial frequency. The second image plane is an image plane specifically for infrared light and perpendicular to the optical axis, and a through focus modulation transfer rate (MTF) of central field of view of the second image plane has a maximum value at the first spatial frequency. The first lens to sixth lens all have refractive power. Focal lengths of the six lenses may be respectively expressed as f1, f2, f3, f4, f5 and f6. A focal length of the optical image capturing system may be expressed as f. An entrance pupil diameter of the optical image capturing system may be expressed as HEP. There is a distance HOS on the optical axis from the object side of the first lens to the first image plane. A half maximum angle of view of the optical image capturing system may be expressed as HAF. The optical image capturing system has a maximum image height HOI on the first image plane that is perpendicular to the optical axis. A distance on the optical axis between the first image plane and the second image plane is FS. Thicknesses of the first lens through the sixth lens at a height of ½ HEP and in parallel to the optical axis may be respectively expressed as ETP1, ETP2, ETP3, ETP4, ETP5 and ETP6. A sum of ETP1 to ETP6 may be expressed as SETP. Thicknesses of the first lens through the sixth lens on the optical axis may be respectively expressed as TP1, TP2, TP3, TP4, TP5 and TP6. A sum of TP1 to TP6 may be expressed as STP. The optical image capturing system meets the following conditions: $1.0 \leq f/HEP \leq 10.0$; $0 \deg < HAF \leq 40 \deg$; $0.2 \leq SETP/STP < 1$; $|FS| \leq 15$ μm.

Another optical image capturing system is further provided in accordance with the present invention. In the order from an object side to an image side, the optical image capturing system includes a first lens, a second lens, a third lens, a fourth lens, a fifth lens, a sixth lens, a first image plane and a second image plane. The first image plane is an image plane specifically for visible light and perpendicular to the optical axis, and a through focus modulation transfer rate (MTF) of central field of view of the first image plane has a maximum value at a first spatial frequency. The second image plane is an image plane specifically for infrared light and perpendicular to the optical axis, and a through focus modulation transfer rate (MTF) of central field of view of the second image plane has a maximum value at the first spatial frequency. The first lens has refractive power and the object side of the first lens near the optical axis is a convex surface. The second lens has refractive power. The third lens has refractive power. The fourth lens has refractive power. The fifth lens has refractive power. The sixth lens has refractive power. The optical image capturing system has a maximum image height HOI on the first image plane. At least one lens among the first lens to the sixth lens has positive refractive power. Focal lengths of the six lenses may be respectively expressed as f1, f2, f3, f4, f5 and f6. A focal length of the optical image capturing system may be expressed as f. An entrance pupil diameter of the optical image capturing system may be expressed as HEP. There is a distance HOS on the optical axis from the object side of the first lens to the first image plane. A half maximum angle of view of the optical image capturing system may be expressed as HAF. A distance on the optical axis between the first image plane and the second image plane may be expressed as FS. The distance in parallel to the optical axis between a coordinate point at a height of ½ HEP on the object side of the first lens and the first image plane may be expressed as ETL. The distance in parallel to the optical axis between a coordinate point at a height of ½ HEP on the image side of the sixth lens and the coordinate point at a height of ½ HEP on the object side of the first lens may be expressed as EIN. The optical image capturing system meets the following conditions: $1 \leq f/HEP \leq 10$; $0 \deg < HAF \leq 40 \deg$; $0.2 \leq EIN/ETL < 1$ and $|FS| \leq 15 \mu m$.

Yet another optical image capturing system is further provided in accordance with the present invention. In the order from an object side to an image side, the optical image capturing system includes a first lens, a second lens, a third lens, a fourth lens, a fifth lens, a sixth lens, a first average image plane and a second average image plane. The first average image plane is an image plane specifically for visible light and perpendicular to the optical axis. The first average image plane is disposed at the average position of the defocusing positions, where through focus modulation transfer rates (values of MTF) of the visible light at central field of view, 0.3 field of view, and 0.7 field of view of the optical image capturing system are at their respective maximum at a first spatial frequency (110 cycles/mm). The second average image plane is an image plane specifically for infrared light and perpendicular to the optical axis. The second average image plane is disposed at the average position of the defocusing positions, where through focus modulation transfer rates (values of MTF) of the infrared light at central field of view, 0.3 field of view, and 0.7 field of view of the optical image capturing system are at their respective maximum at the first spatial frequency (110 cycles/mm). The optical image capturing system has six lenses with refractive power. The optical image capturing system has a maximum image height HOI on the first image plane. The first lens has refractive power. The second lens has refractive power. The third lens has refractive power. The fourth lens has refractive power. The fifth lens has refractive power. The sixth lens has refractive power. Focal lengths of the six lenses may be respectively expressed as f1, f2, f3, f4, f5 and f6. A focal length of the optical image capturing system may be expressed as f. An entrance pupil diameter of the optical image capturing system may be expressed as HEP. There is a distance HOS on the optical axis from the object side of the first lens to the first average image plane. A half maximum angle of view of the optical image capturing system may be expressed as HAF. Thicknesses of the first lens through the sixth lens at a height of ½ HEP and parallel to the optical axis may be respectively expressed as ETP1, ETP2, ETP3, ETP4, ETP5 and ETP6. A sum of ETP1 to ETP6 may be expressed as SETP. Thicknesses of the first lens through the sixth lens on the optical axis may be respectively expressed as TP1, TP2, TP3, TP4, TP5 and TP6. A sum of TP1 to TP6 may be expressed as STP. The optical image capturing system meets the following conditions: $1.0 \leq f/HEP \leq 10.0$; $0 \deg < HAF \leq 150 \deg$; $0.2 \leq SETP/STP < 1$ and $|AFS| \leq 15 \mu m$.

The thickness of a single lens at a height of ½ entrance pupil diameter (HEP) particularly affects the corrected aberration of common area of each field of view of light and the capability of correcting the optical path difference between each field of view of light in the scope of ½ entrance pupil diameter (HEP). The capability of aberration correction is enhanced if the thickness of the lens becomes greater, but the difficulty for manufacturing is also increased at the same time. Therefore, the thickness of a single lens at the height of ½ entrance pupil diameter (HEP) needs to be controlled, and the ratio relationship (ETP/TP) between the thickness (ETP) of the lens at a height of ½ entrance pupil diameter (HEP) and the thickness (TP) of the lens on the optical axis needs to be controlled in particular. For example, the thickness of the first lens at a height of ½ entrance pupil diameter (HEP) may be expressed as ETP. The thickness of the second lens at a height of ½ entrance pupil diameter (HEP) may be expressed as ETP2. The thicknesses of other lenses at a height of ½ entrance pupil diameter (HEP) in the optical image capturing system are expressed in a similar way. The sum of ETP1 to ETP6 described above may be expressed as SETP. The embodiments of the present invention may satisfy the following relationship: $0.3 \leq SETP/EIN < 1$.

In order to achieve a balance between enhancing the capability of aberration correction and reducing the difficulty for manufacturing, the ratio relationship (ETP/TP) between the thickness (ETP) of the lens at the height of ½ entrance pupil diameter (HEP) and the thickness (TP) of the lens on the optical axis needs to be controlled in particular. For example, the thickness of the first lens at the height of ½ entrance pupil diameter (HEP) may be expressed as ETP1. The thickness of the first lens on the optical axis may be expressed as TP1. The ratio between ETP1 and TP1 may be expressed as ETP1/TP1. The thickness of the second lens at the height of ½ entrance pupil diameter (HEP) may be expressed as ETP2. The thickness of the second lens on the optical axis may be expressed as TP2. The ratio between ETP2 and TP2 may be expressed as ETP2/TP2. The ratio relationships between the thicknesses of other lenses at height of ½ entrance pupil diameter (HEP) and the thicknesses (TP) of the lens on the optical axis lens in the optical image capturing system are expressed in a similar way. The embodiments of the present invention may satisfy the following relationship: $0.2 \leq ETP/TP \leq 3$.

The horizontal distance between two adjacent lenses at height of ½ entrance pupil diameter (HEP) may be expressed as ED. The horizontal distance (ED) described above is parallel to the optical axis of the optical image capturing system and particularly affects the corrected aberration of common area of each field of view of light and the capability of correcting the optical path difference between each field of view of light at the position of ½ entrance pupil diameter (HEP). The capability of aberration correction may be enhanced if the horizontal distance becomes greater, but the difficulty for manufacturing is also increased and the degree of 'miniaturization' to the length of the optical image capturing system is restricted. Therefore, the horizontal distance (ED) between two specific adjacent lens at the height of ½ entrance pupil diameter (HEP) must be controlled.

In order to achieve a balance between enhancing the capability of correcting aberration and reducing the difficulty for 'minimization' to the length of the optical image capturing system, the ratio relationship (ED/IN) of the horizontal distance (ED) between the two adjacent lenses at height of ½ entrance pupil diameter (HEP) to the horizontal distance (IN) between the two adjacent lenses on the optical axis particularly needs to be controlled. For example, the horizontal distance between the first lens and the second lens at height of ½ entrance pupil diameter (HEP) may be expressed as ED12. The horizontal distance on the optical axis between the first lens and the second lens may be expressed as IN12. The ratio between ED12 and IN12 may be expressed as ED12/IN12. The horizontal distance between the second lens and the third lens at height of ½ entrance pupil diameter (HEP) may be expressed as ED23. The horizontal distance on the optical axis between the second lens and the third lens may be expressed as IN23. The ratio between ED23 and IN23 may be expressed as ED23/IN23. The ratio relationships of the horizontal distances between other two adjacent lenses in the optical image capturing system at height of ½ entrance pupil diameter (HEP) to the horizontal distances on the optical axis between the two adjacent lenses are expressed in a similar way.

The horizontal distance parallel to the optical axis from a coordinate point on the image side of the sixth lens at height ½ HEP to the first image plane may be expressed as EBL. The horizontal distance parallel to the optical axis from an intersection point where the image side of the sixth lens crosses the optical axis to the first image plane may be expressed as BL. The embodiments of the present invention are able to achieve a balance between enhancing the capability of aberration correction and reserving space to accommodate other opticals and the following condition is satisfied: $0.2 \leq EBL/BL \leq 1.1$. The optical image capturing system may further include a light filtering element. The light filtering is located between the sixth lens and the first image plane. The distance parallel to the optical axis from a coordinate point on the image side of the sixth lens at height of ½ HEP to the light filtering may be expressed as EIR. The distance parallel to the optical axis from an intersection point where the image side of the sixth lens crosses the optical axis to the light filtering may be expressed as PIR. The embodiments of the present invention may satisfy the following condition: $0.1 \leq EIR/PIR \leq 1.1$.

The height of optical image capturing system (HOS) may be reduced to achieve the minimization of the optical image capturing system when the absolute value of f1 is larger than the absolute value of f6 ($|f1|>|f6|$).

When the relationship $|f2|+|f3|+|f4|+|f5|$ and $|f1|+|f6|$ are satisfied, at least one of the second lens through fifth lens may have weak positive refractive power or weak negative refractive power. The weak refractive power indicates that an absolute value of the focal length of a specific lens is greater than 10. When at least one of the second lens through the fifth lens has weak positive refractive power, the positive refractive power of the first lens can be shared effectively, such that the unnecessary aberration will not appear too early. On the contrary, when at least one of the second lens and fifth lens has weak negative refractive power, the aberration of the optical image capturing system can be corrected and fine-tuned.

In addition, the sixth lens may have negative refractive power, and the image side surface of the sixth lens may be a concave surface. Hereby, this configuration is beneficial to shorten the back focal length of the optical image capturing system in order to keep the miniaturization of the optical image capturing system. Moreover, at least one surface of the sixth lens may possess at least one inflection point which is capable of effectively reducing the incident angle of the off-axis rays and may further correct the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

DESCRIPTION OF THE PREFERRED EMBODIMENTS

Figure 1A:
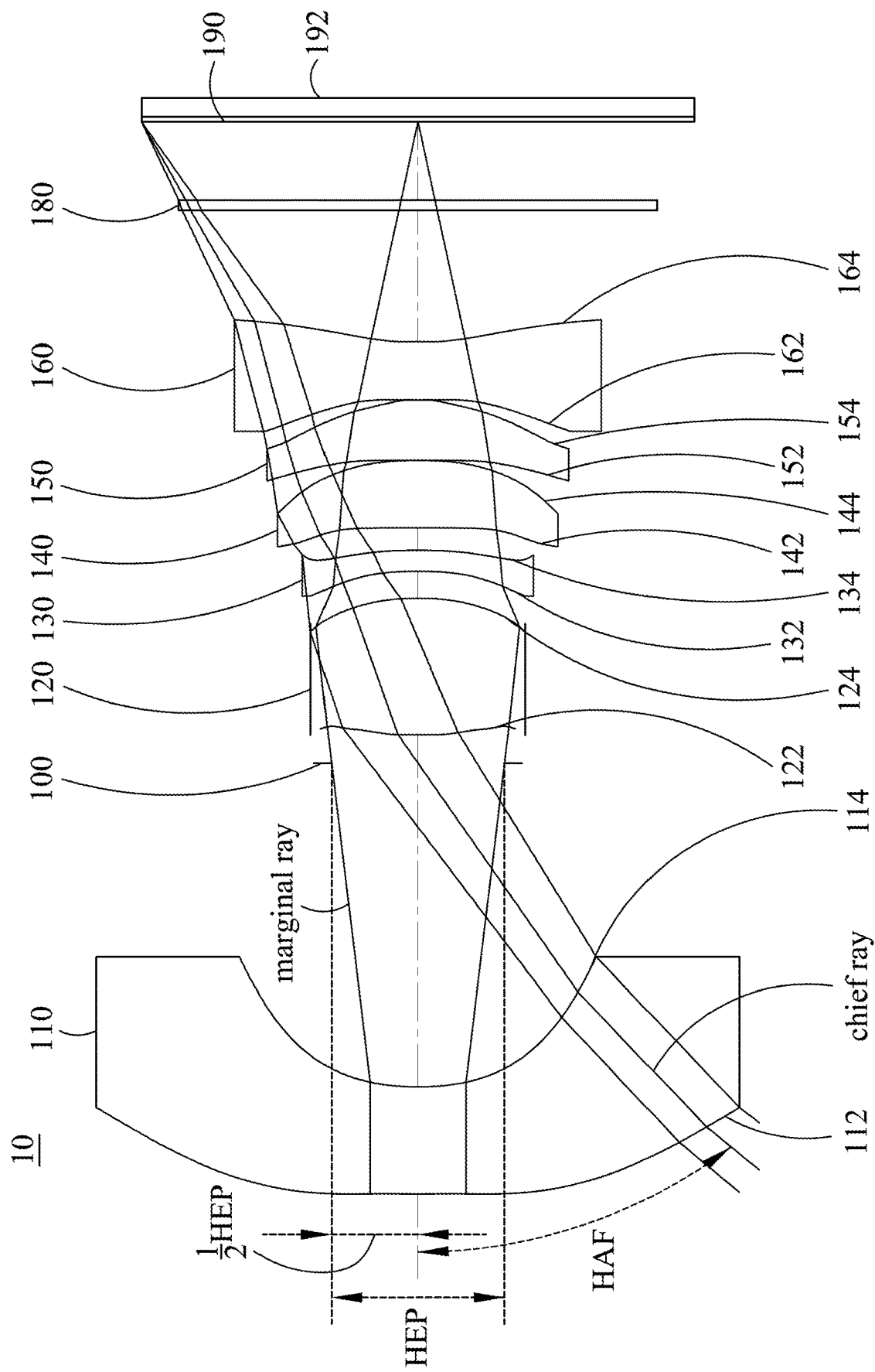
FIG. 1A is a schematic view of the optical image capturing system according to the first embodiment of the present invention.

An optical image capturing system is provided, which includes, in the order from the object side to the image side, a first lens, a second lens, a third lens, a fourth lens, a fifth lens, a sixth lens, a first image plane and a second image plane. The optical image capturing system may further include an image sensing device, which is disposed on the first image plane.

The optical image capturing system may use three sets of operation wavelengths, which are respectively 486.1 nm, 587.5 nm and 656.2 nm, and wherein 587.5 nm is served as the primary reference wavelength and the primary reference wavelength to obtain technical features of the optical image capturing system. The optical image capturing system may also use five sets of wavelengths which are respectively 470 nm, 510 nm, 555 nm, 610 nm and 650 nm, and wherein 555 nm is served as the primary reference wavelength and a reference wavelength to obtain technical features of the optical image capturing system.

The ratio of the focal length f of the optical image capturing system to a focal length fp of each lens with positive refractive power is PPR. The ratio of the focal length f of the optical image capturing system to a focal length fn of each lens with negative refractive power is NPR. The sum of the PPR of all lenses with positive refractive power is ΣPPR. The sum of the NPR of all lenses with negative refractive power is ΣNPR. The total refractive power and the total length of the optical image capturing system can be controlled easily when meeting following condition: $0.5 \leq \Sigma PPR/|\Sigma NPR| \leq 15$. Preferably, the following condition is satisfied: $1 \leq \Sigma PPR/|\Sigma NPR| \leq 3.0$.

The optical image capturing system may further include an image sensing device which is disposed on the first image plane. A half diagonal of the effective detection field of the image sensing device (image formation height or the maximum image height of the optical image capturing system) may be expressed as HOI. The distance on the optical axis from the object side of the first lens to the first image plane may be expressed as HOS. The following conditions are satisfied: $HOS/HOI \leq 50$ and $0.5 \leq HOS/f \leq 150$. Preferably, the following conditions are satisfied: $1 \leq HOS/HOI \leq 40$ and $HOS/f \leq 1.5$. Hereby, this configuration can keep the miniaturization of the optical image capturing system to collocate with a light and thin portable electronic product.

In addition, in the optical image capturing system of the present invention, according to different requirements, at least one aperture may be arranged to reduce stray light and help elevate the image quality.

In the optical image capturing system of the invention, the aperture may be a front or middle aperture. Wherein, the front aperture is the aperture between a photographed object and the first lens while the middle aperture is the aperture between the first lens and the first image plane. In the case that the aperture is the front aperture, it can make the optical image capturing system generate a longer distance between the exit pupil and the first image plane, such that the optical image capturing system can accommodate more optical elements and the efficiency of the image sensing device in receiving image can be increased. In the case that the aperture is the middle aperture, it can expand the angle of view of the optical image capturing system, such that the optical image capturing system has the advantage of the camera lens with wide angle. The distance from the foregoing aperture to the first image plane may be expressed as InS. The following condition is satisfied: $0.2 \leq InS/HOS \leq 1.1$. Therefore, the optical image capturing system can be kept miniaturized and have a feature of wide angle of view.

In the optical image capturing system of the present invention, the distance from the object side of the first lens to the image side of the sixth lens may be expressed as InTL. The sum of thicknesses of all lenses with refractive power on the optical axis may be expressed as ΣTP. The following condition is satisfied: $0.1 \leq \Sigma TP/InTL \leq 0.9$. Hereby, this configuration can keep the contrast ratio of the optical image capturing system and the yield rate about manufacturing lens at the same time, and provide the proper back focal length so as to accommodate other elements.

The curvature radius of the object side of the first lens may be expressed as R1. The curvature radius of the image side of the first lens may be expressed as R2. The following condition is satisfied: $0.001 \leq |R1/R2| \leq 25$. Therefore, the first lens may have a suitable magnitude of positive refractive power, so as to prevent the spherical aberration from increasing too fast. Preferably, the following condition is satisfied: $0.01 \leq |R1/R2| < 12$.

The curvature radius of the object side of the sixth lens may be expressed as R11. The curvature radius of the image side of the sixth lens may be expressed as R12. The following condition is satisfied: $-7 < (R11-R12)/(R11+R12) < 50$. Hereby, this configuration is beneficial to correct the astigmatism generated by the optical image capturing system.

The distance on the optical axis between the first lens and the second lens may be expressed as IN12. The following condition is satisfied: $IN12/f \leq 60$. Thereby, this configuration is helpful to improve the chromatic aberration of the lens in order to elevate the performance of the optical image capturing system.

The distance on the optical axis between the fifth lens and the sixth lens may be expressed as IN56. The following condition is satisfied: $IN56/f \leq 3.0$. Therefore, this configuration is helpful to improve the chromatic aberration of the lens in order to elevate the performance of the optical image capturing system.

The thicknesses of the first lens and the second lens on the optical axis may be expressed as TP1 and TP2, respectively. The following condition is satisfied: $0.1 \leq (TP1+IN12)/TP2 \leq 10$. Therefore, this configuration is helpful to control the sensitivity of the optical image capturing system and improve the performance of the optical image capturing system.

The thicknesses of the fifth lens and the sixth lens on the optical axis may be expressed as TP5 and TP6, respectively, and the distance between the foregoing two lenses on the optical axis may be expressed as IN56. The following condition is satisfied: $0.1 \leq (TP6+IN56)/TP5 \leq 15$. Therefore, this configuration is helpful to control the sensitivity of the optical image capturing system, and decreases the total height of the optical image capturing system.

The thicknesses of the second lens, third lens and fourth lens on the optical axis may be expressed as TP2, TP3 and TP4, respectively. The distance between the second lens and the third lens on the optical axis may be expressed as IN23. The distance between the third lens and the fourth lens on the optical axis may be expressed as IN34. The distance between the fourth lens and the fifth lens on the optical axis may be expressed as IN45. The distance between the object side of the first lens and the image side of the sixth lens may be expressed as InTL. The following condition is satisfied: $0.1 \leq TP4/(IN34+TP4+IN45) < 1$. Therefore, this configuration is helpful to slightly correct the aberration of the propagating process of the incident light layer by layer, and decrease the total height of the optical image capturing system.

In the optical image capturing system of the present invention, a perpendicular distance between a critical point C61 on the object side of the sixth lens and the optical axis may be expressed as HVT61. A perpendicular distance between a critical point C62 on the image side of the sixth lens and the optical axis may be expressed as HVT62. A horizontal distance parallel to the optical axis from an intersection point where the object side of the sixth lens crosses the optical axis to the critical point C61 may be expressed as SGC61. A horizontal distance in parallel with the optical axis from an intersection point where the image side of the sixth lens crosses the optical axis to the critical point C62 may be expressed as SGC62. The following conditions may be satisfied: $0 \text{ mm} \leq HVT61 \leq 3 \text{ mm}$; $0 \text{ mm} \leq HVT62 \leq 6 \text{ mm}$; $0 \leq HVT61/HVT62$; $0 \text{ mm} \leq |SGC61| \leq 0.5 \text{ mm}$; $0 \text{ mm} < |SGC62| \leq 2 \text{ mm}$, and $0 < |SGC62|/(|SGC62|+TP6) \leq 0.9$. Therefore, this configuration is helpful to correct the off-axis aberration effectively.

The optical image capturing system of the present invention meets the following condition: $0.2 \leq HVT62/HOI \leq 0.9$. Preferably, the following condition may be satisfied: $0.3 \leq HVT62/HOI \leq 0.8$. Therefore, this configuration is helpful to correct the aberration of surrounding field of view for the optical image capturing system.

The optical image capturing system of the present invention meets the following condition: $0 \leq HVT62/HOS \leq 0.5$. Preferably, the following condition may be satisfied: $0.2 \leq HVT62/HOS \leq 0.45$. Therefore, this configuration is helpful to correct the aberration of surrounding field of view for the optical image capturing system.

In the optical image capturing system of the present invention, the horizontal distance parallel to the optical axis from an inflection point on the object side of the sixth lens that is the first nearest to the optical axis to an intersection point where the object side of the sixth lens crosses the optical axis may be expressed as SGI611. The horizontal distance in parallel with the optical axis from an inflection point on the image side of the sixth lens that is the first nearest to the optical axis to an intersection point where the image side of the sixth lens crosses the optical axis may be expressed as SGI621. The following conditions are satisfied: $0 < SGI611/(SGI611+TP6) \leq 0.9$ and $0 < SGI621/(SGI621+TP6) \leq 0.9$. Preferably, the following conditions are satisfied: $0.1 \leq SGI611/(SGI611+TP6) \leq 0.6$ and $0.1 \text{ } SGI621/(SGI621+TP6) \leq 0.6$.

The horizontal distance in parallel with the optical axis from the inflection point on the object side of the sixth lens that is the second nearest to the optical axis to an intersection point where the object side of the sixth lens crosses the optical axis may be expressed as SGI612. The distance parallel to the optical axis from an inflection point on the image side of the sixth lens that is the second nearest to the optical axis to an intersection point where the image side of the sixth lens crosses the optical axis may be expressed as SGI622. The following conditions are satisfied: $0 < SGI612/(SGI612+TP6) \leq 0.9$ and $0 < SGI622/(SGI622+TP6) \leq 0.9$. Preferably, the following conditions are satisfied: $0.1 \leq SGI612/(SGI612+TP6) \leq 0.6$ and $0.1 \leq SGI622/(SGI622+TP6) \leq 0.6$.

The perpendicular distance between the inflection point on the object side of the sixth lens that is the first nearest to the optical axis and the optical axis may be expressed as HIF611. The perpendicular distance between an intersection point where the image side of the sixth lens crosses the optical axis and an inflection point on the image side of the sixth lens that is the first nearest to the optical axis may be expressed as HIF621. The following conditions are satisfied: $0.001 \text{ mm} \leq |HIF611| \leq 5 \text{ mm}$ and $0.001 \text{ mm} \leq |HIF621| \leq 5 \text{ mm}$. Preferably, the following conditions are satisfied: $0.1 \text{ mm} \leq |HIF611| \leq 3.5 \text{ mm}$ and $1.5 \text{ mm} \leq |HIF621| \leq 3.5 \text{ mm}$.

The perpendicular distance between the inflection point on the object side of the sixth lens that is the second nearest to the optical axis and the optical axis may be expressed as HIF612. The perpendicular distance between an intersection point where the image side of the sixth lens crosses the optical axis and an inflection point on the image side of the sixth lens that is the second nearest to the optical axis may be expressed as HIF622. The following conditions are satisfied: 0.001 mm≤|HIF612|≤5 mm and 0.001 mm≤|HIF622|≤5 mm. Preferably, the following conditions are satisfied: 0.1 mm≤|HIF622|≤3.5 mm and 0.1 mm≤|HIF612|≤3.5 mm.

The perpendicular distance between the inflection point on the object side of the sixth lens that is the third nearest to the optical axis and the optical axis may be expressed as HIF613. The perpendicular distance between an intersection point where the image side of the sixth lens crosses the optical axis and an inflection point on the image side of the sixth lens that is the third nearest to the optical axis may be expressed as HIF623. The following conditions are satisfied: 0.001 mm≤|HIF613|≤5 mm and 0.001 mm≤|HIF623|≤5 mm. Preferably, the following conditions are satisfied: 0.1 mm≤|HIF623|≤3.5 mm and 0.1 mm≤|HIF613|≤3.5 mm.

The perpendicular distance between the inflection point on the object side of the sixth lens that is the fourth nearest to the optical axis and the optical axis may be expressed as HIF614. The perpendicular distance between an intersection point where the image side of the sixth lens crosses the optical axis and an inflection point on the image side of the sixth lens that is the fourth nearest to the optical axis is expressed as HIF624. The following conditions are satisfied: 0.001 mm≤|HIF614|≤5 mm and 0.001 mm≤|HIF624|≤5 mm. Preferably, the following conditions are satisfied: 0.1 mm≤|HIF624|≤3.5 mm and 0.1 mm≤|HIF614|≤3.5 mm.

In one embodiment of the optical image capturing system of the present invention, it can be helpful to correct the chromatic aberration of the optical image capturing system by arranging the lens with high coefficient of dispersion and low coefficient of dispersion in a staggered manner.

The equation for the aforementioned aspheric surface is:

$$z=ch^2/[1+[1-(k+1)c^2h^2]^{0.5}]+A_4h^4+A_6h^6+A_8h^8+A_{10}h^{10}+A_{12}h^{12}+A_{14}h^{14}+A_{16}h^{16}+A_{18}h^{18}+A_{20}h^{20}+\ldots \quad (1),$$

where z is a position value of the position along the optical axis and at the height h which refers to the surface apex; k is the cone coefficient, c is the reciprocal of curvature radius, and $A_4$, $A_6$, $A_8$, $A_{10}$, $A_{12}$, $A_{14}$, $A_{16}$, $A_{18}$, and $A_{20}$ are high order aspheric coefficients.

In the optical image capturing system provided by the present invention, the lens may be made of glass or plastic. If the lens is made of plastic, it can reduce the manufacturing cost as well as the weight of the lens effectively. If lens is made of glass, it can control the heat effect and increase the design space of the configuration of the lens with refractive power in the optical image capturing system. Furthermore, the object side and the image side of the first lens through sixth lens may be aspheric, which can gain more control variables and even reduce the number of the used lenses in contrast to traditional glass lens in addition to the use of reducing the aberration. Thus, the total height of the optical image capturing system can be reduced effectively.

Furthermore, in the optical image capturing system provided by the present invention, when the surface of lens is a convex surface, the surface of that lens is a convex surface in the vicinity of the optical axis in principle. When the surface of lens is a concave surface, the surface of that lens is a concave surface in the vicinity of the optical axis in principle.

The optical image capturing system of the present invention can be applied to the optical image capturing system with automatic focus based on the demand and have the characters of the good aberration correction and the good image quality. Thereby, the optical image capturing system expands the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the shooting process.

In the optical image capturing system of the present invention, at least one lens among the first lens, second lens, third lens, fourth lens, fifth lens and sixth lens may further be a light filtering element for light with wavelength of less than 500 nm based on the requirements. The light filtering element may be made by coating film on at least one surface of that lens with certain filtering function, or forming that lens with material that can filter light with short wavelength.

The first image plane of the optical image capturing system of the present invention may be a plane or a curved surface based on the design requirement. When the first image plane is a curved surface (e.g. a spherical surface with a curvature radius), it is helpful to decrease the required incident angle to focus rays on the first image plane. In addition to the aid of the miniaturization of the length of the optical image capturing system (TTL), this configuration is helpful to elevate the relative illumination at the same time.

According to the foregoing implementation method, the specific embodiments with figures are presented in detail as below.

The First Embodiment

Figure 1B:
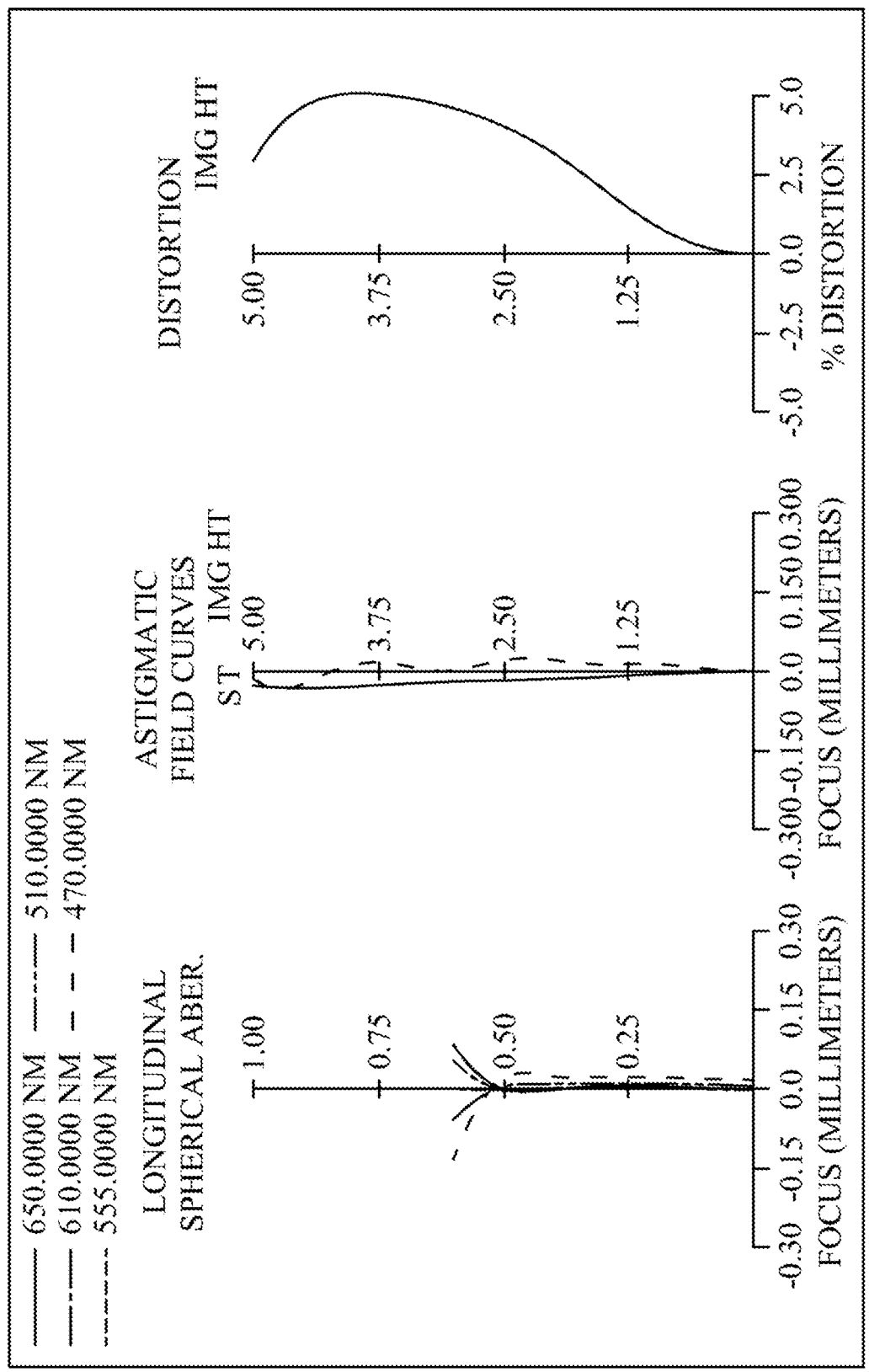
FIG. 1B shows the longitudinal spherical aberration curves, astigmatic field curves, and optical distortion curve of the optical image capturing system in the order from left to right according to the first embodiment of the present invention.
Figure 1C:
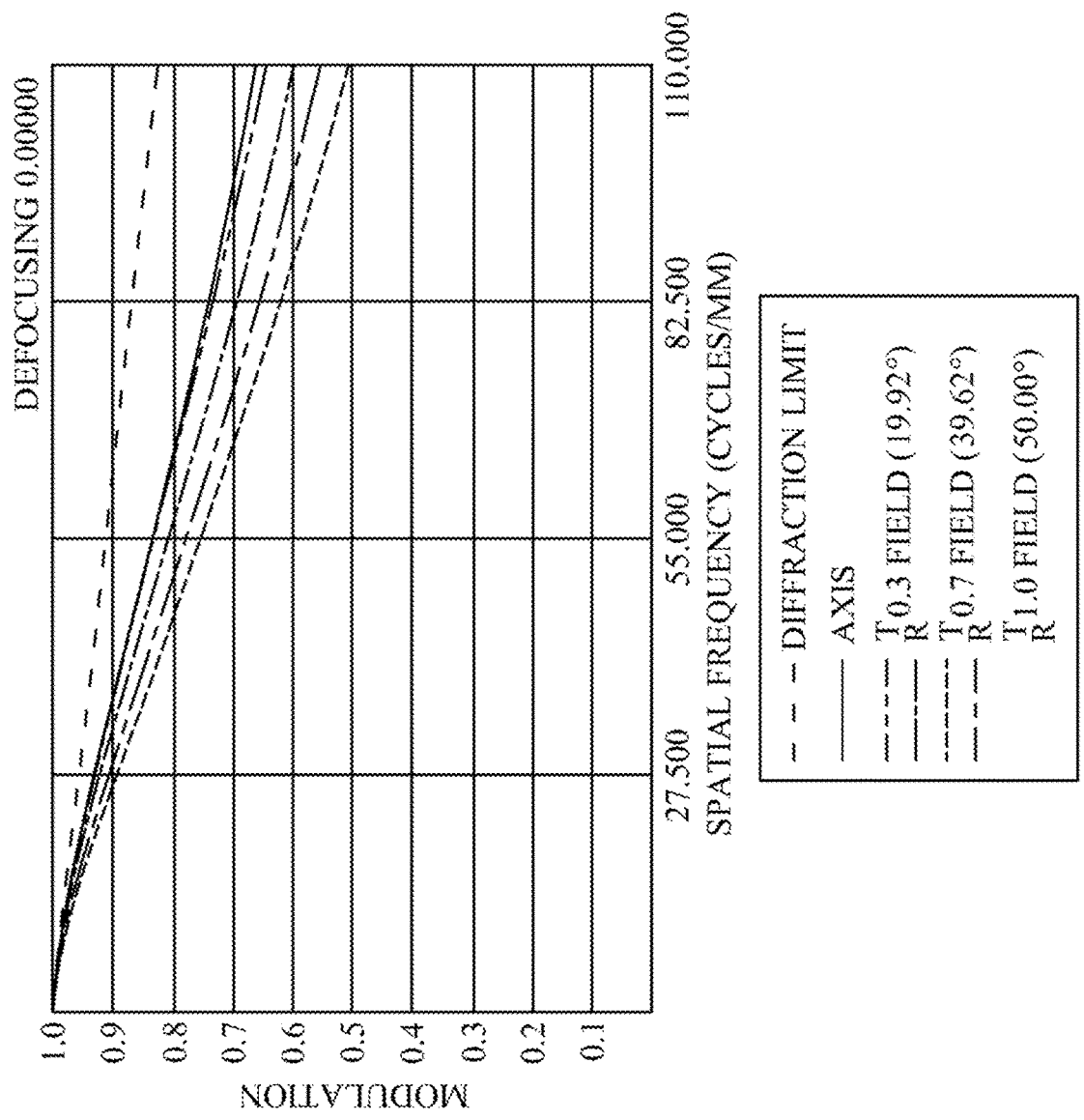
FIG. 1C is a characteristic diagram of modulation transfer of visible light spectrum for the optical image capturing system according to the first embodiment of the present invention.
Figure 1D:
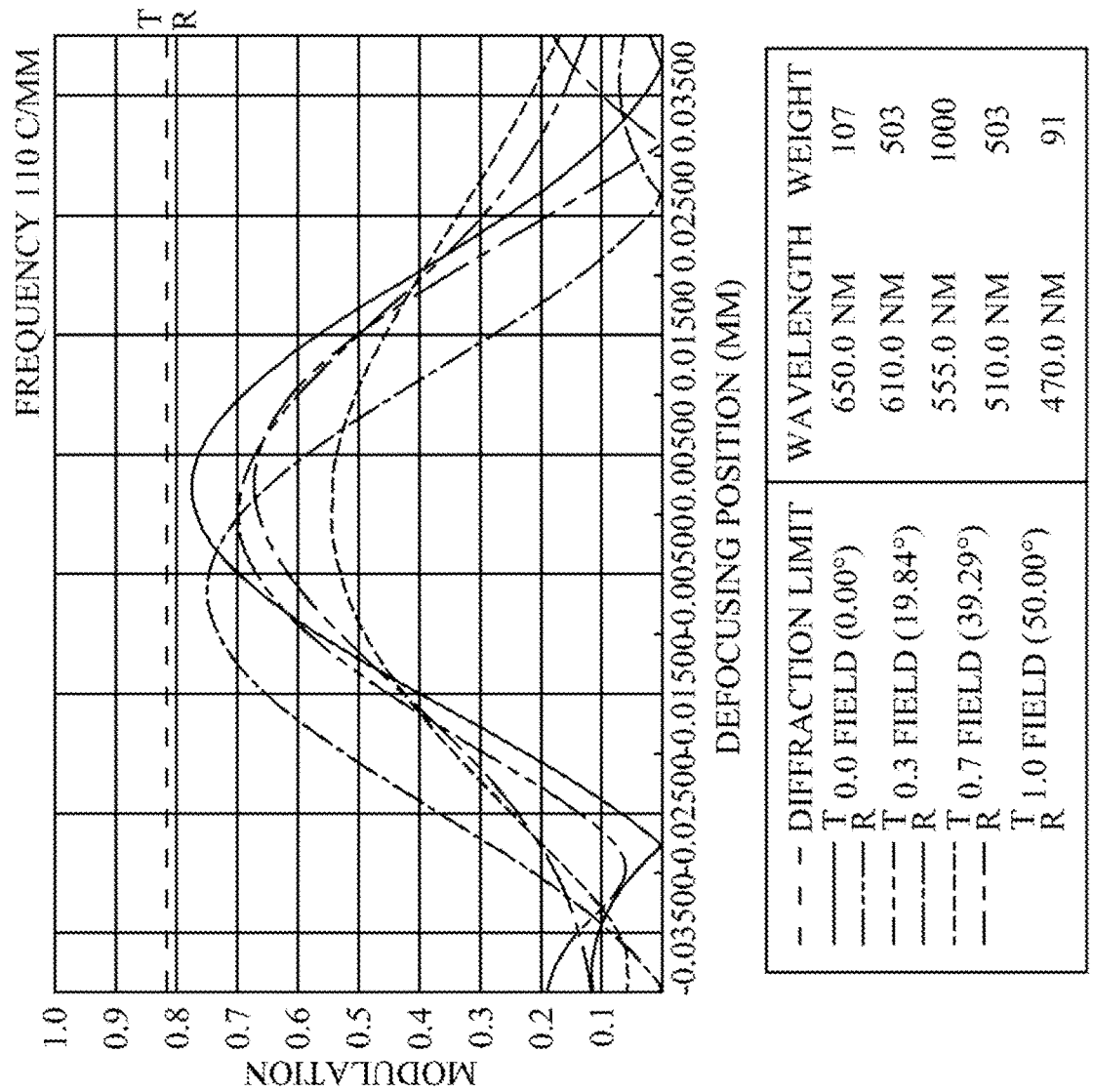
FIG. 1D is a diagram showing the through focus MTF values (Through Focus MTF) of the visible light spectrum at the central field of view, 0.3 field of view and 0.7 field of view of the first embodiment of the present invention.
Figure 1E:
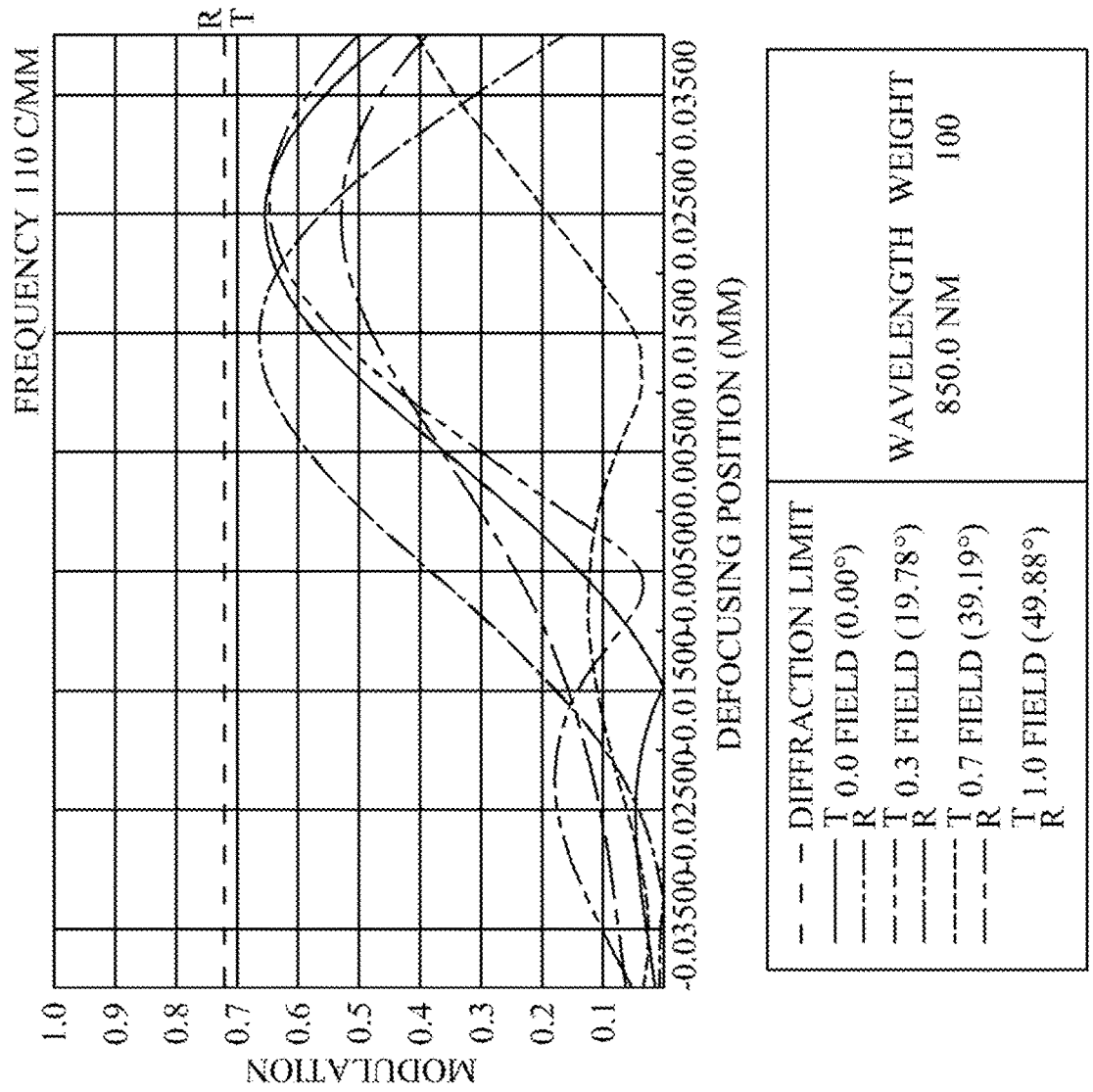
FIG. 1E is a diagram showing the through focus MTF values of the infrared light spectrum at the central field of view, 0.3 field of view, and 0.7 field of view of the first embodiment of the present invention.

Please refer to FIG. 1A and FIG. 1B, wherein FIG. 1A is a schematic view of the optical image capturing system according to the first embodiment of the present invention and FIG. 1B shows the longitudinal spherical aberration curves, astigmatic field curves, and optical distortion curve of the optical image capturing system in the order from left to right according to the first embodiment of the present invention. FIG. 1C is a characteristic diagram of modulation transfer of visible light spectrum for the optical image capturing system according to the first embodiment of the present invention. FIG. 1D is a diagram showing the through focus MTF values (Through Focus MTF) of the visible light spectrum at the central field of view, 0.3 field of view and 0.7 field of view of the first embodiment of the present invention. FIG. 1E is a diagram showing the through focus MTF values of the infrared light spectrum at the central field of view, 0.3 field of view, and 0.7 field of view of the first embodiment of the present invention. As shown in FIG. 1A, in the order from the object side to the image side, the optical image capturing system includes a first lens 110, an aperture 100, a second lens 120, a third lens 130, a fourth lens 140, a fifth lens 150, a sixth lens 160, an IR-bandstop filter 180, a first image plane 190, a second image plane and an image sensing device 192.

The first lens 110 has negative refractive power and is made of plastic. An object side 112 of the first lens 110 is a concave surface and an image side 114 of the first lens 110 is a concave surface, and the object side 112 and the image side 114 of the first lens 110 are both aspheric. The object side 112 of the first lens 110 has two inflection points. The thickness of the first lens 110 on the optical axis is TP1. The thickness of the first lens 110 at the height of ½ entrance pupil diameter (HEP) may be expressed as ETP1.

The horizontal distance parallel to the optical axis from an inflection point on the object side 112 of the first lens 110 which is the first nearest to the optical axis to an intersection point where the object side 112 of the first lens 110 crosses the optical axis may be expressed as SGI111. The horizontal distance parallel to the optical axis from an inflection point on the image side 114 of the first lens 110 which is the first nearest to the optical axis to an intersection point where the image side 114 of the first lens 110 crosses the optical axis may be expressed as SGI121. The following conditions are satisfied: SGI111=−0.0031 mm, and |SGI111|/(|SGI111|+TP1)=0.0016.

The horizontal distance parallel to the optical axis from an inflection point on the object side 112 of the first lens 110 that is the second nearest to the optical axis to an intersection point where the object side 112 of the first lens 110 crosses the optical axis may be expressed as SGI112. The horizontal distance parallel to the optical axis from an inflection point on the image side 114 of the first lens 110 that is the second nearest to the optical axis to an intersection point where the image side 114 of the first lens 110 crosses the optical axis may be expressed as SGI122. The following conditions are satisfied: SGI112=1.3178 mm and |SGI112|/(|SGI112|+TP1)=0.4052.

The perpendicular distance from the inflection point on the object side 112 of the first lens 110 that is the first nearest to the optical axis to the optical axis may be expressed as HIF111. The perpendicular distance from the inflection point on the image side 114 of the first lens 110 that is the first nearest to the optical axis to an intersection point where the image side of the first lens crosses the optical axis may be expressed as HIF121. The following conditions are satisfied: HIF111=0.5557 mm and HIF111/HOI=0.1111.

The perpendicular distance from the inflection point on the object side 112 of the first lens 110 that is the second nearest to the optical axis to the optical axis may be expressed as HIF112. The perpendicular distance from the inflection point on the image side 114 of the first lens 110 that is the second nearest to the optical axis to an intersection point where the image side 114 of the first lens 110 crosses the optical axis may be expressed as HIF122. The following conditions are satisfied: HIF112=5.3732 mm and HIF112/HOI=1.0746.

The second lens 120 has positive refractive power and is made of plastic. An object side 122 of the second lens 120 is a convex surface and an image side 124 of the second lens 120 is a convex surface, and the object side 122 and the image side 124 of the second lens 120 are both aspheric. The object side 122 of the second lens 120 has one inflection point. The thickness of the second lens 120 on the optical axis is TP2. The thickness of the second lens 120 at the height of ½ entrance pupil diameter (HEP) may be expressed as ETP2.

The horizontal distance parallel to the optical axis from an inflection point on the object side 122 of the second lens 120 that is nearest to the optical axis to the intersection point where the object side 122 of the second lens 120 crosses the optical axis may be expressed as SGI211. The horizontal distance parallel to the optical axis from an inflection point on the image side 124 of the second lens 120 that is nearest to the optical axis to the intersection point where the image side 124 of the second lens 120 crosses the optical axis may be expressed as SGI221. The following conditions are satisfied: SGI211=0.1069 mm, |SGI211|/(|SGI211|+TP2)=0.0412, SGI221=0 mm and |SGI221|/(|SGI221|+TP2)=0.

The perpendicular distance from the inflection point on the object side 122 of the second lens 120 that is nearest to the optical axis to the optical axis may be expressed as HIF211. The perpendicular distance from the inflection point on the image side 124 of the second lens 120 that is nearest to the optical axis to the intersection point where the image side 124 of the second lens 120 crosses the optical axis may be expressed as HIF221. The following conditions are satisfied: HIF211=1.1264 mm, HIF211/HOI=0.2253, HIF221=0 mm and HIF221/HOI=0.

The third lens 130 has negative refractive power and is made of plastic. An object side 132 of the third lens 130 is a concave surface and an image side 134 of the third lens 130 is a convex surface, and the object side 132 and the image side 134 of the third lens 130 are both aspheric. Both of the object side 132 and the image side 134 of the third lens 130 have one inflection point. The thickness of the third lens 130 on the optical axis is TP3. The thickness of the third lens 130 at the height of ½ entrance pupil diameter (HEP) may be expressed as ETP3.

The distance parallel to the optical axis from an inflection point on the object side 132 of the third lens 130 that is nearest to the optical axis to an intersection point where the object side 132 of the third lens 130 crosses the optical axis may be expressed as SGI311. The distance parallel to the optical axis from an inflection point on the image side 134 of the third lens 130 that is nearest to the optical axis to an intersection point where the image side 134 of the third lens 130 crosses the optical axis may be expressed as SGI321. The following conditions are satisfied: SGI311=−0.3041 mm, |SGI311|/(|SGI311|+TP3)=0.4445, SGI321=−0.1172 mm and |SGI321|/(|SGI321|+TP3)=0.2357.

The perpendicular distance between the inflection point on the object side 132 of the third lens 130 that is nearest to the optical axis and the optical axis may be expressed as HIF311. The perpendicular distance between the inflection point on the image side 134 of the third lens 130 that is nearest to the optical axis and the intersection point where the image side 134 of the third lens 130 crosses the optical axis may be expressed as HIF321. The following conditions are satisfied: HIF311=1.5907 mm, HIF311/HOI=0.3181, HIF321=1.3380 mm and HIF321/HOI=0.2676.

The fourth lens 140 has positive refractive power and is made of plastic. An object side 142 of the fourth lens 140 is a convex surface and an image side 144 of the fourth lens 140 is a concave surface, and the object side 142 and the image side 144 of the fourth lens 140 are both aspheric. The object side 142 of the fourth lens 140 has two inflection points, and the image side 144 of the fourth lens 140 has one inflection point. The thickness of the fourth lens 140 on the optical axis is TP4. The thickness of the fourth lens 140 at the height of ½ entrance pupil diameter (HEP) may be expressed as ETP4.

The horizontal distance parallel to the optical axis from an inflection point on the object side 142 of the fourth lens 140 that is the first nearest to the optical axis to the intersection point where the object side 142 of the fourth lens 140 crosses the optical axis may be expressed as SGI411. The horizontal distance parallel to the optical axis from an inflection point on the image side 144 of the fourth lens 140 that is the first nearest to the optical axis to the intersection point where the image side 144 of the fourth lens 140 crosses the optical axis may be expressed as SGI421. The following conditions are satisfied: SGI411=0.0070 mm, |SGI411|/(|SGI411|+TP4)=0.0056, SGI421=0.0006 mm and |SGI421|/(|SGI421|+TP4)=0.0005.

The horizontal distance parallel to the optical axis from an inflection point on the object side 142 of the fourth lens 140 that is the second nearest to the optical axis to the intersection point where the object side 142 of the fourth lens 140 crosses the optical axis may be expressed as SGI412. The horizontal distance parallel to the optical axis from an inflection point on the image side 144 of the fourth lens 140 that is the second nearest to the optical axis to the intersection point where the image side 144 of the fourth lens 140 crosses the optical axis may be expressed as SGI422. The following conditions are satisfied: SGI412=−0.2078 mm and |SGI412|/(|SGI412|+TP4)=0.1439.

The perpendicular distance between the inflection point on the object side 142 of the fourth lens 140 that is the first nearest to the optical axis and the optical axis may be expressed as HIF411. The perpendicular distance on the optical axis between the inflection point on the image side 144 of the fourth lens 140 that is the first nearest to the optical axis and the intersection point where the image side 144 of the fourth lens 140 crosses the optical axis may be expressed as HIF421. The following conditions are satisfied: HIF411=0.4706 mm, HIF411/HOI=0.0941, HIF421=0.1721 mm and HIF421/HOI=0.0344.

The perpendicular distance between the inflection point on the object side 142 of the fourth lens 140 that is the second nearest to the optical axis and the optical axis may be expressed as HIF412. The perpendicular distance between the inflection point on the image side 144 of the fourth lens 140 that is the second nearest to the optical axis and the intersection point where the image side 144 of the fourth lens 140 crosses the optical axis may be expressed as HIF422. The following conditions are satisfied: HIF412=2.0421 mm and HIF412/HOI=0.4084.

The fifth lens 150 has positive refractive power and is made of plastic. An object side 152 of the fifth lens 150 is a convex surface and an image side 154 of the fifth lens 150 is a convex surface, and the object side 152 and the image side 154 of the fifth lens 150 are both aspheric. The object side 152 of the fifth lens 150 has two inflection points and the image side 154 of the fifth lens 150 has one inflection point. The thickness of the fifth lens 150 on the optical axis is TP5. The thickness of the fifth lens 150 at the height of ½ entrance pupil diameter (HEP) may be expressed as ETP5.

The horizontal distance parallel to the optical axis from an inflection point on the object side 152 of the fifth lens 150 that is the first nearest to the optical axis to the intersection point where the object side 152 of the fifth lens 150 crosses the optical axis may be expressed as SGI511. The horizontal distance parallel to the optical axis from an inflection point on the image side 154 of the fifth lens 150 that is the first nearest to the optical axis to the intersection point where the image side 154 of the fifth lens 150 crosses the optical axis may be expressed as SGI521. The following conditions are satisfied: SGI511=0.00364 mm, |SGI511|/(|SGI511|+TP5)=0.00338, SGI521=−0.63365 mm and |SGI521|/(|SGI521|+TP5)=0.37154.

The horizontal distance parallel to the optical axis from an inflection point on the object side 152 of the fifth lens 150 that is the second nearest to the optical axis to the intersection point where the object side 152 of the fifth lens 150 crosses the optical axis may be expressed as SGI512. The horizontal distance parallel to the optical axis from an inflection point on the image side 154 of the fifth lens 150 that is the second nearest to the optical axis to the intersection point where the image side 154 of the fifth lens 150 crosses the optical axis is expressed as SGI522. The following conditions are satisfied: SGI512=−0.32032 mm and |SGI512|/(|SGI512|+TP5)=0.23009.

The horizontal distance parallel to the optical axis from an inflection point on the object side 152 of the fifth lens 150 that is the third nearest to the optical axis to the intersection point where the object side 152 of the fifth lens 150 crosses the optical axis may be expressed as SGI513. The horizontal distance parallel to the optical axis from an inflection point on the image side 154 of the fifth lens 150 that is the third nearest to the optical axis to the intersection point where the image side 154 of the fifth lens 150 crosses the optical axis may be expressed as SGI523. The following conditions are satisfied: SGI513=0 mm, |SGI513|/(|SGI513|+TP5)=0, SGI523=0 mm and |SGI523|/(|SGI523|+TP5)=0.

The horizontal distance parallel to the optical axis from an inflection point on the object side 152 of the fifth lens 150 that is the fourth nearest to the optical axis to the intersection point where the object side 152 of the fifth lens 150 crosses the optical axis may be expressed as SGI514. The horizontal distance parallel to the optical axis from an inflection point on the image side 154 of the fifth lens 150 that is the fourth nearest to the optical axis to the intersection point where the image side 154 of the fifth lens 150 crosses the optical axis may be expressed as SGI524. The following conditions are satisfied: SGI514=0 mm, |SGI514|/(|SGI514|+TP5)=0, SGI524=0 mm and |SGI524|/(|SGI524|+TP5)=0.

The perpendicular distance between the optical axis and the inflection point on the object side 152 of the fifth lens 150 that is the first nearest to the optical axis may be expressed as HIF511. The perpendicular distance between the optical axis and the inflection point on the image side 154 of the fifth lens 150 that is the first nearest to the optical axis may be expressed as HIF521. The following conditions are satisfied: HIF511=0.28212 mm, HIF511/HOI=0.05642, HIF521=2.13850 mm and HIF521/HOI=0.42770.

The perpendicular distance between the inflection point on the object side 152 of the fifth lens 150 that is the second nearest to the optical axis and the optical axis may be expressed as HIF512. The perpendicular distance between the inflection point on the image side 154 of the fifth lens 150 that is the second nearest to the optical axis and the optical axis may be expressed as HIF522. The following conditions are satisfied: HIF512=2.51384 mm and HIF512/HOI=0.50277.

The perpendicular distance between the inflection point on the object side 152 of the fifth lens 150 that is the third nearest to the optical axis and the optical axis may be expressed as HIF513. The perpendicular distance between the inflection point on the image side 154 of the fifth lens 150 that is the third nearest to the optical axis and the optical axis may be expressed as HIF523. The following conditions are satisfied: HIF513=0 mm, HIF513/HOI=0, HIF523=0 mm and HIF523/HOI=0.

The perpendicular distance between the inflection point on the object side 152 of the fifth lens 150 that is the fourth nearest to the optical axis and the optical axis may be expressed as HIF514. The perpendicular distance between the inflection point on the image side 154 of the fifth lens 150 that is the fourth nearest to the optical axis and the optical axis may be expressed as HIF524. The following conditions are satisfied: HIF514=0 mm, HIF514/HOI=0, HIF524=0 mm and HIF524/HOI=0.

The sixth lens 160 has negative refractive power and is made of plastic. An object side 162 of the sixth lens 160 is a concave surface and an image side 164 of the sixth lens 160 is a concave surface, and the object side 162 of the sixth lens 160 has two inflection points and the image side 164 of the sixth lens 160 has one inflection point. Hereby, the incident angle of each field of view on the sixth lens 160 can be effectively adjusted and the spherical aberration can be improved. The thickness of the sixth lens 160 on the optical axis is TP6. The thickness of the sixth lens 160 at the height of ½ entrance pupil diameter (HEP) may be expressed as ETP6.

The horizontal distance parallel to the optical axis from an inflection point on the object side 162 of the sixth lens 160 that is the first nearest to the optical axis to the intersection point where the object side 162 of the sixth lens 160 crosses the optical axis may be expressed as SGI611. The horizontal distance parallel to the optical axis from an inflection point on the image side 164 of the sixth lens 160 that is the first nearest to the optical axis to the intersection point where the image side 164 of the sixth lens 160 crosses the optical axis may be expressed as SGI621. The following conditions are satisfied: SGI611=−0.38558 mm, |SGI611|/(|SGI611|+TP6)=0.27212, SGI621=0.12386 mm and |SGI621|/(|SGI621|+TP6)=0.10722.

The horizontal distance parallel to the optical axis from an inflection point on the object side 162 of the sixth lens 160 that is the second nearest to the optical axis to an intersection point where the object side 162 of the sixth lens 160 crosses the optical axis may be expressed as SGI612. The horizontal distance parallel to the optical axis from an inflection point on the image side 164 of the sixth lens 160 that is the second nearest to the optical axis to the intersection point where the image side 164 of the sixth lens 160 crosses the optical axis may be expressed as SGI622. The following conditions are satisfied: SGI612=−0.47400 mm, |SGI612|/(|SGI612|+TP6)=0.31488, SGI622=0 mm and |SGI622|/(|SGI622|+TP6)=0.

The perpendicular distance between the inflection point on the object side 162 of the sixth lens 160 that is the first nearest to the optical axis and the optical axis may be expressed as HIF611. The perpendicular distance between the inflection point on the image side 164 of the sixth lens 160 that is the first nearest to the optical axis and the optical axis may be expressed as HIF621. The following conditions are satisfied: HIF611=2.24283 mm, HIF611/HOI=0.44857, HIF621=1.07376 mm and HIF621/HOI=0.21475.

The perpendicular distance between the inflection point on the object side 162 of the sixth lens 160 that is the second nearest to the optical axis and the optical axis may be expressed as HIF612. The perpendicular distance between the inflection point on the image side 164 of the sixth lens 160 that is the second nearest to the optical axis and the optical axis may be expressed as HIF622. The following conditions are satisfied: HIF612=2.48895 mm and HIF612/HOI=0.49779.

The perpendicular distance between the inflection point on the object side 162 of the sixth lens 160 that is the third nearest to the optical axis and the optical axis may be expressed as HIF613. The perpendicular distance between the inflection point on the image side 164 of the sixth lens 160 that is the third nearest to the optical axis and the optical axis may be expressed as HIF623. The following conditions are satisfied: HIF613=0 mm, HIF613/HOI=0, HIF623=0 mm and HIF623/HOI=0.

The perpendicular distance between the inflection point on the object side 162 of the sixth lens 160 that is the fourth nearest to the optical axis and the optical axis may be expressed as HIF614. The perpendicular distance between the inflection point on the image side 164 of the sixth lens 160 that is the fourth nearest to the optical axis and the optical axis may be expressed as HIF624. The following conditions are satisfied: HIF614=0 mm, HIF614/HOI=0, HIF624=0 mm and HIF624/HOI=0.

In the first embodiment, the distance parallel to the optical axis between the coordinate point of the object side 112 of the first lens 110 at a height of ½ HEP and the first image plane 190 may be expressed as ETL. The distance parallel to the optical axis between the coordinate point of the object side 112 of the first lens 110 at a height of ½ HEP and the coordinate point of the image side 164 of the sixth lens 160 at a height of ½ HEP may be expressed as EIN. The following conditions are satisfied: ETL=19.304 mm, EIN=15.733 mm and EIN/ETL=0.815.

The first embodiment meets the following conditions: ETP1=2.371 mm; ETP2=2.134 mm; ETP3=0.497 mm; ETP4=1.111 mm; ETP5=1.783 mm; ETP6=1.404 mm; the sum of ETP1 to ETP6 described above SETP=9.300 mm; TP1=2.064 mm; TP2=2.500 mm; TP3=0.380 mm; TP4=1.186 mm; TP5=2.184 mm, TP6=1.105 mm, the sum of TP1 to TP6 described above STP=9.419 mm; SETP/STP=0.987, and SETP/EIN=0.5911.

The first embodiment particularly controls the ratio relationship (ETP/TP) between the thickness (ETP) of each lens at a height of ½ entrance pupil diameter (HEP) and the thickness (TP) of the lens to which the surface belongs on the optical axis in order to achieve a balance between manufacturability and capability of aberration correction. The following relationships are satisfied: ETP1/TP=1.149, ETP2/TP2=0.854, ETP3/TP3=1.308, ETP4/TP4=0.936, ETP5/TP5=0.817, and ETP6/TP6=1.271.

The first embodiment controls the horizontal distance between each two adjacent lenses at a height of ½ entrance pupil diameter (HEP) to achieve a balance between the degree of miniaturization for the length of the optical image capturing system HOS, the manufacturability and the capability of aberration correction. The ratio relationship (ED/IN) of the horizontal distance (ED) between the two adjacent lens at the height of ½ entrance pupil diameter (HEP) to the horizontal distance (IN) on the optical axis between the two adjacent lens is particularly controlled. The following relationships are satisfied: the horizontal distance parallel to the optical axis between the first lens 110 and the second lens 120 at a height of ½ entrance pupil diameter (HEP) ED12=5.285 mm. The horizontal distance parallel to the optical axis between the second lens 120 and the third lens 130 at a height of ½ entrance pupil diameter (HEP) ED23=0.283 mm. The horizontal distance parallel to the optical axis between the third lens 130 and the fourth lens 140 at a height of ½ entrance pupil diameter (HEP) ED34=0.330 mm. The horizontal distance parallel to the optical axis between the fourth lens 140 and the fifth lens 150 at a height of ½ entrance pupil diameter (HEP) ED45=0.348 mm. The horizontal distance parallel to the optical axis between the fifth lens 150 and the sixth lens 160 at a height of ½ entrance pupil diameter (HEP) ED56=0.187 mm. The sum of ED12 to ED56 described above is expressed as SED, and SED=6.433 mm.

The horizontal distance on the optical axis between the first lens 110 and the second lens 120 IN12=5.470 mm and ED12/IN12=0.966. The horizontal distance on the optical axis between the second lens 120 and the third lens 130 IN23=0.178 mm and ED23/IN23=1.590. The horizontal distance on the optical axis between the third lens 130 and the fourth lens 140 IN34=0.259 mm and ED34/IN34=0.273. The horizontal distance on the optical axis between the fourth lens 140 and the fifth lens 150 IN45=0.209 mm and ED45/IN45=1.664. The horizontal distance on the optical axis between the fifth lens 150 and the sixth lens 160

IN56=0.034 mm and ED56/IN56=5.557. The sum of IN12 to IN56 described above is expressed as SIN and SIN=6.150 mm. SED/SIN=1.046.

The first embodiment meets the following conditions: ED12/ED23=18.685, ED23/ED34=0.857, ED34/ED45=0.947, ED45/ED56=1.859, IN12/IN23=30.746, IN23/IN34=0.686, IN34/IN45=1.239 and IN45/IN56=6.207.

The horizontal distance parallel to the optical axis between a coordinate point on the image side 164 of the sixth lens 160 at the height of ½ HEP and the first image plane 190 may be expressed as EBL=3.570 mm. The horizontal distance parallel to the optical axis between an intersection point where the image side 164 of the sixth lens 160 crosses the optical axis and the first image plane 190 may be expressed as BL=4.032 mm. The embodiment of the present invention may meet the following relationship: EBL/BL=0.8854. In the first embodiment, the distance parallel to the optical axis between the coordinate point on the image side 164 of the sixth lens 160 at the height of ½ HEP and the IR-bandstop filter may be expressed as EIR=1.950 mm. The distance parallel to the optical axis between the intersection point where the image side 164 of the sixth lens 160 crosses the optical axis and the IR-bandstop filter may be expressed as PIR=2.121 mm. The following relationship is satisfied: EIR/PIR=0.920.

The IR-bandstop filter 180 is made of glass. The IR-bandstop filter 180 is disposed between the sixth lens 160 and the first image plane 190, and does not affect the focal length of the optical image capturing system 10.

In the optical image capturing system 10 of the first embodiment, the focal length of the optical image capturing system 10 may be expressed as f, the entrance pupil diameter of the optical image capturing system 10 may be expressed as HEP, and a half maximum angle of view of the optical image capturing system 10 may be expressed as HAF. The detailed parameters are shown as below: f=4.075 mm, f/HEP=1.4, HAF=50.001 deg and tan(HAF)=1.1918.

In the optical image capturing system 10 of the first embodiment, the focal length of the first lens 110 may be expressed as f1 and the focal length of the sixth lens 160 may be expressed as f6. The following conditions are satisfied: f1=−7.828 mm, |f/f1|=0.52060, f6=−4.886 and |f1|>|f6|.

In the optical image capturing system 10 of the first embodiment, focal lengths of the second lens 120 to the fifth lens 150 may be expressed as f2, f3, f4 and f5, respectively. The following conditions are satisfied: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system 10 to the focal length fp of each of lens with positive refractive power may be expressed as PPR. The ratio of the focal length f of the optical image capturing system 10 to a focal length fn of each of lens with negative refractive power may be expressed as NPR. In the optical image capturing system 10 of the first embodiment, the sum of the PPR of all lenses with positive refractive power is ΣPPR=f/f2+f/f4+f/f5=1.63290. The sum of the NPR of all lenses with negative refractive power is ΣNPR=|f/f1|+|f/f3|+|f/f6|=1.51305, ΣPPR/|ΣNPR|=1.07921. Simultaneously, the following conditions are also satisfied: |f/f2|=0.69101, |f/f3|=0.15834, |f/f4|=0.06883, |f/f5|=0.87305 and |f/f6|=0.83412.

In the optical image capturing system 10 of the first embodiment, the distance from the object side 112 of the first lens 110 to the image side 164 of the sixth lens 160 may be expressed as InTL. The distance from the object side 112 of the first lens 110 to the first image plane 190 may be expressed as HOS. The distance from the aperture 100 to the first image plane 190 may be expressed as InS. A half diagonal length of the effective detection field of the image sensing device 192 may be expressed as HOI. The distance from the image side 164 of the sixth lens 160 to the first image plane 190 may be expressed as BFL. The following conditions are satisfied: InTL+BFL=HOS, HOS=19.54120 mm, HOI=5.0 mm, HOS/HOI=3.90824, HOS/f=4.7952, InS=11.685 mm, InS/HOS=0.59794 and InTL/HOS≤0.87.

In the optical image capturing system 10 of the first embodiment, a total thickness of all lenses with refractive power on the optical axis may be expressed as ΣTP. The following conditions are satisfied: ΣTP=8.13899 mm and ΣTP/InTL=0.52477. Hereby, this configuration can keep the contrast ratio of the optical image capturing system and the yield rate about manufacturing lens at the same time, and provide the proper back focal length so as to accommodate other elements.

In the optical image capturing system 10 of the first embodiment, the curvature radius of the object side 112 of the first lens 110 may be expressed as R1. The curvature radius of the image side 114 of the first lens 110 may be expressed as R2. The following condition is satisfied: |R1/R2|=8.99987. Hereby, the first lens has a suitable magnitude of positive refractive power, so as to prevent the longitudinal spherical aberration from increasing too fast.

In the optical image capturing system 10 of the first embodiment, the curvature radius of the object side 162 of the sixth lens 160 may be expressed as R11. The curvature radius of the image side 164 of the sixth lens 160 may be expressed as R12. The following condition is satisfied: (R11−R12)/(R11+R12)=1.27780. Hereby, this configuration is beneficial to correct the astigmatism generated by the optical image capturing system.

In the optical image capturing system 10 of the first embodiment, the sum of focal lengths of all lenses with positive refractive power may be expressed as ΣPP. The following conditions are satisfied: ΣPP=f2+f4+f5=69.770 mm and f5/(f2+f4+f5)=0.067. Hereby, this configuration is helpful to distribute the positive refractive power of a single lens to other lens with positive refractive power in an appropriate way, so as to suppress the generation of noticeable aberrations in the propagating process of the incident light in the optical image capturing system 10.

In the optical image capturing system 10 of the first embodiment, the sum of focal lengths of all lenses with negative refractive power may be expressed as ΣNP. The following conditions are satisfied: ΣNP=f1+f3+f6=−38.451 mm and f6/(f1+f3+f6)=0.127. Hereby, this configuration is helpful to distribute the sixth lens with negative refractive power to other lens with negative refractive power in an appropriate way, so as to suppress the generation of noticeable aberrations in the propagating process of the incident light in the optical image capturing system 10.

In the optical image capturing system 10 of the first embodiment, the distance on the optical axis between the first lens 110 and the second lens 120 may be expressed as IN12. The following conditions are satisfied: IN12=6.418 mm and IN12/f=1.57491. Therefore, this configuration is helpful to improve the chromatic aberration of the lens in order to elevate the performance of the optical image capturing system 10 of the first embodiment.

In the optical image capturing system 10 of the first embodiment, a distance on the optical axis between the fifth lens 150 and the sixth lens 160 may be expressed as IN56. The following condition is satisfied: IN56=0.025 mm and IN56/f=0.00613. Therefore, this configuration is helpful to improve the chromatic aberration of the lens in order to elevate the performance of the optical image capturing system 10 of the first embodiment.

In the optical image capturing system 10 of the first embodiment, the thicknesses of the first lens 110 and the second lens 120 on the optical axis may be expressed as TP1 and TP2, respectively. The following conditions are satisfied: TP1=1.934 mm, TP2=2.486 mm and (TP1+IN12)/TP2=3.36005. Therefore, this configuration is helpful to control the sensitivity generated by the optical image capturing system 10 and elevate the performance of the optical image capturing system 10 of the first embodiment.

In the optical image capturing system 10 of the first embodiment, the thicknesses of the fifth lens 150 and the sixth lens 160 on the optical axis may be expressed as TP5 and TP6, respectively, and the distance between the aforementioned two lenses on the optical axis is IN56. The following conditions are satisfied: TP5=1.072 mm, TP6=1.031 mm and (TP6+IN56)/TP5=0.98555. Therefore, this configuration is helpful to control the sensitivity generated by the optical image capturing system 10 and reduce the total height of the optical image capturing system 10.

In the optical image capturing system 10 of the first embodiment, the distance on the optical axis between the third lens 130 and the fourth lens 140 may be expressed as IN34. The distance on the optical axis between the fourth lens 140 and the fifth lens 150 may be expressed as IN45. The following conditions are satisfied: IN34=0.401 mm, IN45=0.025 mm and TP4/(IN34+TP4+IN45)=0.74376. Therefore, this configuration is helpful to slightly correct the aberration of the propagating process of the incident light layer by layer and decrease the total height of the optical image capturing system 10.

In the optical image capturing system 10 of the first embodiment, a horizontal distance parallel to the optical axis from an intersection point where the object side 152 of the fifth lens 150 crosses the optical axis to a maximum effective half diameter position on the object side 152 of the fifth lens 150 may be expressed as InRS51. The horizontal distance parallel to the optical axis from an intersection point where the image side 154 of the fifth lens 150 crosses the optical axis to a maximum effective half diameter position on the image side 154 of the fifth lens 150 may be expressed as InRS52. The thickness of the fifth lens 150 on the optical axis may be expressed as TP5. The following conditions are satisfied: InRS51=−0.34789 mm, InRS52=−0.88185 mm, |InRS51|/TP5=0.32458 and |InRS52|/TP5=0.82276. Hereby, this configuration is favorable to the manufacturing and forming of lens and keeps the miniaturization of the optical image capturing system effectively.

In the optical image capturing system 10 of the first embodiment, the perpendicular distance between a critical point on the object side 152 of the fifth lens 150 and the optical axis may be expressed as HVT51. The perpendicular distance between a critical point on the image side 154 of the fifth lens 150 and the optical axis may be expressed as HVT52. The following conditions are satisfied: HVT51=0.515349 mm and HVT52=0 mm.

In the optical image capturing system 10 of the first embodiment, a horizontal distance in parallel with the optical axis from an intersection point where the object side 162 of the sixth lens 160 crosses the optical axis to a maximum effective half diameter position on the object side 162 of the sixth lens 160 may be expressed as InRS61. A distance parallel to the optical axis from an intersection point where the image side 164 of the sixth lens 160 crosses the optical axis to a maximum effective half diameter position on the image side 164 of the sixth lens 160 may be expressed as InRS62. The thickness of the sixth lens 160 is TP6. The following conditions are satisfied: InRS61=−0.58390 mm, InRS62=0.41976 mm, |InRS61|/TP6=0.56616 and |InRS62|/TP6=0.40700. Hereby, this configuration is favorable to the manufacturing and forming of lens and keeping the miniaturization of the optical image capturing system 10 effectively.

In the optical image capturing system 10 of the first embodiment, the perpendicular distance between a critical point on the object side 162 of the sixth lens 160 and the optical axis may be expressed as HVT61. The perpendicular distance between a critical point on the image side 164 of the sixth lens 160 and the optical axis may be expressed as HVT62. The following conditions are satisfied: HVT61=0 mm and HVT62=0 mm.

In the optical image capturing system 10 of the first embodiment, the following condition is satisfied: HVT51/HOI=0.1031. Therefore, this configuration is helpful to correct the aberration of surrounding field of view of the optical image capturing system 10.

In the optical image capturing system 10 of the first embodiment, the following condition is satisfied: HVT51/HOS=0.02634. Therefore, this configuration is helpful to correct the aberration of surrounding field of view of the optical image capturing system 10.

In the optical image capturing system 10 of the first embodiment, the second lens 120, the third lens 130 and the sixth lens 160 have negative refractive power. The coefficient of dispersion of the second lens 120 may be expressed as NA2. The coefficient of dispersion of the third lens 130 may be expressed as NA3. The coefficient of dispersion of the sixth lens 160 may be expressed as NA6. The following condition is satisfied: NA6/NA2≤1. Therefore, this configuration is helpful to correct the chromatic aberration of the optical image capturing system 10.

In the optical image capturing system 10 of the first embodiment, TV distortion and optical distortion for image formation in the optical image capturing system 10 may be expressed as TDT and ODT, respectively. The following conditions are satisfied: |TDT|=2.124% and |ODT|=5.076%.

In the first embodiment of the present invention, the rays of any field of view can be further divided into sagittal ray and tangential ray. The spatial frequency of 110 cycles/mm serves as the benchmark for evaluating the focus shifts and the values of MTF. The focus shifts, where the through focus MTF values of the visible sagittal ray at the central field of view, 0.3 field of view, and 0.7 field of view of the optical image capturing system are at their respective maxima, may be expressed as VSFS0, VSFS3, and VSFS7 (unit of measurement: mm), respectively. The values of VSFS0, VSFS3, and VSFS7 equal to 0.000 mm, −0.005 mm, and 0.005 mm, respectively. The maximum values of the through focus MTF of the visible sagittal ray at central field of view, 0.3 field of view and 0.7 field of view may be expressed as VSMTF0, VSMTF3, and VSMTF7, respectively. The values of VSMTF0, VSMTF3, and VSMTF7 equal to 0.886, 0.885, and 0.863, respectively. The focus shifts, where the through focus MTF values of the visible tangential ray at the central field of view, 0.3 field of view, and 0.7 field of view of the optical image capturing system are at their respective maxima, may be expressed as VTFS0, VTFS3, and VTFS7 (unit of measurement: mm), respectively. The values of VTFS0, VTFS3, and VTFS7 equal to 0.000 mm, 0.001 mm, and −0.005 mm, respectively. The maximum values of the through focus MTF of the visible tangential ray at central field of view, 0.3 field of view and 0.7 field of view may be expressed as VTMTF0, VTMTF3, and VTMTF7, respectively. The values of VTMTF0, VTMTF3, and VTMTF7 equal to 0.886, 0.868, and 0.796, respectively. The average focus shift (position) of both the aforementioned focus shifts of the visible sagittal ray at three fields of view and the focus shifts of the visible tangential ray at three fields of view may be expressed as AVFS (unit of measurement: mm), which meets the absolute value |(VSFS0+VSFS3+VSFS7+VTFS0+VTFS3+VTFS7)/6|=|0.000 mm|.

The focus shifts, where the of the infrared sagittal ray at the central field of view, 0.3 field of view, and 0.7 field of view of the optical image capturing system are at their respective maxima, may be expressed as ISFS0, ISFS3, and ISFS7 (unit of measurement: mm), respectively. The values of ISFS0, ISFS3, and ISFS7 equal to 0.025 mm, 0.020 mm, and 0.020 mm, respectively. The average focus shift (position) of the aforementioned focus shifts of the infrared sagittal ray at three fields of view may be expressed as AISFS. The maximum values of the through focus MTF of the infrared sagittal ray at central field of view, 0.3 field of view, and 0.7 field of view of the optical image capturing system may be expressed as ISMTF0, ISMTF3, and ISMTF7, respectively. The values of ISMTF0, ISMTF3, and ISMTF7 equal to 0.787, 0.802, and 0.772, respectively. The focus shifts, where the through focus MTF values of the infrared tangential ray at the central field of view, 0.3 field of view, and 0.7 field of view of the optical image capturing system are at their respective maxima, may be expressed as ITFS0, ITFS3, and ITFS7 (unit of measurement: mm), respectively. The values of ITFS0, ITFS3, and ITFS7 equal to 0.025, 0.035, and 0.050, respectively. The average focus shift (position) of the aforementioned focus shifts of the infrared tangential ray at three fields of view may be expressed as AITFS (unit of measurement: mm). The maximum values of the through focus MTF of the infrared tangential ray at the central field of view, 0.3 field of view, and 0.7 field of view of the optical image capturing system are expressed as ITMTF0, ITMTF3, and ITMTF7, respectively. The values of ITMTF0, ITMTF3, and ITMTF7 equal to 0.787, 0.805, and 0.721, respectively. The average focus shift (position) of both of the aforementioned focus shifts of the infrared sagittal ray at the three fields of view and focus shifts of the infrared tangential ray at the three fields of view may be expressed as AIFS (unit of measurement: mm), which is equal to the absolute value of |(ISFS0+ISFS3+ISFS7+ITFS0+ITFS3+ITFS7)/6|=|0.02667 mm|.

The focus shift (difference) between the focal points of the visible light and the focal points of the infrared light at their respective central fields of view (RGB/IR) of the entire optical image capturing system (i.e. wavelength of 850 nm versus wavelength of 555 nm, unit of measurement: mm) may be expressed as FS, which meets the absolute value |(VSFS0+VTFS0)/2−(ISFS0+ITFS0)/2|=|0.025 mm|. The difference (focus shift) between the average focus shift of the visible light at the three fields of view and the average focus shift of the infrared light at the three fields of view (RGB/IR) of the entire optical image capturing system may be expressed as AFS (i.e. wavelength of 850 nm versus wavelength of 555 nm, unit of measurement: mm), which meets the absolute value of |AIFS−AVFS|=|0.02667 mm|.

In the optical image capturing system 10 of the present embodiment, the modulation transfer rates (values of MTF) for the visible light at the spatial frequency of 55 cycles/mm at positions of the optical axis, 0.3 HOI and 0.7 HOI on the first image plane are denoted as MTFE0, MTFE3 and MTFE7 respectively. The following conditions are satisfied: MTFE0 is about 0.84, MTFE3 is about 0.84 and MTFE7 is about 0.75. The modulation transfer rates (values of MTF) for the visible light at the spatial frequency of 110 cycles/mm at positions of the optical axis, 0.3 HOI and 0.7 HOI on the first image plane 190 are respectively denoted as MTFQ0, MTFQ3 and MTFQ7. The following conditions are satisfied: MTFQ0 is about 0.66, MTFQ3 is about 0.65 and MTFQ7 is about 0.51. The modulation transfer rates (values of MTF) for the visible light at the spatial frequency of 220 cycles/mm at positions of the optical axis, 0.3 HOI and 0.7 HOI on the first image plane 190 are respectively denoted as MTFH0, MTFH3 and MTFH7. The following conditions are satisfied: MTFH0 is about 0.17, MTFH3 is about 0.07 and MTFH7 is about 0.14.

In the optical image capturing system 10 of the present embodiment, when the operation wavelength 850 nm focuses on the first image plane 190, the modulation transfer rates (MTF values) with the spatial frequency of 55 cycles/mm where the images are at the optical axis, 0.3 field of view and 0.7 field of view are respectively expressed as MTFI0, MTFI3 and MTFI7. The following conditions are satisfied: MTFI0 is about 0.81, MTFI3 is about 0.8 and MTFI7 is about 0.15.

Please refer to the following Table 1 and Table 2.

TABLE 1

Lens Parameters for the First Embodiment
f(focal length) = 4.075 mm; f/HEP = 1.4;
HAF(half angle of view) = 50.000 deg

| Surface No | | Curvature Radius | Thickness (mm) | Material |
|---|---|---|---|---|
| 0 | Object | Plane | Plane | |
| 1 | First Lens | −40.99625704 | 1.934 | Plastic |
| 2 | | 4.555209289 | 5.923 | |
| 3 | Aperture | Plane | 0.495 | |
| 4 | Second Lens | 5.333427366 | 2.486 | Plastic |
| 5 | | −6.781659971 | 0.502 | |
| 6 | Third Lens | −5.697794287 | 0.380 | Plastic |
| 7 | | −8.883957518 | 0.401 | |
| 8 | Fourth Lens | 13.19225664 | 1.236 | Plastic |
| 9 | | 21.55681832 | 0.025 | |
| 10 | Fifth Lens | 8.987806345 | 1.072 | Plastic |
| 11 | | −3.158875374 | 0.025 | |
| 12 | Sixth Lens | −29.46491425 | 1.031 | Plastic |
| 13 | | 3.593484273 | 2.412 | |
| 14 | IR-bandstop filter | Plane | 0.200 | |
| 15 | | Plane | 1.420 | |
| 16 | First Image Plane | Plane | | |

| Surface No | Refractive Index | Coefficient of Dispersion | Focal Length |
|---|---|---|---|
| 0 | | | |
| 1 | 1.515 | 56.55 | −7.828 |
| 2 | | | |
| 3 | | | |
| 4 | 1.544 | 55.96 | 5.897 |
| 5 | | | |
| 6 | 1.642 | 22.46 | −25.738 |
| 7 | | | |
| 8 | 1.544 | 55.96 | 59.205 |
| 9 | | | |
| 10 | 1.515 | 56.55 | 4.668 |
| 11 | | | |
| 12 | 1.642 | 22.46 | −4.886 |
| 13 | | | |
| 14 | 1.517 | 64.13 | |
| 15 | | | |
| 16 | | | |

Reference Wavelength = 555 nm.
Shield Position: the 1st surface with effective aperture radius = 5.800 min;
the 3rd surface with effective aperture radius = 1.570 mm;
the 5th surface with effective aperture radius = 1.950 mm

TABLE 2

Aspheric Coefficients of the First Embodiment
Table 2: Aspheric Coefficients

| Surface No | 1 | 2 | 4 | 5 |
|---|---|---|---|---|
| k   | 4.310876E+01  | −4.707622E+00 | 2.616025E+00  | 2.445397E+00  |
| A4  | 7.054243E−03  | 1.714312E−02  | −8.377541E−03 | −1.789549E−02 |
| A6  | −5.233264E−04 | −1.502232E−04 | −1.838068E−03 | −3.657520E−03 |
| A8  | 3.077890E−05  | −1.359611E−04 | 1.233332E−03  | −1.131622E−03 |
| A10 | −1.260650E−06 | 2.680747E−05  | −2.390895E−03 | 1.390351E−03  |
| A12 | 3.319093E−08  | −2.017491E−06 | 1.998555E−03  | −4.152857E−04 |
| A14 | −5.051600E−10 | 6.604615E−08  | −9.734019E−04 | 5.487286E−05  |
| A16 | 3.380000E−12  | −1.301630E−09 | 2.478373E−04  | −2.919339E−06 |

| Surface No | 6 | 7 | 8 | 9 |
|---|---|---|---|---|
| k   | 5.645686E+00  | −2.117147E+01 | −5.287220E+00 | 6.200000E+01  |
| A4  | −3.379055E−03 | −1.370959E−02 | −2.937377E−02 | −1.359965E−01 |
| A6  | −1.225453E−03 | 6.250200E−03  | 2.743532E−03  | 6.628518E−02  |
| A8  | −5.979572E−03 | −5.854426E−03 | −2.457574E−03 | −2.129167E−02 |
| A10 | 4.556449E−03  | 4.049451E−03  | 1.874319E−03  | 4.396344E−03  |
| A12 | −1.177175E−03 | −1.314592E−03 | −6.013661E−04 | −5.542899E−04 |
| A14 | 1.370522E−04  | 2.143097E−04  | 8.792480E−05  | 3.768879E−05  |
| A16 | −5.974015E−06 | −1.399894E−05 | −4.770527E−06 | −1.052467E−06 |

| Surface No | 10 | 11 | 12 | 13 |
|---|---|---|---|---|
| k   | −2.114008E+01 | −7.699904E+00 | −6.155476E+01 | −3.120467E−01 |
| A4  | −1.263831E−01 | −1.927804E−02 | −2.492467E−02 | −3.521844E−02 |
| A6  | 6.965399E−02  | 2.478376E−03  | −1.835360E−03 | 5.629654E−03  |
| A8  | −2.116027E−02 | 1.438785E−03  | 3.201343E−03  | −5.466925E−04 |
| A10 | 3.819371E−03  | −7.013749E−04 | −8.990757E−04 | 2.231154E−05  |
| A12 | −4.040283E−04 | 1.253214E−04  | 1.245343E−04  | 5.548990E−07  |
| A14 | 2.280473E−05  | −9.943196E−06 | −8.788363E−06 | −9.396920E−08 |
| A16 | −5.165452E−07 | 2.898397E−07  | 2.494302E−07  | 2.728360E−09  |

Table 1 is the detailed structural data for the first embodiment in FIG. 1A, in which the unit for the curvature radius, the central thickness, the distance, and the focal length is millimeters (mm). Surfaces 0-16 illustrate the surfaces from the object side to the image side in the optical image capturing system. Table 2 shows the aspheric coefficients of the first embodiment, where k is the cone coefficient in the aspheric surface equation, and A1-A20 are respectively the first to the twentieth order aspheric surface coefficients. Furthermore, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
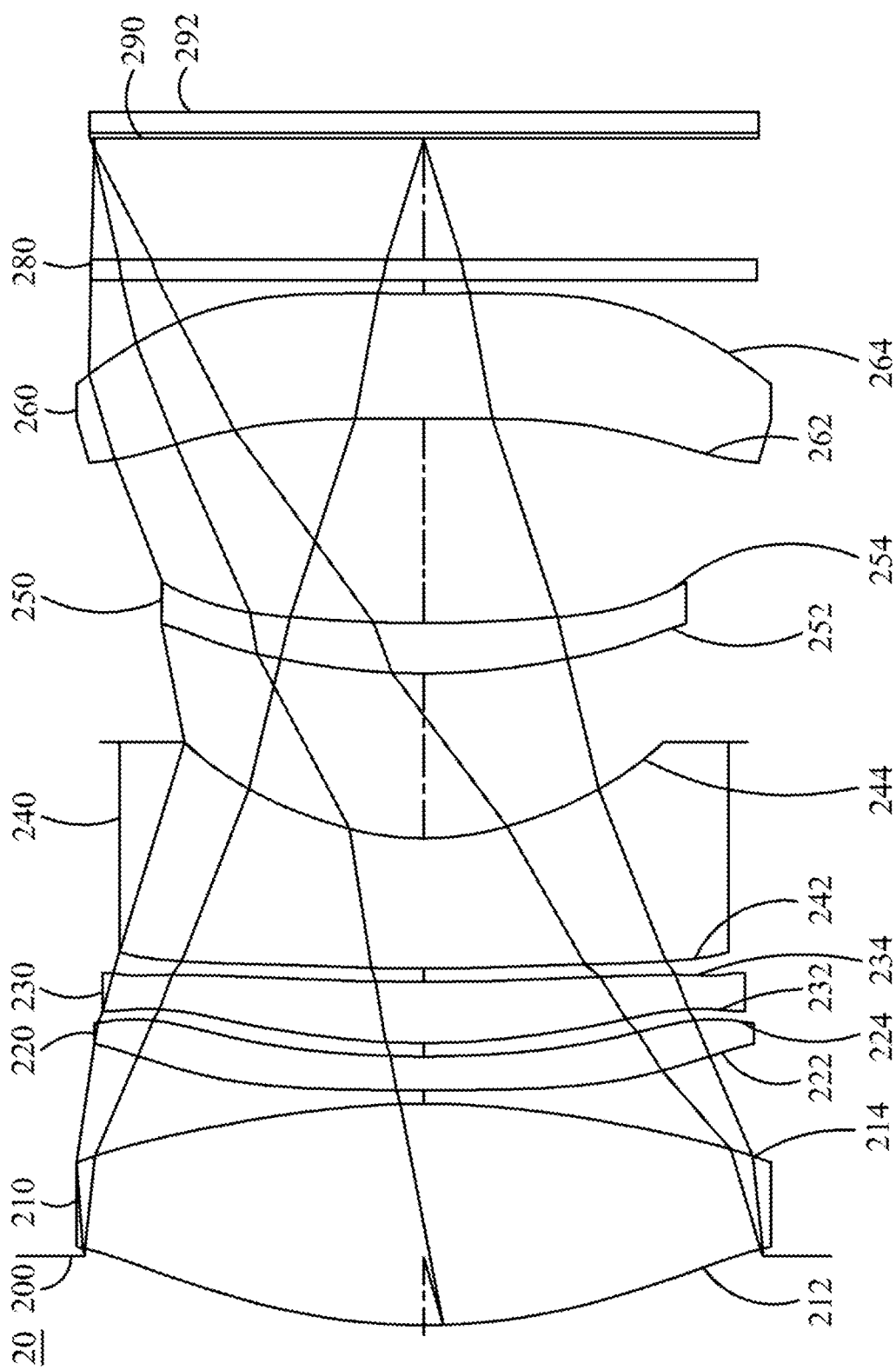
FIG. 2A is a schematic view of the optical image capturing system according to the second embodiment of the present invention.
Figure 2B:
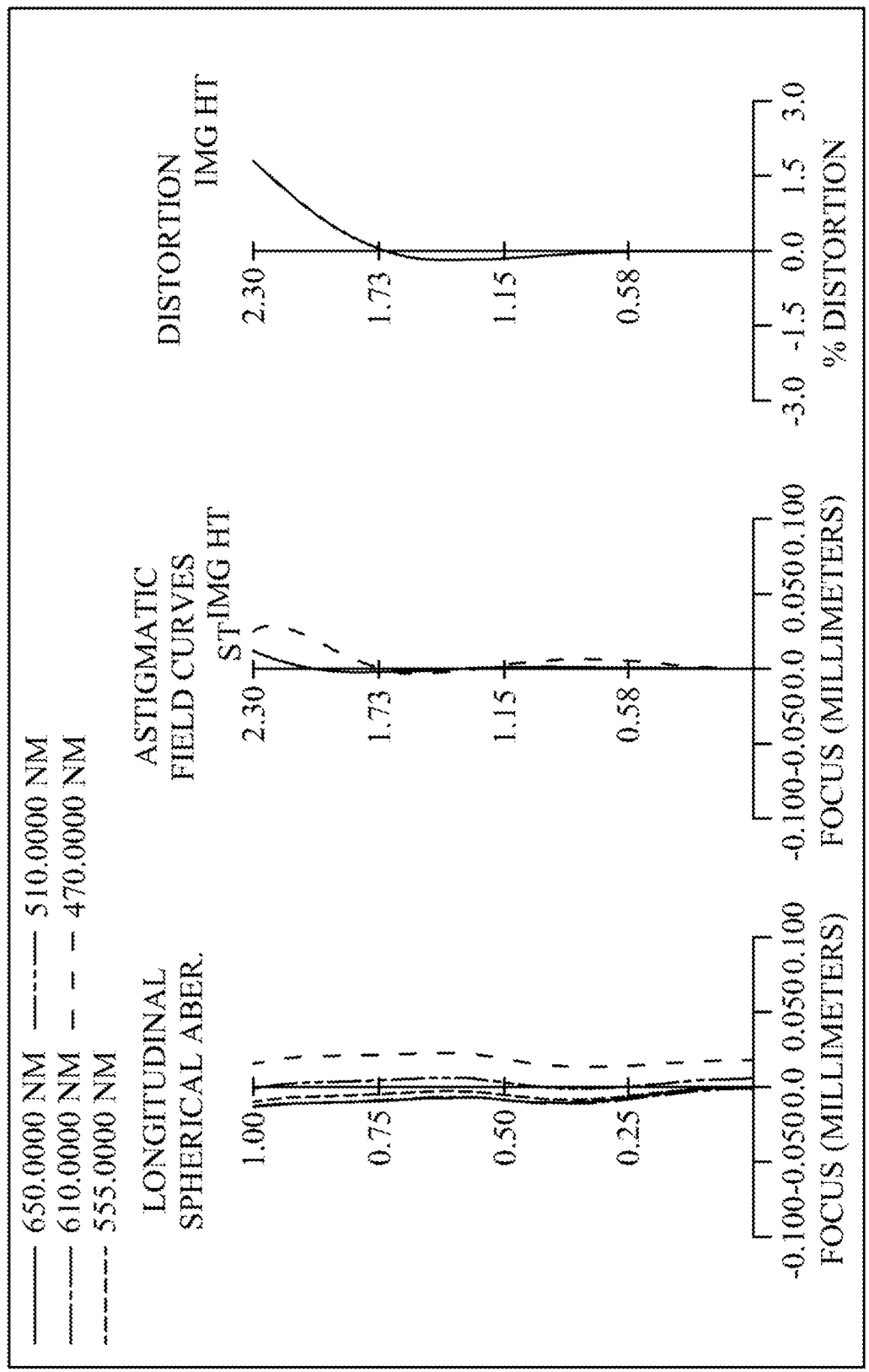
FIG. 2B shows the longitudinal spherical aberration curves, astigmatic field curves, and optical distortion curve of the optical image capturing system in the order from left to right according to the second embodiment of the present invention.
Figure 2C:
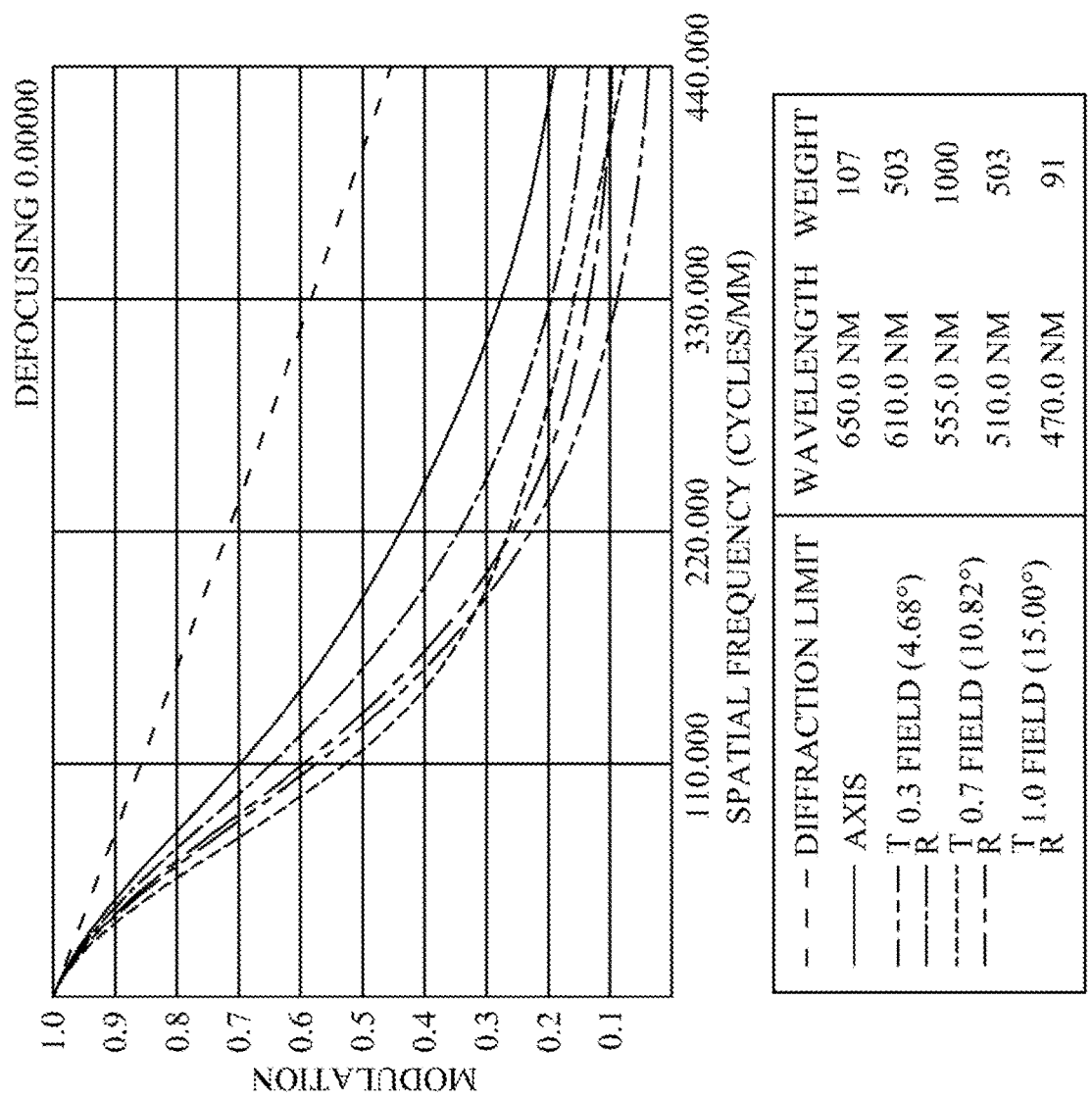
FIG. 2C is a characteristic diagram of modulation transfer of visible light spectrum for the optical image capturing system according to the second embodiment of the present invention.
Figure 2D:
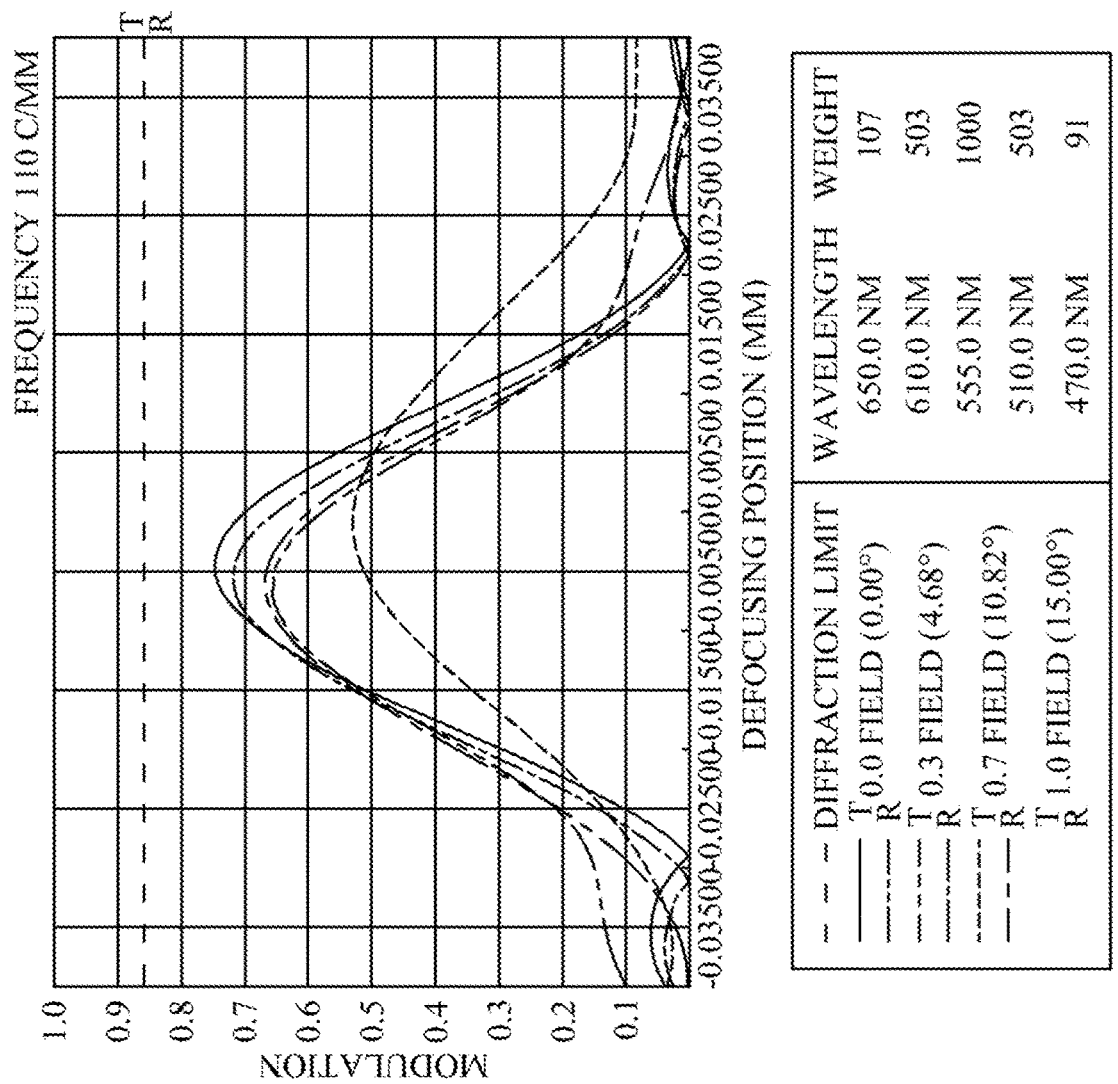
FIG. 2D is a diagram showing the through focus MTF values of the visible light spectrum at the central field of view, 0.3 field of view, and 0.7 field of view of the second embodiment of the present invention.
Figure 2E:
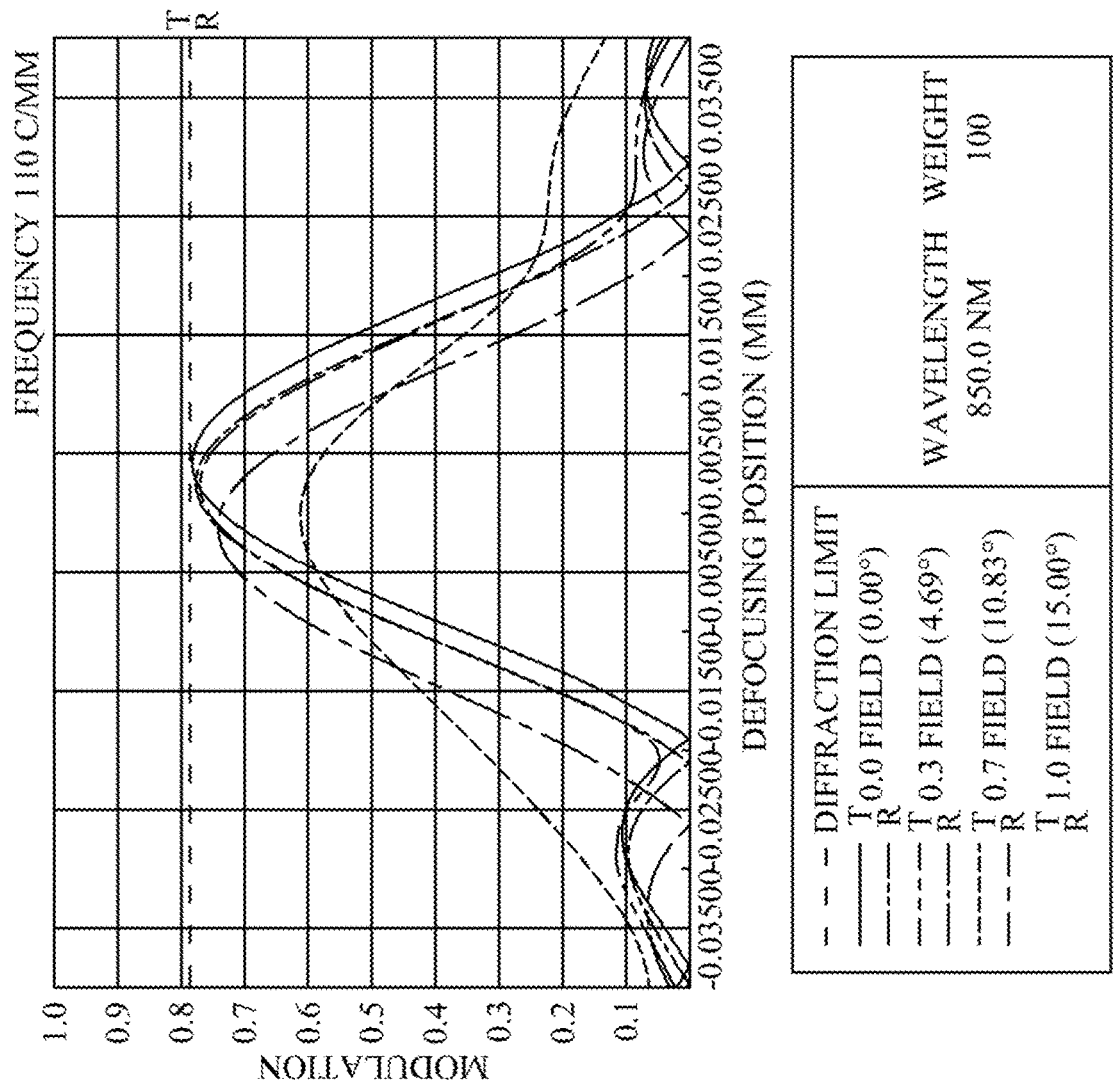
FIG. 2E is a diagram showing the through focus MTF values of the infrared light spectrum at the central field of view, 0.3 field of view, and 0.7 field of view of the second embodiment of the present invention.

Please refer to FIGS. 2A to 2E. Wherein, FIG. 2A is a schematic view of the optical image capturing system according to the second embodiment of the present invention and FIG. 2B shows the longitudinal spherical aberration curves, astigmatic field curves, and the optical distortion curve of the optical image capturing system in the order from left to right according to the second embodiment of the present invention. FIG. 2C is a characteristic diagram of modulation transfer of visible light spectrum for the optical image capturing system according to the second embodiment of the present invention. FIG. 2D is a diagram showing the through focus MTF values of the visible light spectrum at the central field of view, 0.3 field of view, and 0.7 field of view of the second embodiment of the present invention. FIG. 2E is a diagram showing the through focus MTF values of the infrared light spectrum at the central field of view, 0.3 field of view, and 0.7 field of view of the second embodiment of the present invention. As shown in FIG. 2A, in the order from the object side to the image side, the optical image capturing system 20 includes an aperture 200, a first lens 210, a second lens 220, a third lens 230, a fourth lens 240, a fifth lens 250, a sixth lens 260, an IR-bandstop filter 280, a first image plane 290, a second image plane and an image sensing device 292.

The first lens 210 has positive refractive power and is made of plastic. The object side 212 of the first lens 210 is a convex surface and the image side 214 of the first lens 210 is a convex surface, and the object side 212 and the image side 214 of the first lens 210 are both aspheric. The object side 212 of the first lens 210 has one inflection point.

The second lens 220 has negative refractive power and is made of plastic. The object side 222 of the second lens 220 is a convex surface and the image side 224 of the second lens 220 is a concave surface, and the object side 222 and an image side 224 of the second lens 220 are both aspheric. The object side 222 of the second lens 220 has one inflection point. The image side 224 of the second lens 220 has two inflection points.

The third lens 230 has positive refractive power and is made of plastic. The object side 232 of the third lens 230 is a convex surface and the image side 234 of the third lens 230 is a concave surface, and the object side 232 and an image side 234 of the third lens 230 are both aspheric. Both of the object side 232 and the image side 234 of the third lens 230 have one inflection point.

The fourth lens 240 has negative refractive power and is made of plastic. The object side 242 of the fourth lens 240 is a concave surface and the image side 244 of the fourth lens 240 is a concave surface, and the object side 242 and an image side 244 of the fourth lens 240 are both aspheric. The object side 242 of the fourth lens 240 has one inflection point.

The fifth lens 250 has positive refractive power and is made of plastic. The object side 252 of the fifth lens 250 is a concave surface and the image side 254 of the fifth lens 250 is a concave surface, and the object side 252 and an image side 254 of the fifth lens 250 are both aspheric. Both of the object side 252 and the image side 254 of the fifth lens 250 have one inflection point.

The sixth lens 260 has negative refractive power and is made of plastic. The object side 262 of the sixth lens 260 is a convex surface and the image side 264 of the sixth lens 260 is a concave surface, and the object side 262 and an image side 264 of the sixth lens 260 are both aspheric. The object side 262 of the sixth lens 260 has two inflection points and the image side 264 of the sixth lens 260 has one inflection point. Hereby, this configuration is beneficial to shorten the back focal length of the optical image capturing system 20 so as to keep its miniaturization. Furthermore, the incident angle of the off-axis rays can be reduced effectively, thereby further correcting the off-axis aberration.

The IR-bandstop filter 280 is made of glass and is disposed between the sixth lens 260 and the first image plane 290. The IR-bandstop filter 280 does not affect the focal length of the optical image capturing system 20.

Please refer to the following Table 3 and Table 4.

TABLE 3

Lens Parameters for the second Embodiment
f(focal length) = 8.433 mm; f/HEP = 1.8;
HAF(half angle of view) = 14.998 deg

| Surface No | | Curvature Radius | Thickness (mm) | Material |
|---|---|---|---|---|
| 0 | Object | 1E+18 | 1E+18 | |
| 1 | Aperture | 1E+18 | −0.510 | |
| 2 | First Lens | 4.032372011 | 1.641 | plastic |
| 3 | | −4.943169512 | 0.100 | |
| 4 | Second Lens | 30.08652466 | 0.250 | plastic |
| 5 | | 6.130519049 | 0.100 | |
| 6 | Third Lens | 4.614268304 | 0.453 | plastic |
| 7 | | 11.65356399 | 0.101 | |
| 8 | Fourth Lens | 11.61046387 | 0.965 | plastic |
| 9 | | 1.816830157 | 1.223 | |
| 10 | Fifth Lens | 4.232584591 | 0.374 | plastic |
| 11 | | 9.746939812 | 1.513 | |
| 12 | Sixth Lens | 276.7080613 | 0.928 | plastic |
| 13 | | 23.25193725 | 0.103 | |
| 14 | IR-bandstop filter | 1E+18 | 0.150 | BK_7 |
| 15 | | 1E+18 | 0.900 | |
| 16 | First Image Plane | 1E+18 | 0.000 | |

| Surface No | Refractive Index | Coefficient of Dispersion | Focal Length |
|---|---|---|---|
| 0 | | | |
| 1 | | | |
| 2 | 1.544 | 56.064 | 4.349 |
| 3 | | | |
| 4 | 1.544 | 56.064 | −14.157 |
| 5 | | | |
| 6 | 1.544 | 56.064 | 13.683 |
| 7 | | | |
| 8 | 1.661 | 20.381 | −3.363 |
| 9 | | | |
| 10 | 1.661 | 20.381 | 10.923 |
| 11 | | | |
| 12 | 1.661 | 20.381 | −38.126 |
| 13 | | | |
| 14 | 1.517 | 64.13 | |
| 15 | | | |
| 16 | | | |

Reference Wavelength = 555 nm

TABLE 4

The Aspheric Coefficients of the Second Embodiment
Table 4: Aspheric Coefficients

| Surface No | 2 | 3 | 4 | 5 |
|---|---|---|---|---|
| k | −9.218654E−01 | 0.000000E+00 | 0.000000E+00 | 0.000000E+00 |
| A4 | −1.063586E−03 | 1.352583E−02 | 8.206427E−03 | −2.077678E−02 |
| A6 | −7.044144E−04 | −1.696290E−03 | 5.471545E−03 | 1.994433E−02 |
| A8 | 1.121801E−04 | 6.924835E−05 | −1.538742E−03 | −5.883000E−03 |
| A10 | −1.437504E−05 | −2.634380E−06 | 1.034751E−04 | 4.908446E−04 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

| Surface No | 6 | 7 | 8 | 9 |
|---|---|---|---|---|
| k | 8.240598E−01 | −1.817178E+00 | −3.373903E+01 | −3.592527E−01 |
| A4 | −3.102743E−02 | −2.418131E−02 | −2.257133E−02 | −4.625253E−02 |
| A6 | 1.971609E−02 | 1.342379E−02 | 1.017800E−02 | 1.295169E−02 |
| A8 | −6.185006E−03 | −3.976645E−03 | −2.158688E−03 | −2.977482E−03 |
| A10 | 5.757907E−04 | 4.146242E−04 | 2.067929E−04 | 4.257315E−04 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

| Surface No | 10 | 11 | 12 | 13 |
|---|---|---|---|---|
| k | −9.385287E+00 | −1.585015E+01 | −8.999857E+01 | −6.174122E+01 |
| A4 | 3.261583E−03 | −1.659178E−03 | −3.525877E−02 | −4.398927E−02 |
| A6 | −3.526946E−03 | −1.137652E−03 | 3.228536E−03 | 4.858702E−03 |
| A8 | 3.859023E−03 | 4.641747E−03 | 5.622077E−04 | −2.355197E−04 |

TABLE 4-continued

The Aspheric Coefficients of the Second Embodiment
Table 4: Aspheric Coefficients

| | | | | |
|---|---|---|---|---|
| A10 | −7.532217E−04 | −8.709942E−04 | −6.380997E−05 | 1.957520E−06 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

In the second embodiment, the presentation of the aspheric surface equation is similar to that in the first embodiment. Furthermore, the definitions of parameters in following tables are similar to those in the first embodiment, so the repetitive details will not be given here.

The following values for the conditions can be obtained from the data in Table 3 and Table 4.

| Second Embodiment ( Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.88 | 0.85 | 0.8 | 0.7 | 0.58 | 0.53 |
| ETP1 | ETP2 | ETP3 | ETP4 | ETP5 | ETP6 |
| 1.103 | 0.327 | 0.275 | 1.623 | 0.283 | 0.912 |
| ETP1/TP1 | ETP2/TP2 | ETP3/TP3 | ETP4/TP4 | ETP5/TP5 | ETP6/TP6 |
| 0.673 | 1.309 | 0.607 | 1.682 | 0.755 | 0.982 |
| ETL | EBL | EIN | EIR | PIR | EIN/ETL |
| 8.478 | 1.341 | 7.137 | 0.291 | 0.103 | 0.842 |
| SETP/EIN | EIR/PIR | SETP | STP | SETP/STP | BL |
| 0.634 | 2.831 | 4.523 | 4.611 | 0.981 | 1.153 |
| ED12 | ED23 | ED34 | ED45 | ED56 | EBL/BL |
| 0.464 | 0.104 | 0.102 | 0.822 | 1.122 | 1.1631 |
| SED | SIN | SED/SIN | ED12/ED23 | ED23/ED34 | ED34/ED45 |
| 2.614 | 3.036 | 0.861 | 4.479 | 1.012 | 0.124 |
| ED12/IN12 | ED23/IN23 | ED34/IN34 | ED45/IN45 | ED56/IN56 | ED45/ED56 |
| 4.638 | 1.035 | 1.016 | 0.672 | 0.742 | 0.732 |
| \| f/f1 \| | \| f/f2 \| | \| f/f3 \| | \| f/f4 \| | \| f/f5 \| | \| f/f6 \| |
| 1.93910 | 0.59570 | 0.61633 | 2.50789 | 0.77206 | 0.22120 |
| ΣPPR | ΣNPR | ΣPPR/ \|ΣNPR\| | IN12/f | IN56/f | TP4/ (IN34 + TP4 + IN45) |
| 5.83537 | 0.81689 | 7.14336 | 0.01186 | 0.17935 | 0.42162 |
| \| f1/f2 \| | \| f2/f3 \| | (TP1 + IN12)/TP2 | | (TP6 + IN56)/TP5 | |
| 0.30720 | 1.03463 | 6.96134 | | 6.51841 | |
| HOS | InTL | HOS/HOI | InS/HOS | ODT % | TDT % |
| 8.80013 | 7.64748 | 3.82614 | 0.94210 | 1.79850 | 1.99805 |
| HVT51 | HVT52 | HVT61 | HVT62 | HVT62/HOI | HVT62/HOS |
| 0 | 0 | 0.16037 | 0.50136 | 0.21798 | 0.05697 |
| TP2/TP3 | TP3/TP4 | InRS61 | InRS62 | \| InRS61 \|/TP6 | \| InRS62 \|/TP6 |
| 0.55207 | 0.46939 | −0.30152 | −0.60049 | 0.32485 | 0.64695 |
| PSTA | PLTA | NSTA | NLTA | SSTA | SLTA |
| −0.003 mm | −0.003 mm | −0.005 mm | −0.006 mm | 0.009 mm | 0.001 mm |
| VSFS0 | VSFS3 | VSFS7 | VTFS0 | VTFS3 | VTFS7 |
| −0.005 | −0.005 | −0.005 | −0.005 | −0.005 | −0.000 |
| VSMTF0 | VSMTF3 | VSMTF7 | VTMTF0 | VTMTF3 | VTMTF7 |
| 0.748 | 0.718 | 0.666 | 0.748 | 0.654 | 0.529 |
| ISFS0 | ISFS3 | ISFS7 | ITFS0 | ITFS3 | ITFS7 |
| 0.005 | −0.000 | −0.000 | 0.005 | −0.000 | −0.000 |
| ISMTF0 | ISMTF3 | ISMTF7 | ITMTF0 | ITMTF3 | ITMTF7 |
| 0.781 | 0.761 | 0.739 | 0.781 | 0.756 | 0.612 |
| FS | AIFS | AVFS | AFS | | |
| 0.010 | 0.002 | −0.004 | 0.006 | | |
| IN12 | IN23 | IN34 | IN45 | IN56 | TP1 |
| 0.100 mm | 0.100 mm | 0.101 mm | 1.223 mm | 1.513 mm | 1.641 mm |

The following values about the length of the outline curve can be obtained from the data in Table 3 and Table 4.

| Values Related to Inflection Point of Second Embodiment (Primary Reference Wavelength = 555 nm) | | | | | | |
|---|---|---|---|---|---|---|
| HIF111 | 1.9142 | HIF111/HOI | 0.8323 | SGI111 | 0.4182 | \|SGI111\|/(\|SGI111\| + TP1) | 0.2031 |
| HIF211 | 1.9430 | HIF211/HOI | 0.8448 | SGI211 | 0.2409 | \|SGI211\|/(\|SGI211\| + TP2) | 0.4907 |

Values Related to Inflection Point of Second Embodiment
(Primary Reference Wavelength = 555 nm)

| | | | | | | | |
|---|---|---|---|---|---|---|---|
| HIF221 | 1.5160 | HIF221/HOI | 0.6591 | SGI221 | 0.1901 | \|SGI221\|/(\|SGI221\| + TP2) | 0.4319 |
| HIF222 | 2.2090 | HIF222/HOI | 0.9604 | SGI222 | 0.2569 | \|SGI222\|/(\|SGI222\| + TP2) | 0.5068 |
| HIF311 | 1.3874 | HIF311/HOI | 0.6032 | SGI311 | 0.1739 | \|SGI311\|/(\|SGI311\| + TP3) | 0.2775 |
| HIF312 | 2.0798 | HIF312/HOI | 0.9042 | SGI312 | 0.2445 | \|SGI312\|/(\|SGI312\| + TP3) | 0.3506 |
| HIF321 | 1.1839 | HIF321/HOI | 0.5147 | SGI321 | 0.0364 | \|SGI321\|/(\|SGI321\| + TP3) | 0.0743 |
| HIF322 | 1.8502 | HIF322/HOI | 0.8044 | SGI322 | 0.0501 | \|SGI322\|/(\|SGI322\| + TP3) | 0.0996 |
| HIF411 | 0.7021 | HIF411/HOI | 0.3053 | SGI411 | 0.0162 | \|SGI411\|/(\|SGI411\| + TP4) | 0.0166 |
| HIF412 | 1.0669 | HIF412/HOI | 0.4639 | SGI412 | 0.0286 | \|SGI412\|/(\|SGI412\| + TP4) | 0.0288 |
| HIF511 | 1.6568 | HIF511/HOI | 0.7203 | SGI511 | 0.3115 | \|SGI511\|/(\|SGI511\| + TP5) | 0.4542 |
| HIF521 | 1.7822 | HIF521/HOI | 0.7749 | SGI521 | 0.2842 | \|SGI521\|/(\|SGI521\| + TP5) | 0.4315 |
| HIF611 | 0.0924 | HIF611/HOI | 0.0402 | SGI611 | 0.0000 | \|SGI611\|/(\|SGI611\| + TP6) | 0.0000 |
| HIF612 | 1.7388 | HIF612/HOI | 0.7560 | SGI612 | −0.1967 | \|SGI612\|/(\|SGI612\| + TP6) | 0.1749 |
| HIF621 | 0.2868 | HIF621/HOI | 0.1247 | SGI621 | 0.0015 | \|SGI621\|/(\|SGI621\| + TP6) | 0.0016 |

Third Embodiment

Figure 3A:
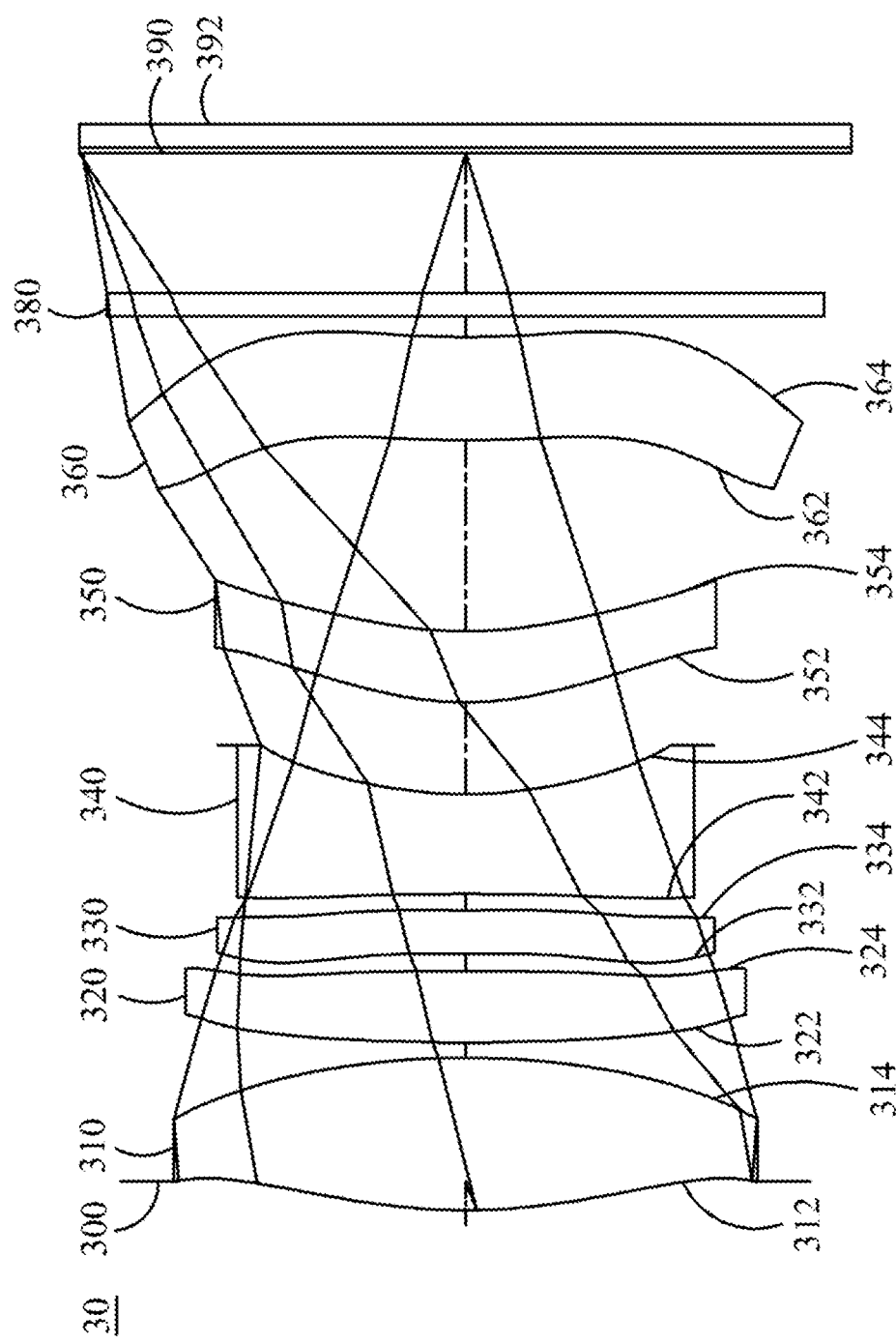
FIG. 3A is a schematic view of the optical image capturing system according to the third embodiment of the present invention.
Figure 3B:
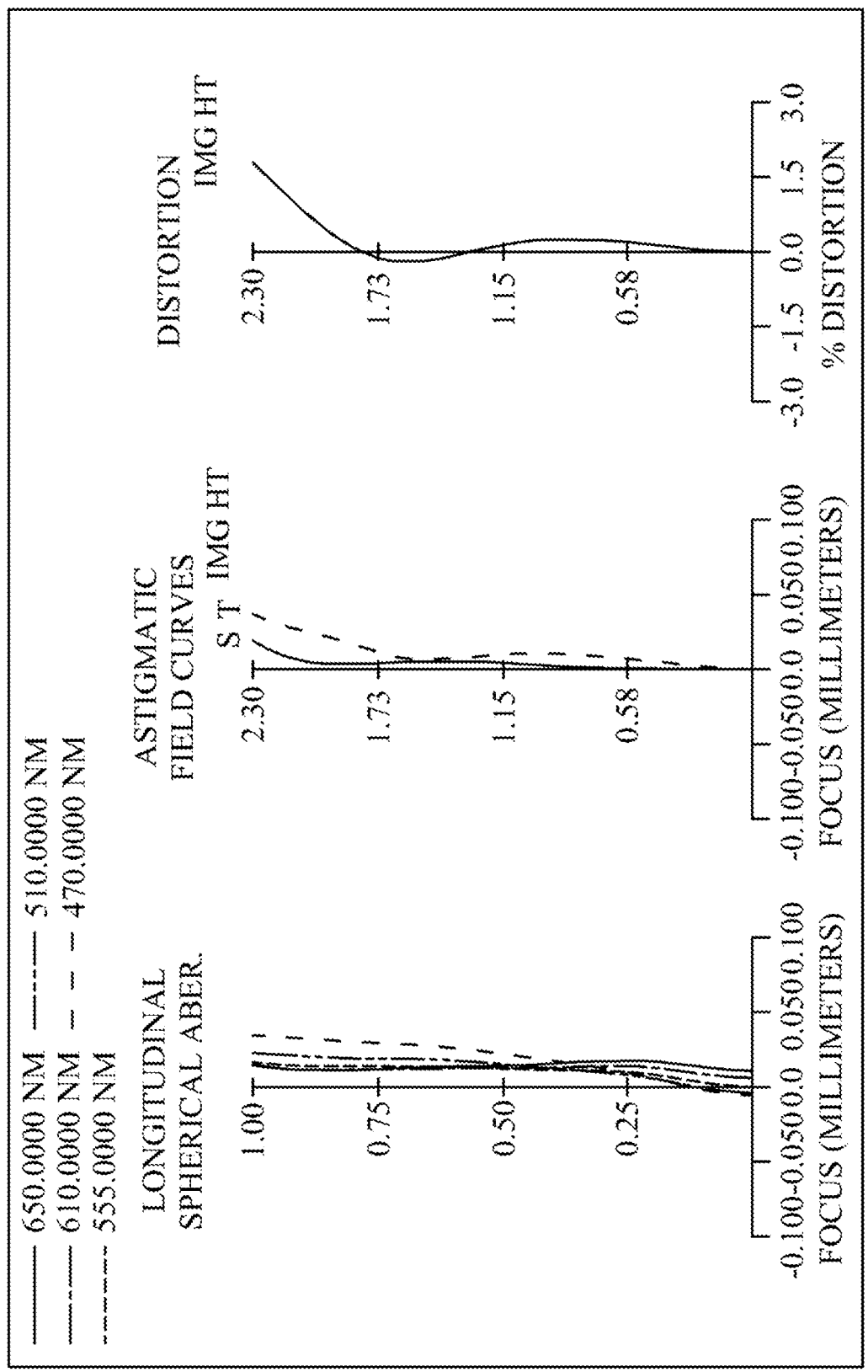
FIG. 3B shows the longitudinal spherical aberration curves, astigmatic field curves, and optical distortion curve of the optical image capturing system in the order from left to right according to the third embodiment of the present invention.
Figure 3C:
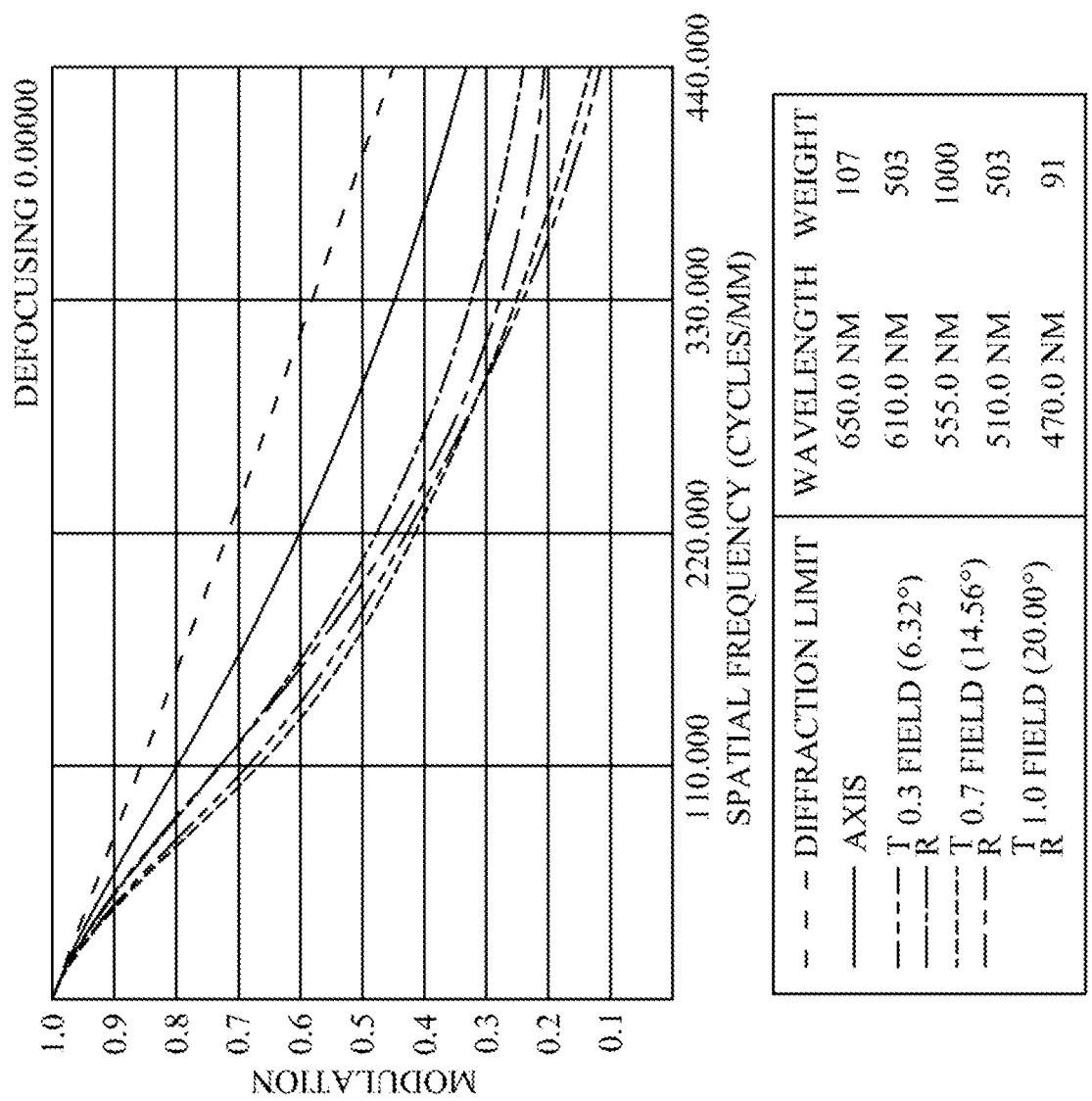
FIG. 3C is a characteristic diagram of modulation transfer of visible light spectrum for the optical image capturing system according to the third embodiment of the present invention.
Figure 3D:
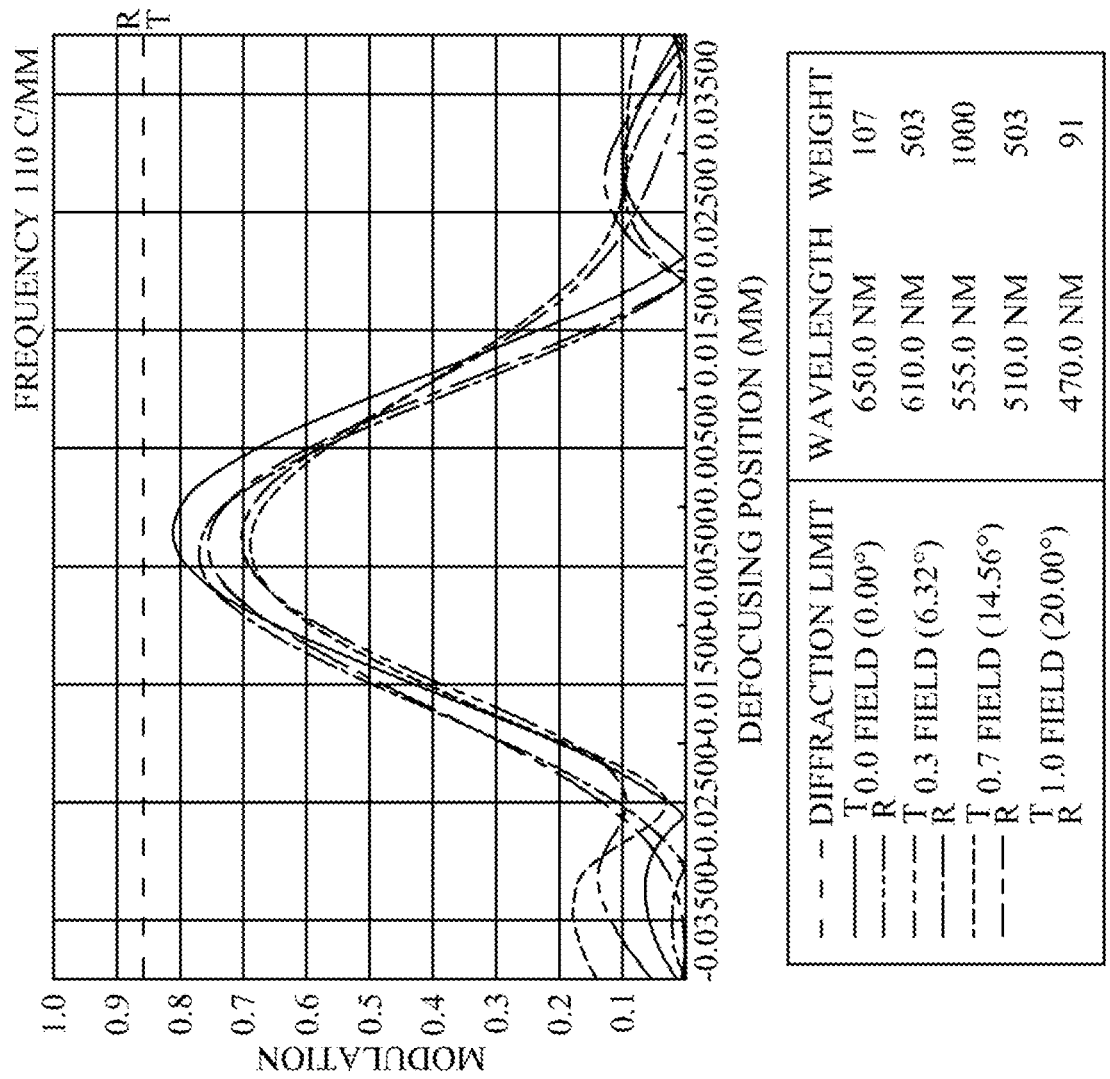
FIG. 3D is a diagram showing the through focus MTF values of the visible light spectrum at the central field of view, 0.3 field of view, and 0.7 field of view of the third embodiment of the present invention.
Figure 3E:
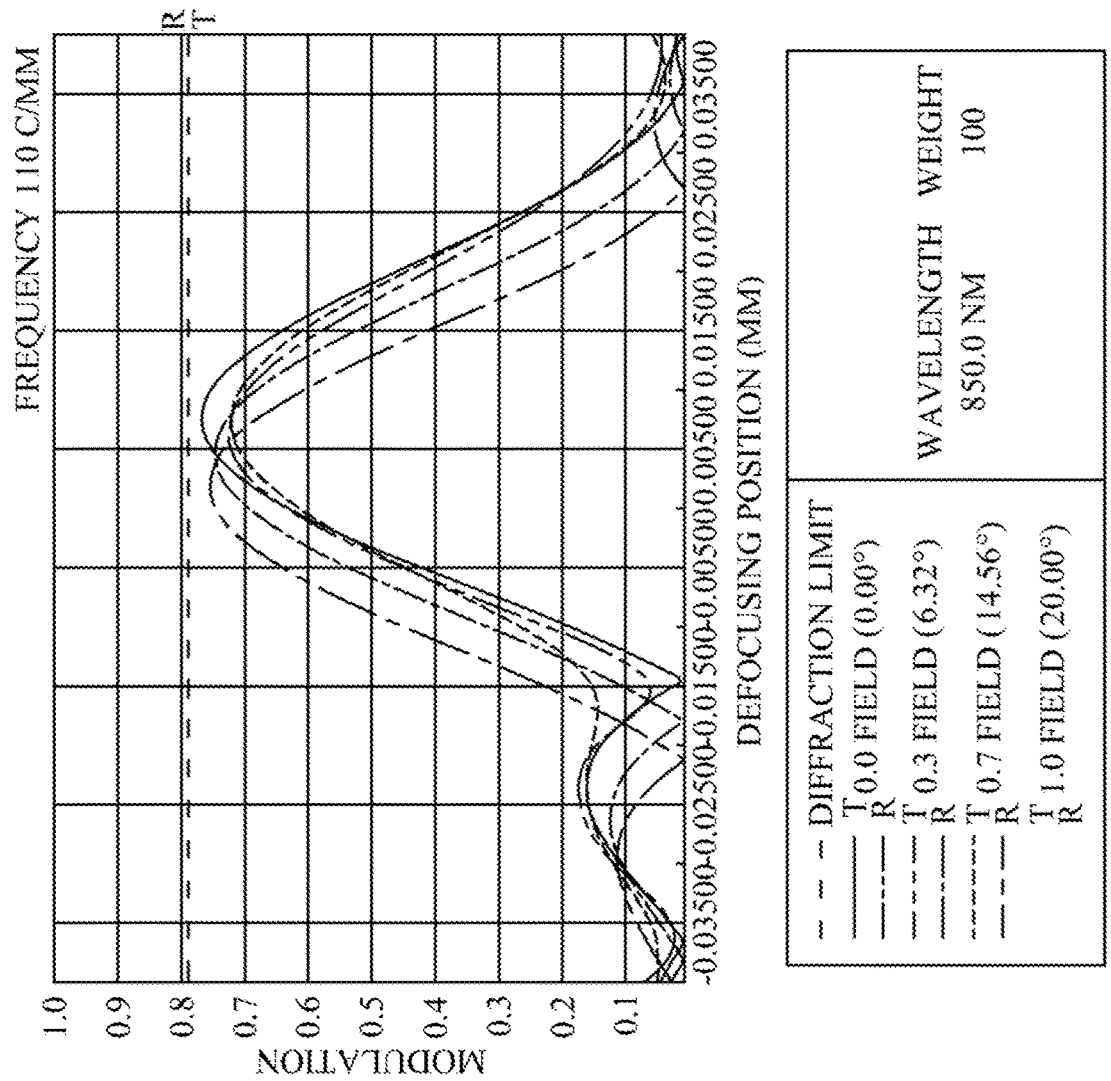
FIG. 3E is a diagram showing the through focus MTF values of the infrared light spectrum at the central field of view, 0.3 field of view, and 0.7 field of view of the third embodiment of the present invention.

Please refer to FIGS. 3A to 3E. FIG. 3A is a schematic view of the optical image capturing system according to the third embodiment of the present invention. FIG. 3B shows the longitudinal spherical aberration curves, astigmatic field curves, and optical distortion curve of the optical image capturing system, in the order from left to right, according to the third embodiment of the present invention. FIG. 3C is a characteristic diagram of modulation transfer of visible light spectrum for the optical image capturing system according to the third embodiment of the present invention. FIG. 3D is a diagram showing the through focus MTF values of the visible light spectrum at the central field of view, 0.3 field of view, and 0.7 field of view of the third embodiment of the present invention. FIG. 3E is a diagram showing the through focus MTF values of the infrared light spectrum at the central field of view, 0.3 field of view, and 0.7 field of view of the third embodiment of the present invention. As shown in FIG. 3A, in the order from the object side to the image side, the optical image capturing system 30 includes an aperture 300, a first lens 310, a second lens 320, a third lens 330, a fourth lens 340, a fifth lens 350, a sixth lens 360, an IR-bandstop filter 380, a first image plane 390, a second image plane and an image sensing device 392.

The first lens 310 has positive refractive power and is made of plastic. The object side 312 of the first lens 310 is a convex surface and the image side 314 of the first lens 310 is a convex surface, and the object side 312 and the image side 314 of the first lens 310 are both aspheric. The object side 312 of the first lens 310 has one inflection point.

The second lens 320 has positive refractive power and is made of plastic. The object side 322 of the second lens 320 is a convex surface and the image side 324 of the second lens 320 is a concave surface, and the object side 322 and the image side 324 of the second lens 320 are both aspheric. The image side 324 of the second lens 320 has three inflection points.

The third lens 330 has negative refractive power and is made of plastic. The object side 332 of the third lens 330 is a convex surface and the image side 334 of the third lens 330 is a concave surface, and the object side 332 and the image side 334 of the third lens 330 are both aspheric. Both of the object side 332 and the image side 334 of the third lens 330 have three inflection points.

The fourth lens 340 has negative refractive power and is made of plastic. The object side 342 of the fourth lens 340 is a concave surface and the image side 344 of the fourth lens 340 is a concave surface, and the object side 342 and the image side 344 of the fourth lens 340 are both aspheric. The object side 342 of the fourth lens 340 has one inflection point.

The fifth lens 350 has positive refractive power and is made of plastic. The object side 352 of the fifth lens 350 is a convex surface and the image side 354 of the fifth lens 350 is a concave surface, and the object side 352 and an image side 354 of the fifth lens 350 are both aspheric. Both of the object side 352 and the image side 354 of the fifth lens 350 have one inflection point.

The sixth lens 360 has negative refractive power and is made of plastic. The object side 362 of the sixth lens 360 is a convex surface and the image side 364 of the sixth lens 360 is a concave surface, and the object side 362 and the image side 364 of the sixth lens 360 are both aspheric. Both of the object side 362 and the image side 364 of the sixth lens 360 have two inflection points. Hereby, this configuration is beneficial to shorten the back focal length of the optical image capturing system 30 so as to keep its miniaturization. Furthermore, the incident angle of the off-axis rays can be reduced effectively, thereby further correcting the off-axis aberration.

The IR-bandstop filter 380 is made of glass and is disposed between the sixth lens 360 and the first image plane 390, without affecting the focal length of the optical image capturing system 30.

Please refer to the following Table 5 and Table 6.

TABLE 5

Lens Parameter for the Third Embodiment
f(focal length) = 6.194 mm; f/HEP = 1.8;
HAF(angle of view) = 19.998 deg

| Surface No. | | Curvature Radius | Thickness (mm) | Material |
|---|---|---|---|---|
| 0 | Object | 1E+18 | 1E+18 | |
| 1 | Aperture | 1E+18 | −0.185 | |
| 2 | First Lens | 3.489279107 | 0.979 | Plastic |
| 3 | | −5.192754639 | 0.100 | |
| 4 | Second Lens | 15.31598001 | 0.458 | Plastic |
| 5 | | 338.1211332 | 0.115 | |
| 6 | Third Lens | 97.88569069 | 0.278 | Plastic |
| 7 | | 17.00354531 | 0.105 | |
| 8 | Fourth lens | −37.07685367 | 0.642 | Plastic |
| 9 | | 2.413001571 | 0.592 | |
| 10 | Fifth Lens | 1.780997631 | 0.456 | Plastic |
| 11 | | 2.320721233 | 1.230 | |
| 12 | Sixth Lens | 5.669819343 | 0.662 | Plastic |
| 13 | | 4.353910753 | 0.134 | |
| 14 | IR-bandstop Filter | 1E+18 | 0.150 | |
| 15 | | 1E+18 | 0.900 | BK_7 |
| 16 | First Image Plane | 1E+18 | 0.000 | |

TABLE 5-continued

Lens Parameter for the Third Embodiment
f(focal length) = 6.194 mm; f/HEP = 1.8;
HAF(angle of view) = 19.998 deg

| Surface No. | Refractive Index | Coefficient of Dispersion | Focal Length |
|---|---|---|---|
| 0 | | | |
| 1 | | | |
| 2 | 1.544 | 56.064 | 3.982 |
| 3 | | | |
| 4 | 1.544 | 56.064 | 29.374 |
| 5 | | | |
| 6 | 1.515 | 56.524 | −39.907 |
| 7 | | | |
| 8 | 1.661 | 20.381 | −3.376 |
| 9 | | | |
| 10 | 1.661 | 20.381 | 8.582 |
| 11 | | | |
| 12 | 1.661 | 20.381 | −35.225 |
| 13 | | | |
| 14 | | | |
| 15 | 1.517 | 64.13 | |
| 16 | | | |

Reference Wavelength = 555 nm. Shield Position: the 5th surface with effective aperture radius = 1.680 mm, the 13th surface with effective aperture radius = 2.020 mm

TABLE 6

The Aspheric Coefficients of the Third Embodiment
Table 6: Aspheric Coefficients

| | Surface No. | | | |
|---|---|---|---|---|
| | 2 | 3 | 4 | 5 |
| k | −3.716989E+00 | 0.000000E+00 | 0.000000E+00 | 0.000000E+00 |
| A4 | −4.454170E−03 | −1.194519E−02 | −2.029977E−03 | −9.658090E−02 |
| A6 | −5.842689E−03 | 3.586089E−03 | 1.254927E−02 | 1.394468E−01 |
| A8 | 7.431128E−04 | −1.838788E−03 | −8.443153E−03 | −1.173873E−01 |
| A10 | −8.559934E−04 | 5.610645E−04 | 2.679531E−03 | 6.194715E−02 |
| A12 | 3.691830E−04 | −8.553736E−05 | 1.939558E−04 | −1.647183E−02 |
| A14 | −5.058423E−05 | 3.923236E−07 | −1.523931E−04 | 1.631743E−03 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

| | Surface No. | | | |
|---|---|---|---|---|
| | 6 | 7 | 8 | 9 |
| k | 0.000000E+00 | 0.000000E+00 | 0.000000E+00 | 4.030971E−01 |
| A4 | −2.383577E−01 | −2.201616E−01 | −6.681552E−02 | −8.109607E−02 |
| A6 | 3.255148E−01 | 2.767975E−01 | 1.101097E−01 | 1.173137E−01 |
| A8 | −2.338299E−01 | −1.787389E−01 | −8.492206E−02 | −1.161379E−01 |
| A10 | 1.104950E−01 | 7.088794E−02 | 3.908424E−02 | 7.326798E−02 |
| A12 | −2.914672E−02 | −1.675101E−02 | −9.876992E−03 | −2.443947E−02 |
| A14 | 3.071573E−03 | 1.740979E−03 | 1.055662E−03 | 3.654401E−03 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

| | Surface No. | | | |
|---|---|---|---|---|
| | 10 | 11 | 12 | 13 |
| k | −4.513458E+00 | −1.088150E+01 | −4.634243E+01 | −2.228197E+01 |
| A4 | −2.875849E−02 | 7.770381E−03 | −7.742246E−02 | −7.955188E−02 |
| A6 | 2.037730E−02 | −1.617408E−02 | 7.879425E−03 | 1.427465E−02 |
| A8 | −8.462383E−03 | 2.282690E−02 | −4.210610E−03 | −6.620988E−03 |
| A10 | −9.137372E−04 | −1.530474E−02 | 2.253192E−03 | 2.568072E−03 |
| A12 | 1.483481E−03 | 5.366155E−03 | −1.549355E−04 | −5.015400E−04 |
| A14 | −3.391173E−04 | −7.632658E−04 | −2.347052E−05 | 4.104507E−05 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

In the third embodiment, the presentation of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 5 and Table 6.

| Third Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.93 | 0.87 | 0.86 | 0.8 | 0.69 | 0.67 |
| ETP1 | ETP2 | ETP3 | ETP4 | ETP5 | ETP6 |
| 0.589 | 0.355 | 0.269 | 1.061 | 0.405 | 0.706 |
| ETP1/TP1 | ETP2/TP2 | ETP3/TP3 | ETP4/TP4 | ETP5/TP5 | ETP6/TP6 |
| 0.602 | 0.775 | 0.967 | 1.653 | 0.889 | 1.066 |
| ETL | EBL | EIN | EIR | PIR | EIN/ETL |
| 6.613 | 1.239 | 5.373 | 0.189 | 0.134 | 0.813 |
| SETP/EIN | EIR/PIR | SETP | STP | SETP/STP | BL |
| 0.630 | 1.413 | 3.385 | 3.475 | 0.974 | 1.184 |
| ED12 | ED23 | ED34 | ED45 | ED56 | EBL/BL |
| 0.385 | 0.098 | 0.127 | 0.513 | 0.865 | 1.0465 |
| | | | | ED12/ED23/ | |
| SED | SIN | SED/SIN | ED23 | ED34 | ED34/ED45 |
| 1.988 | 2.141 | 0.929 | 3.916 | 0.774 | 0.248 |
| ED12/ | ED23/ | ED34/ | ED45/ | ED56/ | ED45/ |
| IN12 | IN23 | IN34 | IN45 | IN56 | ED56 |
| 3.851 | 0.855 | 1.216 | 0.867 | 0.703 | 0.593 |
| \|f/f1\| | \|f/f2\| | \|f/f3\| | \|f/f4\| | \|f/f5\| | \|f/f6\| |
| 1.55552 | 0.21085 | 0.15520 | 1.83477 | 0.72167 | 0.17583 |
| ΣPPR/ | | | | | TP4/(IN34 + |

| Third Embodiment (Primary Reference Wavelength = 555 nm) | | | | | |
|---|---|---|---|---|---|
| ΣPPR | ΣNPR | \|ΣNPR\| | IN12/f | IN56/f | TP4 + IN45) |
| 4.26715 | 0.38668 | 11.03534 | 0.01615 | 0.19853 | 0.47956 |
| \|f1/f2\| | \|f2/f3\| | (TP1 + IN12)/TP2 | | (TP6 + IN56)/TP5 | |
| 0.13555 | 0.73608 | 2.35616 | | 4.14648 | |
| HOS | InTL | HOS/HOI | InS/HOS | ODT % | TDT % |
| 6.80000 | 5.61607 | 2.95652 | 0.97285 | 1.80053 | 2.00641 |
| | | | | HVT62/ | |
| HVT51 | HVT52 | HVT61 | HVT62 | HOI | HVT62/HOS |
| 0 | 0 | 0.68388 | 0.79275 | 0.34467 | 0.11658 |
| | | | | \|InRS61\|/ | \|InRS62\|/ |
| TP2/TP3 | TP3/TP4 | InRS61 | InRS62 | TP6 | TP6 |
| 1.64954 | 0.43254 | −0.31153 | −0.54843 | 0.47045 | 0.82821 |
| PSTA | PLTA | NSTA | NLTA | SSTA | SLTA |
| −0.008 mm | −0.008 mm | −0.002 mm | −0.003 mm | 0.007 mm | −0.0004 mm |
| VSFS0 | VSFS3 | VSFS7 | VTFS0 | VTFS3 | VTFS7 |
| −0.003 | −0.005 | −0.003 | −0.003 | −0.003 | −0.003 |
| VSMTF0 | VSMTF3 | VSMTF7 | VTMTF0 | VTMTF3 | VTMTF7 |
| 0.813 | 0.768 | 0.755 | 0.813 | 0.703 | 0.690 |
| ISFS0 | ISFS3 | ISFS7 | ITFS0 | ITFS3 | ITFS7 |
| 0.008 | 0.005 | 0.003 | 0.008 | 0.005 | 0.008 |
| ISMTF0 | ISMTF3 | ISMTF7 | ITMTF0 | ITMTF3 | ITMTF7 |
| 0.766 | 0.745 | 0.753 | 0.766 | 0.721 | 0.720 |
| FS | AIFS | AVFS | AFS | | |
| 0.010 | 0.006 | −0.003 | 0.009 | | |
| IN12 | IN23 | IN34 | IN45 | IN56 | TP1 |
| 0.100 mm | 0.115 mm | 0.105 mm | 0.592 mm | 1.230 mm | 0.979 mm |

The following values for the conditional expressions can be obtained from the data in Table 5 and Table 6.

| Values Related to Inflection Point of Third Embodiment (Primary Reference Wavelength = 555 nm) | | | | | | |
|---|---|---|---|---|---|---|
| HIF111 | 0.9858 | HIF111/HOI | 0.4286 | SGI111 | 0.1230 | \|SGI111\|/(\|SGI111\| + TP1) 0.1117 |
| HIF221 | 0.0508 | HIF221/HOI | 0.0221 | SGI221 | 0.0000 | \|SGI221\|/(\|SGI221\| + TP2) 0.0000 |
| HIF222 | 0.8447 | HIF222/HOI | 0.3673 | SGI222 | −0.0185 | \|SGI222\|/(\|SGI222\| + TP2) 0.0387 |
| HIF223 | 1.4759 | HIF223/HOI | 0.6417 | SGI223 | 0.0014 | \|SGI223\|/(\|SGI223\| + TP2) 0.0031 |
| HIF311 | 0.0602 | HIF311/HOI | 0.0262 | SGI311 | 0.0000 | \|SGI311\|/(\|SGI311\| + TP3) 0.0001 |
| HIF312 | 0.7764 | HIF312/HOI | 0.3376 | SGI312 | −0.0356 | \|SGI312\|/(\|SGI312\| + TP3) 0.1137 |
| HIF313 | 1.4508 | HIF313/HOI | 0.6308 | SGI313 | −0.0068 | \|SGI313\|/(\|SGI313\| + TP3) 0.0238 |
| HIF321 | 0.1550 | HIF321/HOI | 0.0674 | SGI321 | 0.0006 | \|SGI321\|/(\|SGI321\| + TP3) 0.0021 |
| HIF322 | 0.7997 | HIF322/HOI | 0.3477 | SGI322 | −0.0222 | \|SGI322\|/(\|SGI322\| + TP3) 0.0741 |
| HIF323 | 1.2786 | HIF323/HOI | 0.5559 | SGI323 | −0.0453 | \|SGI323\|/(\|SGI323\| + TP3) 0.1402 |
| HIF411 | 0.7382 | HIF411/HOI | 0.3210 | SGI411 | −0.0152 | \|SGI411\|/(\|SGI411\| + TP4) 0.0232 |
| HIF511 | 1.0324 | HIF511/HOI | 0.4489 | SGI511 | 0.2231 | \|SGI511\|/(\|SGI511\| + TP5) 0.3284 |
| HIF521 | 1.4823 | HIF521/HOI | 0.6445 | SGI521 | 0.3212 | \|SGI521\|/(\|SGI521\| + TP5) 0.4132 |
| HIF611 | 0.3844 | HIF611/HOI | 0.1671 | SGI611 | 0.0107 | \|SGI611\|/(\|SGI611\| + TP6) 0.0160 |
| HIF612 | 1.5183 | HIF612/HOI | 0.6601 | SGI612 | −0.1857 | \|SGI612\|/(\|SGI612\| + TP6) 0.2190 |
| HIF621 | 0.4399 | HIF621/HOI | 0.1913 | SGI621 | 0.0182 | \|SGI621\|/(\|SGI621\| + TP6) 0.0268 |
| HIF622 | 1.9096 | HIF622/HOI | 0.8303 | SGI622 | −0.4507 | \|SGI622\|/(\|SGI622\| + TP6) 0.4050 |

Fourth Embodiment

Figure 4A:
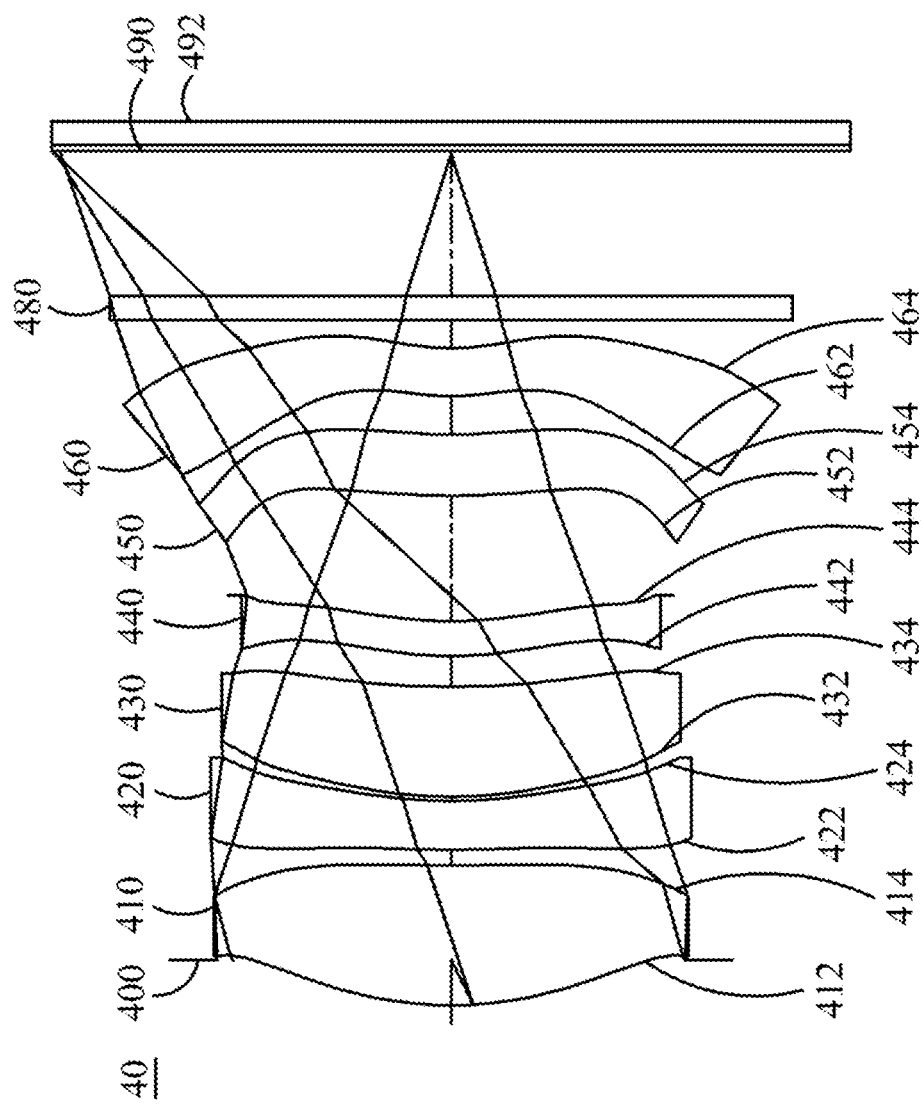
FIG. 4A is a schematic view of the optical image capturing system according to the fourth embodiment of the present invention.
Figure 4B:
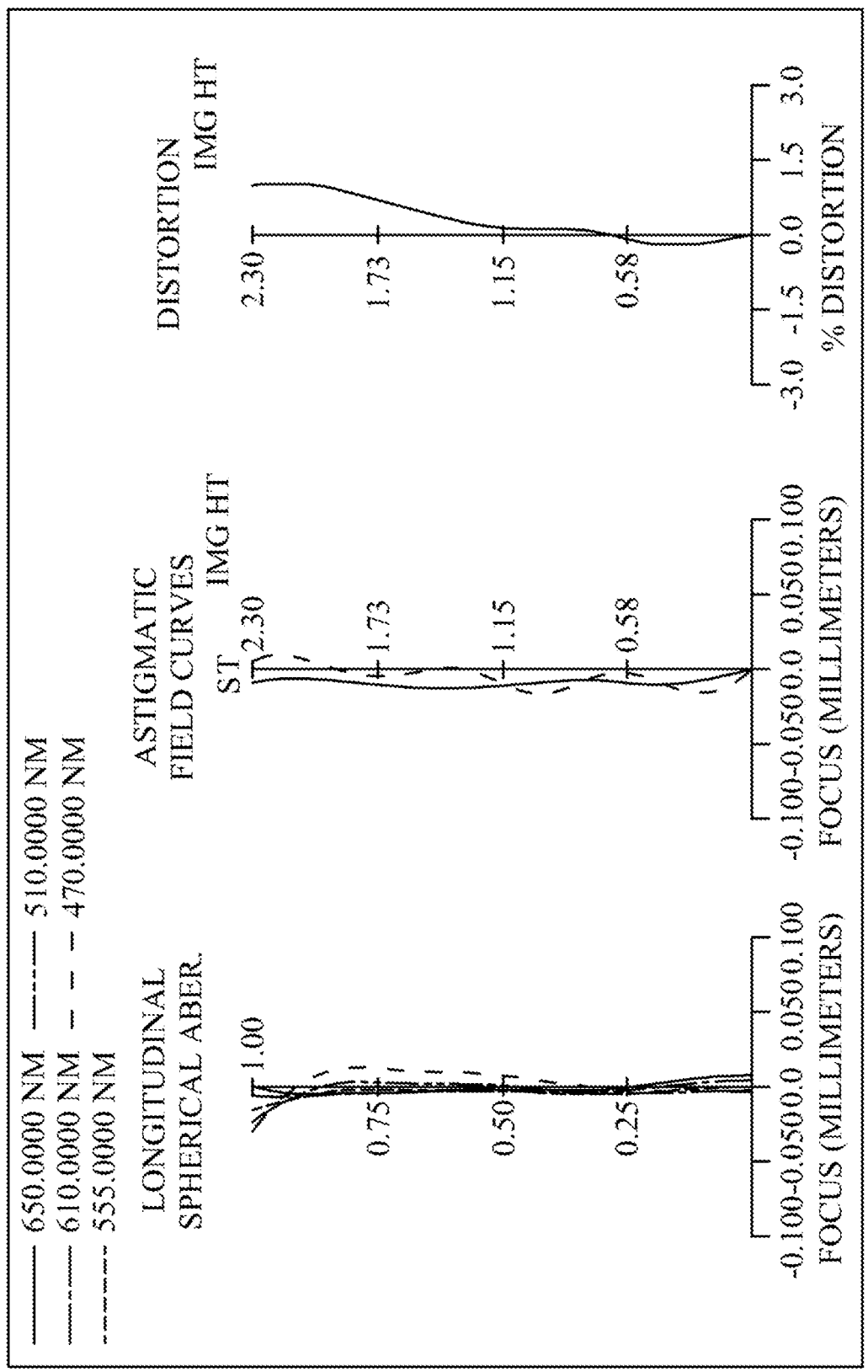
FIG. 4B shows the longitudinal spherical aberration curves, astigmatic field curves, and optical distortion curve of the optical image capturing system in the order from left to right according to the fourth embodiment of the present invention.
Figure 4C:
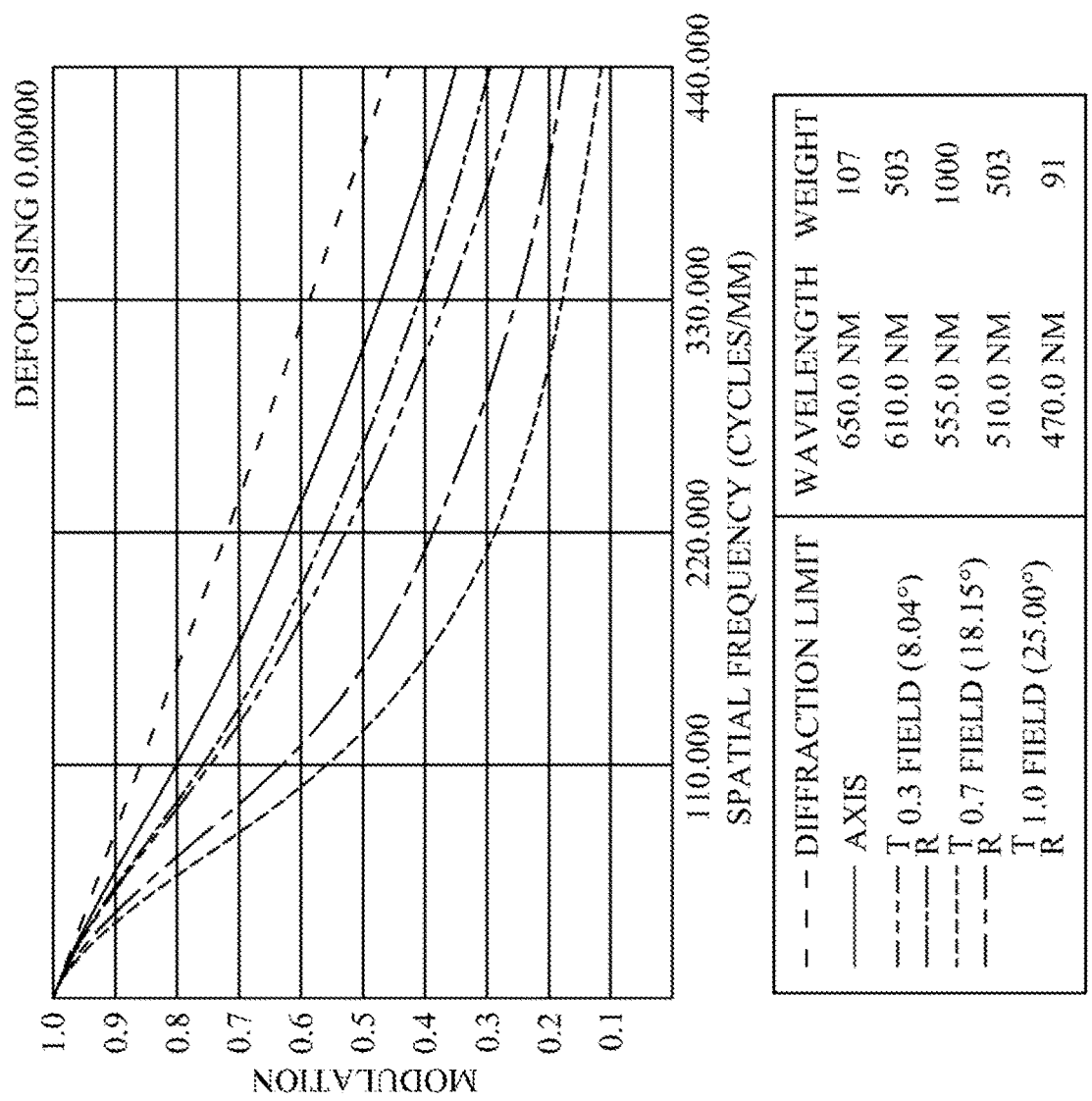
FIG. 4C is a characteristic diagram of modulation transfer of visible light spectrum for the optical image capturing system according to the fourth embodiment of the present invention.
Figure 4D:
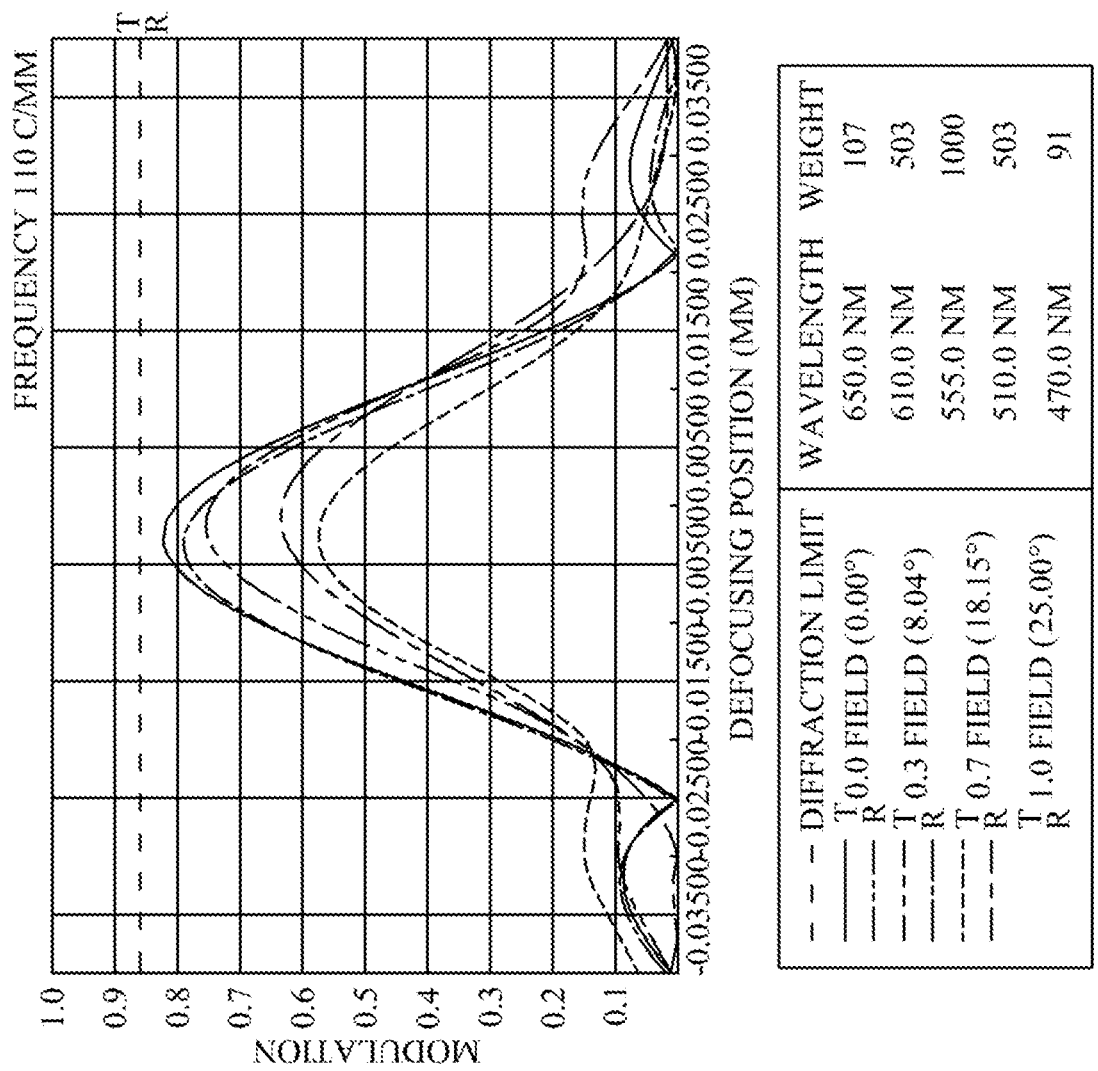
FIG. 4D is a diagram showing the through focus MTF values of the visible light spectrum at the central field of view, 0.3 field of view and 0.7 field of view of the fourth embodiment of the present invention.
Figure 4E:
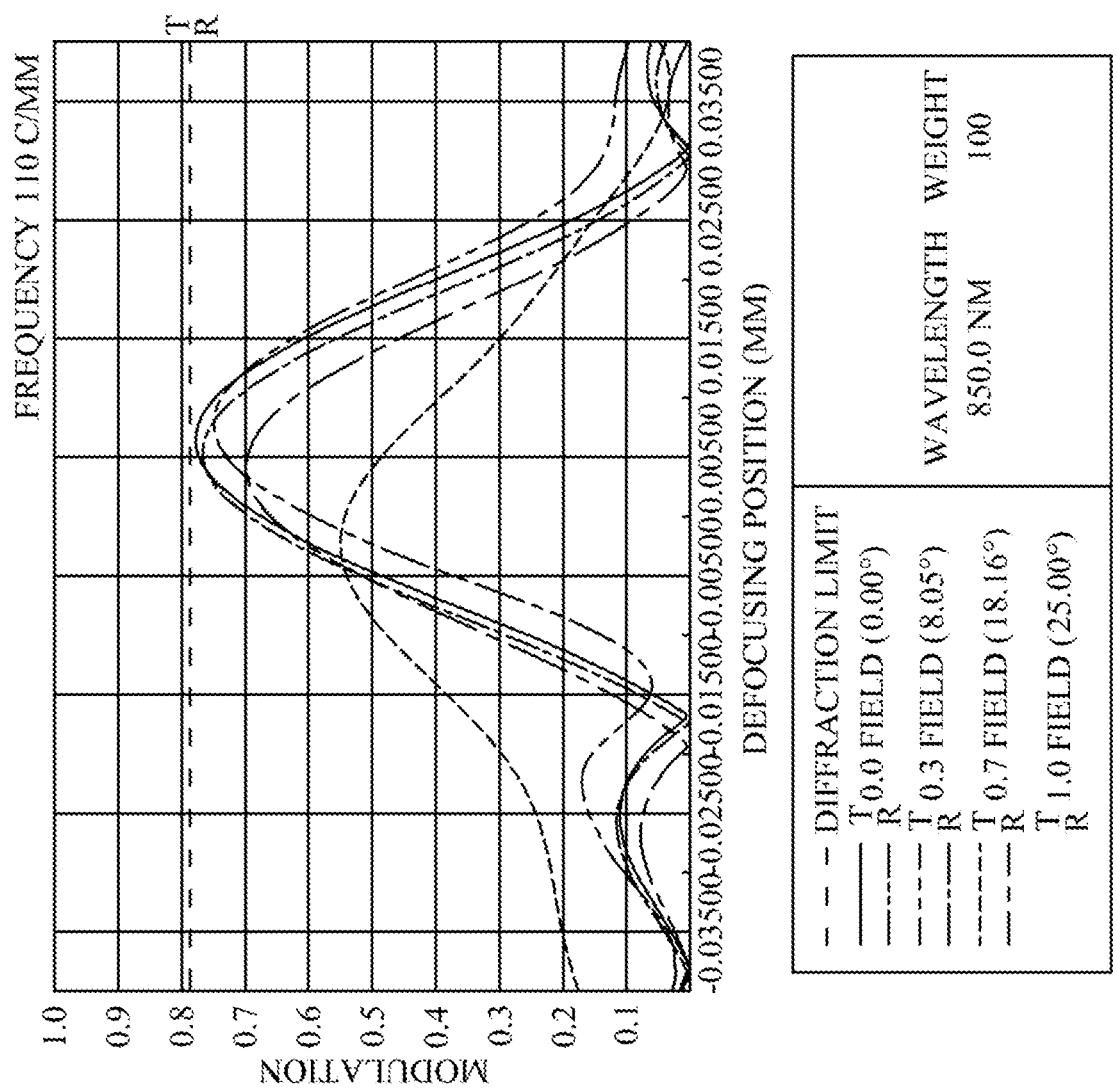
FIG. 4E is a diagram showing the through focus MTF values of the infrared light spectrum at the central field of view, 0.3 field of view, and 0.7 field of view of the fourth embodiment of the present invention.

Please refer to FIGS. 4A to 4E. FIG. 4A is a schematic view of the optical image capturing system according to the fourth embodiment of the present invention. FIG. 4B shows the longitudinal spherical aberration curves, astigmatic field curves, and optical distortion curve of the optical image capturing system, in the order from left to right, according to the fourth embodiment of the present invention. FIG. 4C is a characteristic diagram of modulation transfer of visible light spectrum for the optical image capturing system according to the fourth embodiment of the present invention. FIG. 4D is a diagram showing the through focus MTF values of the visible light spectrum at central field of view, 0.3 field of view and 0.7 field of view of the fourth embodiment of the present invention. FIG. 4E is a diagram showing the through focus MTF values of the infrared light spectrum at central field of view, 0.3 field of view, and 0.7 field of view of the fourth embodiment of the present invention. As shown in FIG. 4A, in the order from the object side to the image side, the optical image capturing system 40 includes an aperture 400, a first lens 410, a second lens 420, a third lens 430, a fourth lens 440, a fifth lens 450, a sixth lens 460, an IR-bandstop filter 480, a first image plane 490, a second image plane and an image sensing device 492.

The first lens 410 has positive refractive power and is made of plastic. The object side 412 of the first lens 410 is a convex surface and the image side 414 of the first lens 410 is a concave surface, and the object side 412 and the image side 414 of the first lens 410 are both aspheric. Both of the object side 412 and the image side 414 of the first lens 410 have one inflection point.

The second lens 420 has negative refractive power and is made of plastic. The object side 422 of the second lens 420 is a convex surface and the image side 424 of the second lens 420 is a concave surface, and the object side 422 and the image side 424 of the second lens 420 are both aspheric. The object side 422 of the second lens 420 has two inflection points and the image side 424 of the second lens 420 has one inflection point.

The third lens 430 has positive refractive power and is made of plastic. The object side 432 of the third lens 430 is a convex surface and the image side 434 of the third lens 430 is a concave surface, and the object side 432 and the image side 434 of the third lens 430 are both aspheric. The object side 432 of the third lens 430 has one inflection point and the image side 434 of the third lens 430 has two inflection points.

The fourth lens 440 has positive refractive power and is made of plastic. The object side 442 of the fourth lens 440 is a convex surface and the image side 444 of the fourth lens 440 is a concave surface, and the object side 442 and an image side 444 of the fourth lens 440 are both aspheric. Both of the object side 442 and the image side 444 of the fourth lens 440 have two inflection points.

The fifth lens 450 has negative refractive power and is made of plastic. The object side 452 of the fifth lens 450 is a convex surface and the image side 454 of the fifth lens 450 is a concave surface, and the object side 452 and the image side 454 of the fifth lens 450 are both aspheric. Both of the object side 452 and the image side 454 of the fifth lens 450 have two inflection points.

The sixth lens 460 has negative refractive power and is made of plastic. The object side 462 of the sixth lens 460 is a convex surface and the image side 464 of the sixth lens 460 is a concave surface, and the object side 462 and an image side 464 of the sixth lens 460 are both aspheric. The object side 462 of the sixth lens 460 has two inflection points and the image side 464 of the sixth lens 460 has one inflection point. Hereby, this configuration is beneficial to shorten the back focal length of the optical image capturing system 40 so as to keep its miniaturization. Furthermore, the incident angle of the off-axis rays can be reduced effectively, thereby further correcting the off-axis aberration.

The IR-bandstop filter 480 is made of glass and is disposed between the sixth lens 460 and the first image plane 490. The IR-bandstop filter 480 does not affect the focal length of the optical image capturing system 40.

Please refer to the following Table 7 and Table 8.

TABLE 7

Lens Parameter for the Fourth Embodiment
f(focal length) = 4.884 mm; f/HEP = 1.8;
HAF(half angle of view) = 24.999 deg

| Surface No. | | Curvature Radius | Thickness (mm) | Material |
|---|---|---|---|---|
| 0 | Object | 1E+18 | 1E+18 | |
| 1 | Aperture | 1E+18 | −0.279 | |
| 2 | First Lens | 2.062087597 | 0.865 | Plastic |
| 3 | | 9.186949324 | 0.100 | |
| 4 | Second Lens | 8.230446054 | 0.302 | Plastic |
| 5 | | 2.603359904 | 0.025 | |
| 6 | Third Lens | 2.355440368 | 0.683 | Plastic |
| 7 | | 4.568806174 | 0.192 | |
| 8 | Fourth Lens | 2.067643702 | 0.217 | Plastic |
| 9 | | 2.178676045 | 0.778 | |
| 10 | Fifth Lens | 3.182907753 | 0.380 | Plastic |
| 11 | | 2.214182781 | 0.240 | |
| 12 | Sixth Lens | 1.275604691 | 0.296 | Plastic |
| 13 | | 1.129525592 | 0.173 | |
| 14 | IR-bandstop filter | 1E+18 | 0.150 | BK_7 |
| 15 | | 1E+18 | 0.900 | |
| 16 | First Image Plane | 1E+18 | 0.000 | |
| 17 | | 1E+18 | 0.000 | |

| Surface No. | Refractive Index | Coefficient of Dispersion | Focal Length |
|---|---|---|---|
| 0 | | | |
| 1 | | | |
| 2 | 1.544 | 56.064 | 4.671 |
| 3 | | | |
| 4 | 1.661 | 20.381 | −5.836 |
| 5 | | | |
| 6 | 1.544 | 56.064 | 8.032 |
| 7 | | | |
| 8 | 1.661 | 20.381 | 34.169 |
| 9 | | | |
| 10 | 1.661 | 20.381 | −12.944 |
| 11 | | | |
| 12 | 1.584 | 29.878 | −67.300 |
| 13 | | | |
| 14 | 1.517 | 64.13 | |
| 15 | | | |
| 16 | | | |
| 17 | | | |

Reference Wavelength = 555 nm. Shield Position: the 5th surface with effective aperture radius = 1.325 mm

TABLE 8

The Aspheric Coefficients of the Fourth Embodiment
Table 8: Aspheric Coefficients

| | Surface No | | | |
|---|---|---|---|---|
| | 2 | 3 | 4 | 5 |
| k | 7.413537E−02 | 0.000000E+00 | 0.000000E+00 | 0.000000E+00 |
| A4 | −1.797319E−02 | −9.567838E−02 | −9.282102E−02 | −2.475707E−02 |
| A6 | −8.690843E−03 | −2.479305E−02 | 1.970869E−03 | −2.642168E−01 |
| A8 | −6.606034E−03 | 4.847714E−02 | 6.763270E−02 | 4.377122E−01 |
| A10 | 4.148682E−03 | −2.640329E−02 | −4.611394E−02 | −2.974970E−01 |
| A12 | −5.530741E−03 | 6.159111E−03 | 1.572882E−02 | 1.029698E−01 |
| A14 | 1.521254E−03 | −5.162238E−04 | −2.326936E−03 | −1.553836E−02 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

| | Surface No | | | |
|---|---|---|---|---|
| | 6 | 7 | 8 | 9 |
| k | 0.000000E+00 | 0.000000E+00 | 0.000000E+00 | −3.198656E−01 |
| A4 | 3.853287E−02 | −1.597222E−02 | −2.055553E−01 | −1.980855E−01 |
| A6 | −3.411064E−01 | 1.033979E−01 | 2.036110E−01 | 2.089457E−01 |
| A8 | 4.579678E−01 | −2.740442E−01 | −3.547183E−01 | −3.391414E−01 |
| A10 | −2.749097E−01 | 3.000858E−01 | 2.949496E−01 | 3.181002E−01 |
| A12 | 8.636776E−02 | −1.660643E−01 | −1.301839E−01 | −1.563625E−01 |
| A14 | −1.234335E−02 | 3.573900E−02 | 2.661908E−02 | 3.867622E−02 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

| | Surface No | | | |
|---|---|---|---|---|
| | 10 | 11 | 12 | 13 |
| k | −9.000000E+01 | −9.000000E+01 | −1.824418E+01 | −1.017398E+01 |
| A4 | 4.715121E−02 | −1.044003E−01 | −5.944437E−01 | −3.841528E−01 |
| A6 | −1.486595E−01 | 1.623612E−01 | 2.462464E−01 | 2.712741E−01 |
| A8 | 1.529204E−02 | −5.774613E−02 | 1.307477E−01 | −9.038848E−02 |
| A10 | 1.035769E−01 | 6.452466E−02 | −1.503027E−01 | 1.310271E−02 |
| A12 | −1.218664E−01 | −3.833023E−02 | 4.899705E−02 | −4.490315E−04 |
| A14 | 3.770895E−02 | 8.519964E−03 | −5.463331E−03 | −3.926480E−05 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

In the fourth embodiment, the form of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.92 | 0.9 | 0.83 | 0.8 | 0.75 | 0.56 |
| ETP1 | ETP2 | ETP3 | ETP4 | ETP5 | ETP6 |
| 0.478 | 0.493 | 0.515 | 0.334 | 0.377 | 0.560 |
| ETP1/TP1 | ETP2/TP2 | ETP3/TP3 | ETP4/TP4 | ETP5/TP5 | ETP6/TP6 |
| 0.553 | 1.633 | 0.755 | 1.539 | 0.991 | 1.889 |
| ETL | EBL | EIN | EIR | PIR | EIN/ETL |
| 5.010 | 1.228 | 3.783 | 0.178 | 0.173 | 0.755 |
| SETP/EIN | EIR/PIR | SETP | STP | SETP/STP | BL |
| 0.729 | 1.024 | 2.757 | 2.742 | 1.005 | 1.223 |
| ED12 | ED23 | ED34 | ED45 | ED56 | EBL/BL |
| 0.212 | 0.081 | 0.147 | 0.479 | 0.108 | 1.0041 |
| SED | SIN | SED/SIN | ED12/ED23 | ED23/ED34 | ED34/ED45 |
| 1.026 | 1.334 | 0.769 | 2.613 | 0.552 | 0.307 |
| ED12/IN12 | ED23/IN23 | ED34/IN34 | ED45/IN45 | ED56/IN56 | ED45/ED56 |
| 2.116 | 3.239 | 0.766 | 0.615 | 0.449 | 4.446 |
| \|f/f1\| | \|f/f2\| | \|f/f3\| | \|f/f4\| | \|f/f5\| | \|f/f6\| |
| 1.04557 | 0.83685 | 0.60800 | 0.14293 | 0.37729 | 0.07257 |
| ΣPPR/ | | | | | TP4/(IN34 + |

-continued

| Fourth Embodiment (Primary Reference Wavelength = 555 nm) | | | | | |
|---|---|---|---|---|---|
| ΣPPR | ΣNPR | \|ΣNPR\| | IN12/f | IN56/f | TP4 + IN45) |
| 2.17379 | 0.90941 | 2.39033 | 0.02048 | 0.04911 | 0.18268 |
| \|f1/f2\| | \|f2/f3\| | (TP1 + IN12)/TP2 | | (TP6 + IN56)/TP5 | |
| 0.80037 | 0.72654 | 3.19467 | | 1.40916 | |
| HOS | InTL | HOS/HOI | InS/HOS | ODT % | TDT % |
| 5.30019 | 4.07671 | 2.30443 | 0.94739 | 1.03297 | 0.73544 |
| HVT51 | HVT52 | HVT61 | HVT62 | HOI | HVT62/HVT62/HOS |
| 0.763457 | 0.61761 | 0.46254 | 0.67777 | 0.29468 | 0.12788 |
| TP2/TP3 | TP3/TP4 | InRS61 | InRS62 | \|InRS61\|/TP6 | \|InRS62\|/TP6 |
| 0.44230 | 3.15038 | −0.49023 | −0.27411 | 1.65469 | 0.92521 |
| PSTA | PLTA | NSTA | NLTA | SSTA | SLTA |
| −0.029 mm | −0.001 mm | 0.011 mm | 0.005 mm | −0.005 mm | 0.002 mm |
| VSFS0 | VSFS3 | VSFS7 | VTFS0 | VTFS3 | VTFS7 |
| −0.005 | −0.005 | −0.000 | −0.005 | −0.000 | −0.005 |
| VSMTF0 | VSMTF3 | VSMTF7 | VTMTF0 | VTMTF3 | VTMTF7 |
| 0.806 | 0.782 | 0.633 | 0.806 | 0.748 | 0.562 |
| ISFS0 | ISFS3 | ISFS7 | ITFS0 | ITFS3 | ITFS7 |
| 0.005 | 0.005 | 0.005 | 0.005 | 0.010 | −0.000 |
| ISMTF0 | ISMTF3 | ISMTF7 | ITMTF0 | ITMTF3 | ITMTF7 |
| 0.774 | 0.768 | 0.699 | 0.774 | 0.738 | 0.544 |
| FS | AIFS | AVFS | AFS | | |
| 0.010 | 0.005 | −0.003 | 0.008 | | |
| IN12 | IN23 | IN34 | IN45 | IN56 | TP1 |
| 0.100 mm | 0.025 mm | 0.192 mm | 0.778 mm | 0.240 mm | 0.865 mm |

The following values for the conditional expressions can be obtained from the data in Table 7 and Table 8.

| \multicolumn{7}{c}{Values Related to Inflection Point of fourth Embodiment (Primary Reference Wavelength = 555 nm)} | | | | | | |
|---|---|---|---|---|---|---|
| HIF111 | 0.9487 | HIF111/HOI | 0.4125 | SGI111 | 0.2073 | \|SGI111\|/(\|SGI111\| + TP1) | 0.1934 |
| HIF121 | 0.3020 | HIF121/HOI | 0.1313 | SGI121 | 0.0042 | \|SGI121\|/(\|SGI121\| + TP1) | 0.0048 |
| HIF211 | 0.3385 | HIF211/HOI | 0.1472 | SGI211 | 0.0058 | \|SGI211\|/(\|SGI211\| + TP2) | 0.0187 |
| HIF212 | 0.8527 | HIF212/HOI | 0.3707 | SGI212 | 0.0076 | \|SGI212\|/(\|SGI212\| + TP2) | 0.0245 |
| HIF221 | 1.2556 | HIF221/HOI | 0.5459 | SGI221 | 0.2375 | \|SGI221\|/(\|SGI221\| + TP2) | 0.4403 |
| HIF311 | 1.2650 | HIF311/HOI | 0.5500 | SGI311 | 0.3064 | \|SGI311\|/(\|SGI311\| + TP3) | 0.3098 |
| HIF321 | 0.7853 | HIF321/HOI | 0.3415 | SGI321 | 0.0654 | \|SGI321\|/(\|SGI321\| + TP3) | 0.0874 |
| HIF322 | 1.2396 | HIF322/HOI | 0.5390 | SGI322 | 0.0886 | \|SGI322\|/(\|SGI322\| + TP3) | 0.1149 |
| HIF411 | 0.5422 | HIF411/HOI | 0.2357 | SGI411 | 0.0577 | \|SGI411\|/(\|SGI411\| + TP4) | 0.2102 |
| HIF412 | 1.1533 | HIF412/HOI | 0.5014 | SGI412 | 0.0598 | \|SGI412\|/(\|SGI412\| + TP4) | 0.2164 |
| HIF421 | 0.5586 | HIF421/HOI | 0.2429 | SGI421 | 0.0571 | \|SGI421\|/(\|SGI421\| + TP4) | 0.2085 |
| HIF422 | 0.9496 | HIF422/HOI | 0.4128 | SGI422 | 0.1063 | \|SGI422\|/(\|SGI422\| + TP4) | 0.3292 |
| HIF511 | 0.4647 | HIF511/HOI | 0.2020 | SGI511 | 0.0259 | \|SGI511\|/(\|SGI511\| + TP5) | 0.0637 |
| HIF512 | 1.2603 | HIF512/HOI | 0.5480 | SGI512 | −0.2249 | \|SGI512\|/(\|SGI512\| + TP5) | 0.3716 |
| HIF521 | 0.2963 | HIF521/HOI | 0.1288 | SGI521 | 0.0144 | \|SGI521\|/(\|SGI521\| + TP5) | 0.0365 |
| HIF522 | 1.3702 | HIF522/HOI | 0.5957 | SGI522 | −0.3285 | \|SGI522\|/(\|SGI522\| + TP5) | 0.4633 |
| HIF611 | 0.2397 | HIF611/HOI | 0.1042 | SGI611 | 0.0179 | \|SGI611\|/(\|SGI611\| + TP6) | 0.0571 |
| HIF612 | 1.2775 | HIF612/HOI | 0.5554 | SGI612 | −0.3258 | \|SGI612\|/(\|SGI612\| + TP6) | 0.5237 |
| HIF621 | 0.3186 | HIF621/HOI | 0.1385 | SGI621 | 0.0351 | \|SGI621\|/(\|SGI621\| + TP6) | 0.1060 |

Fifth Embodiment

Figure 5A:
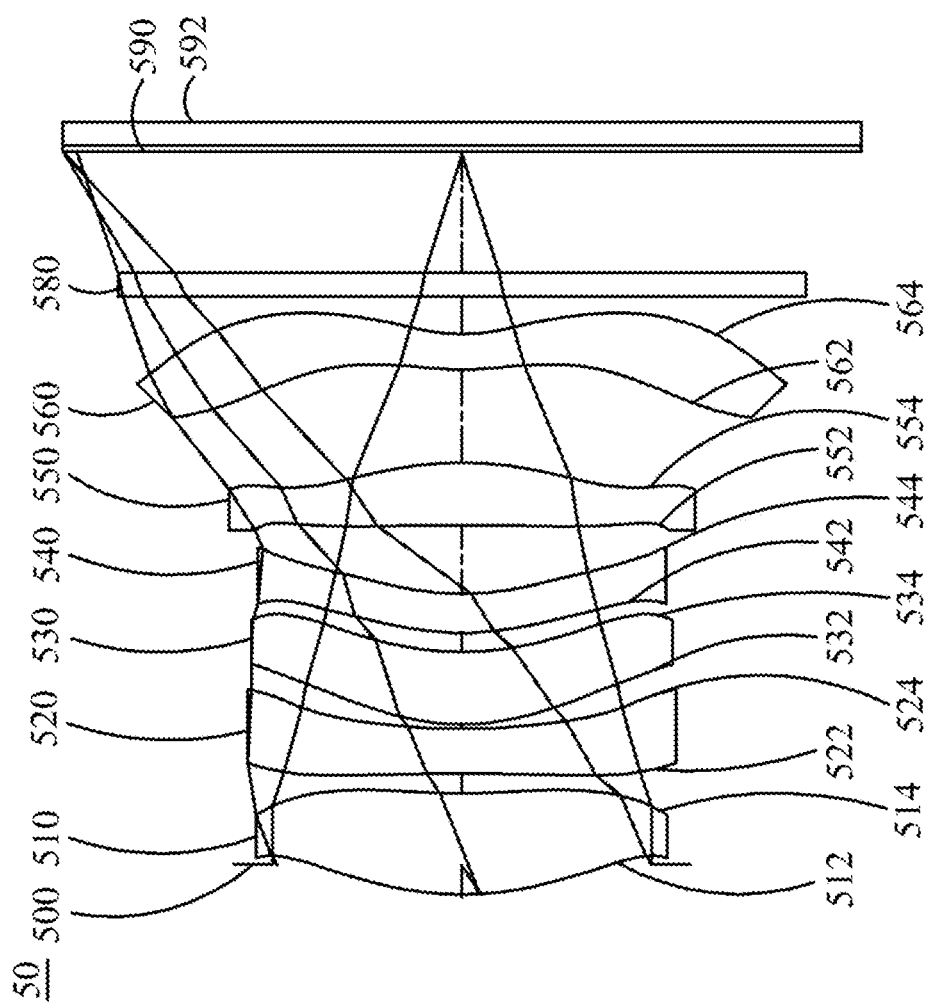
FIG. 5A is a schematic view of the optical image capturing system according to the fifth embodiment of the present invention.
Figure 5B:
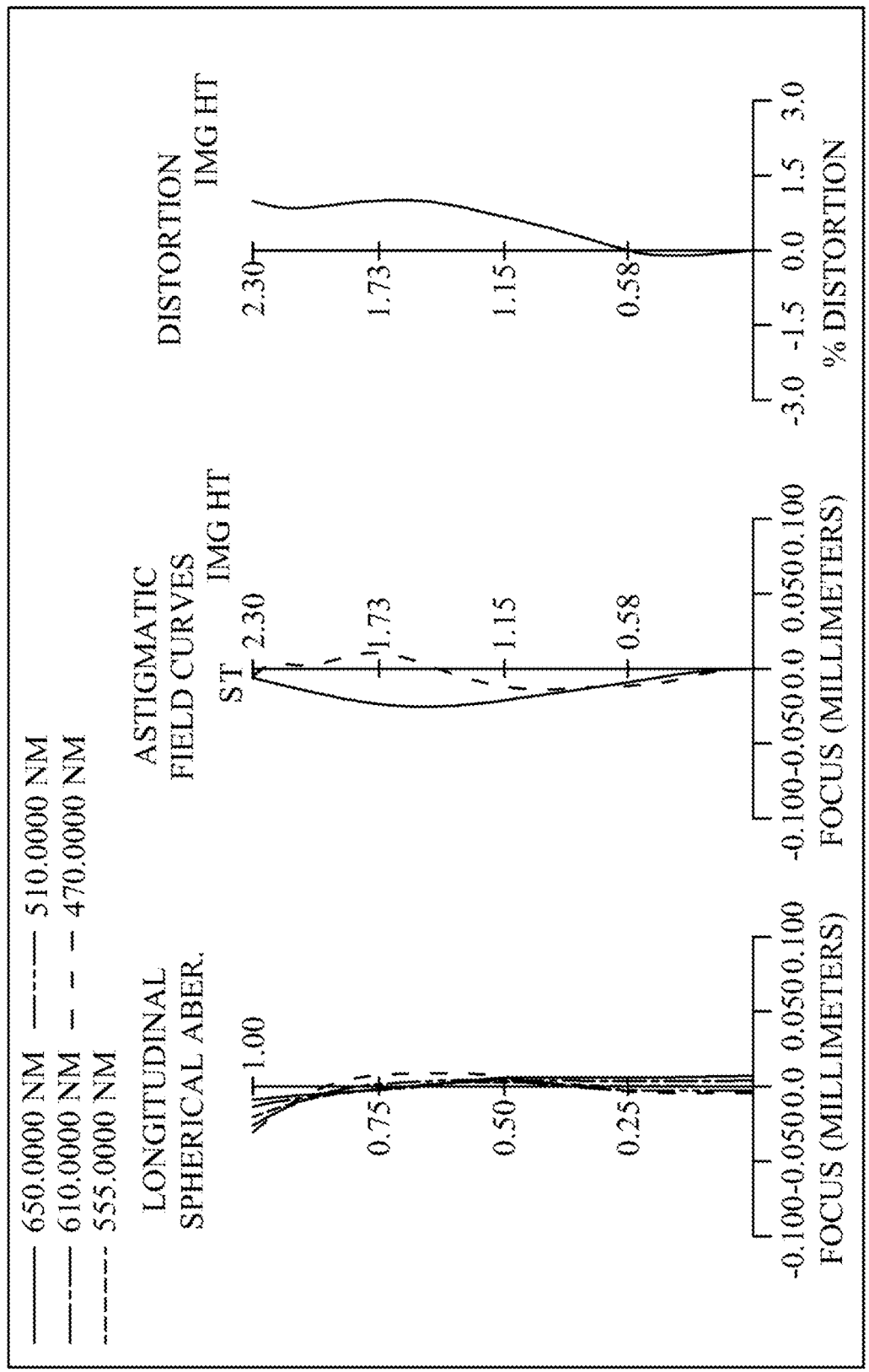
FIG. 5B shows the longitudinal spherical aberration curves, astigmatic field curves, and optical distortion curve of the optical image capturing system in the order from left to right according to the fifth embodiment of the present invention.
Figure 5C:
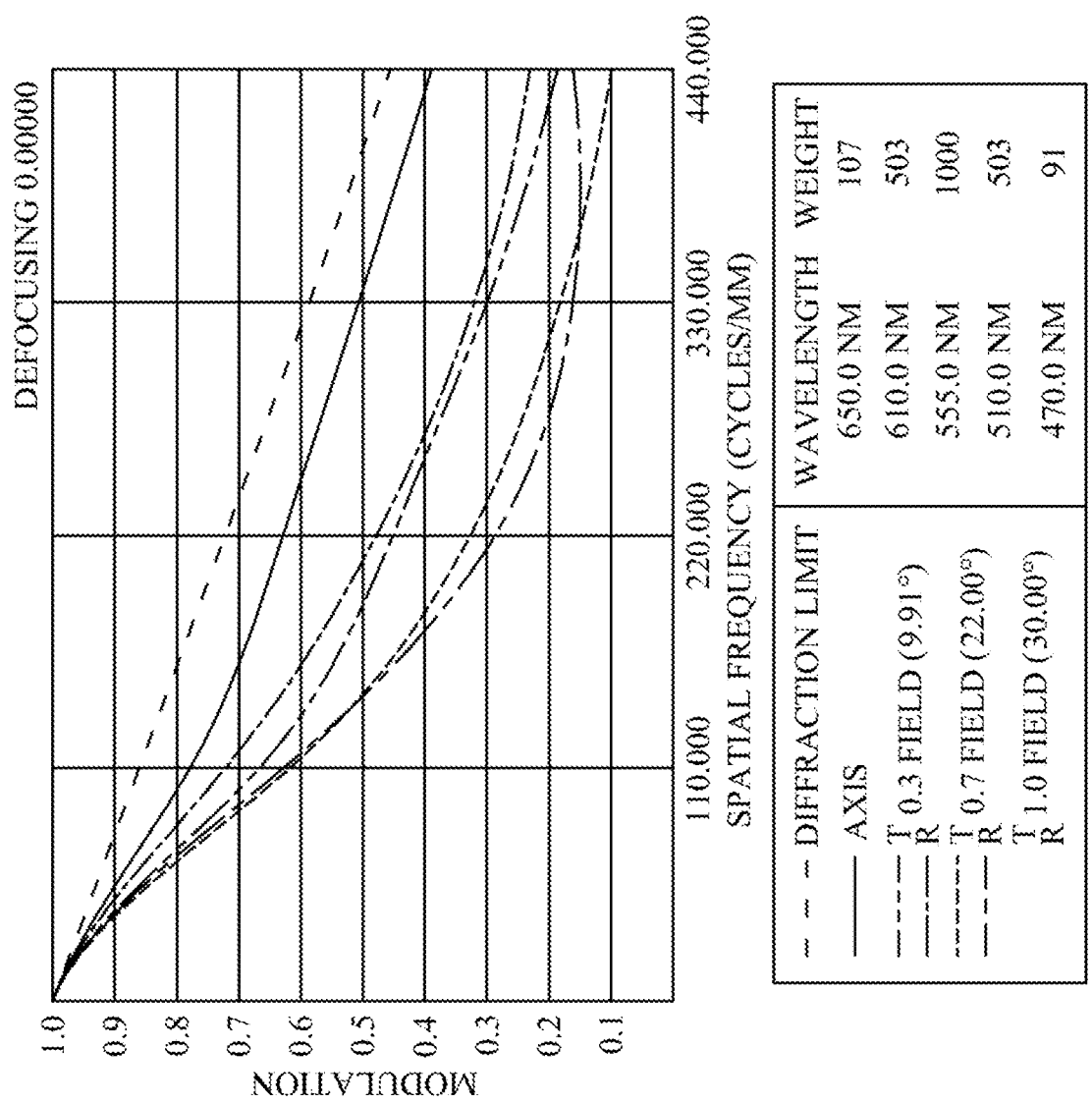
FIG. 5C is a characteristic diagram of modulation transfer of visible light spectrum for the optical image capturing system according to the fifth embodiment of the present invention.
Figure 5D:
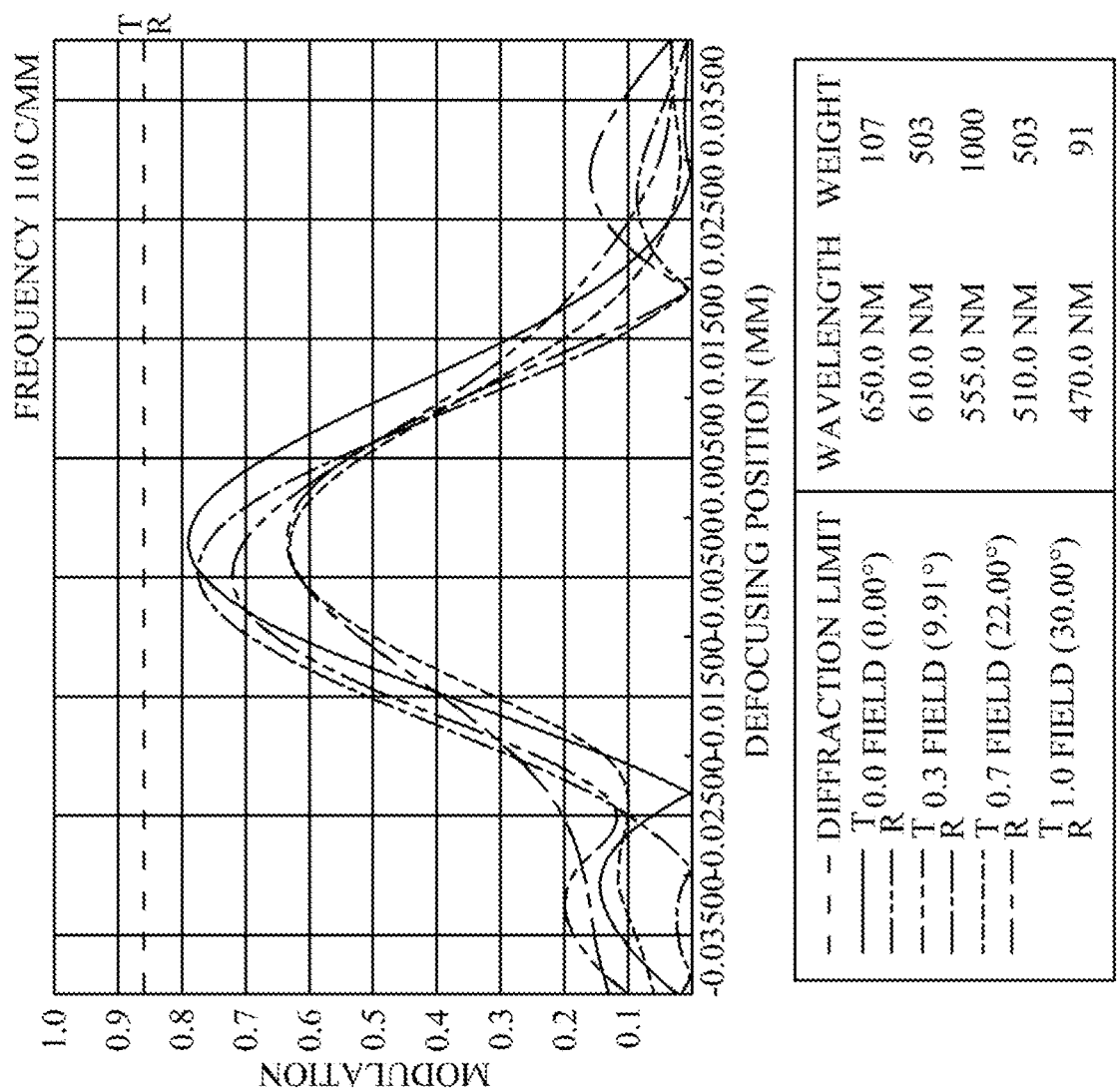
FIG. 5D is a diagram showing the through focus MTF values of the visible light spectrum at the central field of view, 0.3 field of view and 0.7 field of view of the fifth embodiment of the present invention.
Figure 5E:
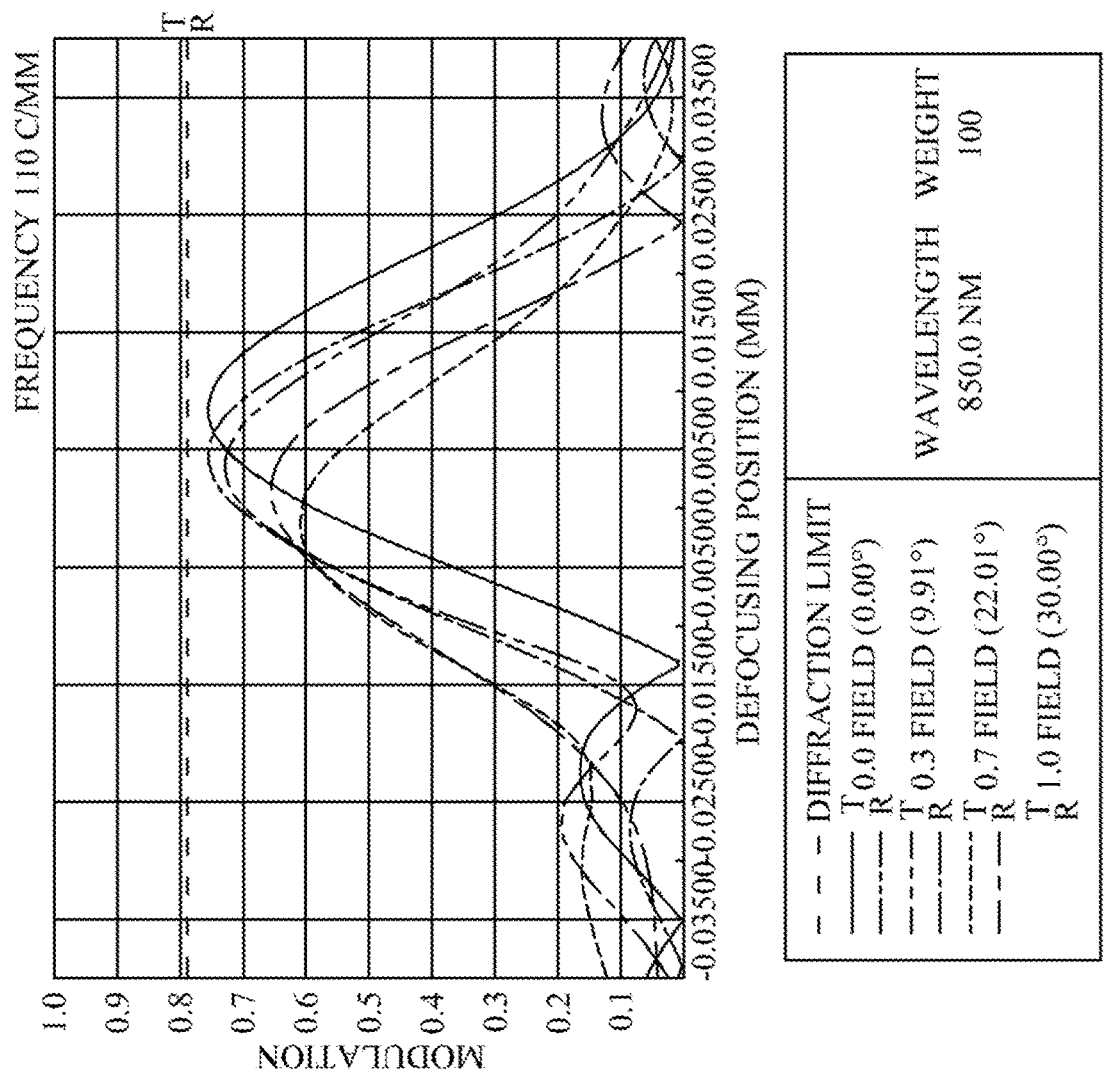
FIG. 5E is a diagram showing the through focus MTF values of the infrared light spectrum at the central field of view, 0.3 field of view, and 0.7 field of view of the fifth embodiment of the present invention.

Please refer to FIGS. 5A to 5E. FIG. 5A is a schematic view of the optical image capturing system according to the fifth embodiment of the present invention. FIG. 5B shows the longitudinal spherical aberration curves, astigmatic field curves, and optical distortion curve of the optical image capturing system, in the order from left to right, according to the fifth embodiment of the present invention. FIG. 5C is a characteristic diagram of modulation transfer of visible light spectrum for the optical image capturing system according to the fifth embodiment of the present invention. FIG. 5D is a diagram showing the through focus MTF values of the visible light spectrum at the central field of view, 0.3 field of view and 0.7 field of view of the fifth embodiment of the present invention. FIG. 5E is a diagram showing the through focus MTF values of the infrared light spectrum at the central field of view, 0.3 field of view, and 0.7 field of view of the fifth embodiment of the present invention. As shown in FIG. 5A, in the order from an object side to an image side, the optical image capturing system 50 includes an aperture 500, a first lens 510, a second lens 520, a third lens 530, a fourth lens 540, a fifth lens 550, a sixth lens 560, an IR-bandstop filter 580, a first image plane 590, a second image plane and an image sensing device 592.

The first lens 510 has positive refractive power and is made of plastic. The object side 512 of the first lens 510 is a convex surface and the image side 514 of the first lens 510 is a concave surface, and the object side 512 and the image side 514 of the first lens 510 are both aspheric. Both of the object side 512 and the image side 514 of the first lens 510 have one inflection point.

The second lens 520 has negative refractive power and is made of plastic. The object side 522 of the second lens 520 is a concave surface and the image side 524 of the second lens 520 is a concave surface, and the object side 522 and the image side 524 of the second lens 520 are both aspherical. The object side 522 of the second lens 520 has two inflection points and the image side 524 of the second lens 520 has one inflection point.

The third lens 530 has positive refractive power and is made of plastic. The object side 532 of the third lens 530 is a convex surface and the image side 534 of the third lens 530 is a concave surface, and object side 532 and image side 534 of the third lens 530 are both aspheric. The object side 532 of the third lens 520 has three inflection points and the image side 534 of the third lens 530 has one inflection point.

The fourth lens 540 has positive refractive power and is made of plastic. The object side 542 of the fourth lens 540 is a convex surface and the image side 544 of the fourth lens 540 is a concave surface, and the object side 542 and the image side 544 of the fourth lens 540 are both aspheric. The object side 542 of the fourth lens 540 has two inflection points.

The fifth lens 550 has positive refractive power and is made of plastic. The object side 552 of the fifth lens 550 is a concave surface and the image side 554 of the fifth lens 550 is a convex surface, and the object side 552 and the image side 554 of the fifth lens 550 are both aspheric. Both of the object side 552 and the image side 554 of the fifth lens 520 have two inflection points.

The sixth lens 560 has negative refractive power and is made of plastic. The object side 562 of the sixth lens 560 is a convex surface and the image side 564 of the sixth lens 560 is a concave surface, and the object side 562 and the image side 564 of the sixth lens 560 are both aspheric. The object side 562 of the sixth lens 560 has two inflection points and the image side 564 of the sixth lens 560 has one inflection point. Hereby, this configuration is beneficial to shorten the back focal length of the optical image capturing system 50 so as to keep its miniaturization. Furthermore, the incident angle of the off-axis rays can be reduced effectively, thereby further correcting the off-axis aberration.

The IR-bandstop filter 580 is made of glass and is disposed between the sixth lens 560 and the first image plane 590 without affecting the focal length of the optical image capturing system 50.

Please refer to the following Table 9 and Table 10.

TABLE 9

Lens Parameters for the Fifth Embodiment
f (focal length) = 3.945 mm; f/HEP = 1.8;
HAF (half angle of view) = 29.998 deg

| Surface No | | Curvature Radius | Thickness (mm) | Material |
|---|---|---|---|---|
| 0 | Object | 1E+18 | 1E+18 | |
| 1 | Aperture | 1E+18 | −0.183 | |
| 2 | First Lens | 1.794307448 | 0.626 | Plastic |
| 3 | | 4.072726413 | 0.122 | |
| 4 | Second Lens | −13.28031254 | 0.279 | Plastic |
| 5 | | 4.300805546 | 0.025 | |

TABLE 9-continued

Lens Parameters for the Fifth Embodiment
f (focal length) = 3.945 mm; f/HEP = 1.8;
HAF (half angle of view) = 29.998 deg

| | | | | |
|---|---|---|---|---|
| 6 | Third Lens | 1.215076469 | 0.450 | Plastic |
| 7 | | 1.633603324 | 0.117 | |
| 8 | Fourth Lens | 1.438330937 | 0.243 | Plastic |
| 9 | | 1.458837184 | 0.424 | |
| 10 | Fifth Lens | −15.8123187 | 0.385 | Plastic |
| 11 | | −1.980290824 | 0.580 | |
| 12 | Sixth Lens | 1.55408062 | 0.220 | Plastic |
| 13 | | 0.87836456 | 0.229 | |
| 14 | IR-bandstop filter | 1E+18 | 0.150 | BK_7 |
| 15 | | 1E+18 | 0.750 | |
| 16 | First Image Plane | 1E+18 | 0.000 | |

| Surface No | Refractive Index | Coefficient of Dispersion | Focal Length |
|---|---|---|---|
| 0 | | | |
| 1 | | | |
| 2 | 1.544 | 56.064 | 5.356 |
| 3 | | | |
| 4 | 1.661 | 20.381 | −4.841 |
| 5 | | | |
| 6 | 1.544 | 56.064 | 6.298 |
| 7 | | | |
| 8 | 1.661 | 20.381 | 26.765 |
| 9 | | | |
| 10 | 1.544 | 56.064 | 4.107 |
| 11 | | | |
| 12 | 1.544 | 56.064 | −4.182 |
| 13 | | | |
| 14 | 1.517 | 64.13 | |
| 15 | | | |
| 16 | | | |

Reference Wavelength = 555 nm. Shield Position: the 5th surface with effective aperture radius = 1.215 mm

TABLE 10

The Aspheric Coefficients of the Fifth Embodiment
Table 10: Aspheric Coefficients

| | Surface No | | | |
|---|---|---|---|---|
| | 2 | 3 | 4 | 5 |
| k | −2.400817E+00 | −4.406925E+01 | 8.082884E+01 | 2.097228E+00 |
| A4 | 1.059445E−02 | −1.335446E−01 | 5.501723E−03 | −5.334185E−02 |
| A6 | −8.402979E−03 | −3.318564E−02 | 8.243612E−02 | 3.102621E−01 |
| A8 | −5.256680E−02 | 8.412227E−02 | −1.128467E−01 | −5.652294E−01 |
| A10 | 7.762597E−02 | −2.930324E−02 | 1.633256E−01 | 7.249933E−01 |
| A12 | −9.663436E−02 | −4.085559E−02 | −1.471497E−01 | −5.890636E−01 |
| A14 | 5.436508E−02 | 3.700978E−02 | 7.088251E−02 | 2.579988E−01 |
| A16 | −1.193905E−02 | −9.308693E−03 | −1.406165E−02 | −4.749070E−02 |
| A18 | 0.000000E+00 | 0.000000E+00 | 0.000000E+00 | 0.000000E+00 |

| | Surface No | | | |
|---|---|---|---|---|
| | 6 | 7 | 8 | 9 |
| k | −2.715143E+00 | −9.452467E+00 | −4.468885E+00 | −9.992848E−01 |
| A4 | −5.557526E−02 | 2.101992E−01 | −1.080205E−01 | −2.084650E−01 |
| A6 | 1.611186E−01 | −2.783982E−01 | −9.125675E−03 | 3.187349E−02 |
| A8 | −4.594076E−01 | 2.164431E−01 | 2.942424E−01 | 2.302399E−01 |
| A10 | 5.625422E−01 | −3.906471E−01 | −7.419768E−01 | −5.850625E−01 |
| A12 | −3.558140E−01 | 5.474500E−01 | 9.930551E−01 | 8.167290E−01 |
| A14 | 1.304120E−01 | −3.682914E−01 | −6.670823E−01 | −5.605289E−01 |
| A16 | −2.471138E−02 | 9.036380E−02 | 1.685856E−01 | 1.472521E−01 |
| A18 | 0.000000E+00 | 0.000000E+00 | 0.000000E+00 | 0.000000E+00 |

TABLE 10-continued

The Aspheric Coefficients of the Fifth Embodiment
Table 10: Aspheric Coefficients

| | Surface No | | | |
|---|---|---|---|---|
| | 10 | 11 | 12 | 13 |
| k | −5.311973E−01 | −1.187963E+01 | −2.093857E+01 | −7.541768E+00 |
| A4 | −4.169730E−03 | −2.170443E−01 | −5.664977E−01 | −3.356369E−01 |
| A6 | 1.956485E−01 | 5.725999E−01 | 6.538563E−01 | 3.374153E−01 |
| A8 | −4.415559E−01 | −8.388943E−01 | −4.827147E−01 | −2.352939E−01 |
| A10 | 7.181851E−01 | 9.852067E−01 | 2.219101E−01 | 1.045740E−01 |
| A12 | −7.197329E−01 | −6.898393E−01 | −5.809013E−02 | −2.907449E−02 |
| A14 | 3.833028E−01 | 2.401740E−01 | 7.734682E−03 | 4.586948E−03 |
| A16 | −8.791475E−02 | −3.252716E−02 | −3.919131E−04 | −3.087442E−04 |
| A18 | 0.000000E+00 | 0.000000E+00 | 0.000000E+00 | 0.000000E+00 |

In the fifth embodiment, the form of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 9 and Table 10:

Fifth Embodiment (Primary Reference Wavelength = 555 nm)

| MTFE0 | MTFE3 | MTFE7 | MTFQ0 | MTFQ3 | MTFQ7 |
|---|---|---|---|---|---|
| 0.9 | 0.86 | 0.84 | 0.78 | 0.67 | 0.62 |
| ETP1 | ETP2 | ETP3 | ETP4 | ETP5 | ETP6 |
| 0.306 | 0.456 | 0.350 | 0.297 | 0.226 | 0.438 |
| ETP1/TP1 | ETP2/TP2 | ETP3/TP3 | ETP4/TP4 | ETP5/TP5 | ETP6/TP6 |
| 0.489 | 1.636 | 0.778 | 1.223 | 0.587 | 1.988 |
| ETL | EBL | EIN | EIR | PIR | EIN/ETL |
| 4.361 | 1.015 | 3.346 | 0.115 | 0.229 | 0.767 |
| SETP/EIN | EIR/PIR | SETP | STP | SETP/STP | BL |
| 0.619 | 0.499 | 2.073 | 2.202 | 0.941 | 1.129 |
| ED12 | ED23 | ED34 | ED45 | ED56 | EBL/BL |
| 0.225 | 0.157 | 0.082 | 0.185 | 0.624 | 0.8990 |
| SED | SIN | SED/SIN | ED12/ED23 | ED23/ED34 | ED34/ED45 |
| 1.274 | 1.269 | 1.004 | 1.436 | 1.904 | 0.446 |
| ED12/IN12 | ED23/IN23 | ED34/IN34 | ED45/IN45 | ED56/IN56 | ED45/ED56 |
| 1.844 | 6.276 | 0.703 | 0.435 | 1.076 | 0.296 |
| |f/f1| | |f/f2| | |f/f3| | |f/f4| | |f/f5| | |f/f6| |
| 0.73646 | 0.81478 | 0.62629 | 0.14738 | 0.96051 | 0.94324 |
| ΣPPR/ΣNPR | |ΣNPR| | IN12/f | IN56/f | TP4 + IN45) | |
| 1.84435 | 2.38431 | 0.77354 | 0.03098 | 0.14706 | 0.30949 |
| |f1/f2| | |f2/f3| | (TP1 + IN12)/TP2 | | (TP6 + IN56)/TP5 | |
| 1.10635 | 0.76866 | 2.68117 | | 2.08027 | |
| HOS | InTL | HOS/HOI | InS/HOS | ODT % | TDT % |
| 4.60015 | 3.47068 | 2.00007 | 0.96014 | 1.02130 | 0.16599 |
| HVT51 | HVT52 | HVT61 | HVT62 | HVT62/HOI | HVT62/HOS |
| 0 | 0 | 0.49573 | 0.88852 | 0.38631 | 0.19315 |
| TP2/TP3 | TP3/TP4 | InRS61 | InRS62 | |InRS61|/TP6 | |InRS62|/TP6 |
| 0.62027 | 1.85358 | −0.29898 | −0.24886 | 1.35778 | 1.13016 |
| PSTA | PLTA | NSTA | NLTA | SSTA | SLTA |
| −0.014 mm | −0.007 mm | 0.001 mm | −0.005 mm | −0.002 mm | 0.003 mm |
| VSFS0 | VSFS3 | VSFS7 | VTFS0 | VTFS3 | VTFS7 |
| −0.000 | −0.005 | −0.000 | −0.000 | −0.005 | −0.000 |
| VSMTF0 | VSMTF3 | VSMTF7 | VTMTF0 | VTMTF3 | VTMTF7 |
| 0.780 | 0.776 | 0.629 | 0.780 | 0.722 | 0.619 |
| ISFS0 | ISFS3 | ISFS7 | ITFS0 | ITFS3 | ITFS7 |
| 0.010 | 0.005 | −0.000 | 0.010 | 0.005 | −0.000 |
| ISMTF0 | ISMTF3 | ISMTF7 | ITMTF0 | ITMTF3 | ITMTF7 |
| 0.750 | 0.756 | 0.653 | 0.750 | 0.725 | 0.608 |
| FS | | AIFS | AVFS | | AFS |
| 0.010 | | 0.005 | −0.002 | | 0.007 |
| IN12 | IN23 | IN34 | IN45 | IN56 | TP1 |
| 0.122 mm | 0.025 mm | 0.117 mm | 0.424 mm | 0.580 mm | 0.626 mm |

The following values for the conditional expressions can be obtained from the data in Table 9 and Table 10.

Values Related to Inflection Point of Fifth Embodiment
(Primary Reference Wavelength = 555 nm)

| HIF111 | 0.7859 | HIF111/HOI | 0.3417 | SGI111 | 0.1595 | |SGI111|/(|SGI111| + TP1) | 0.2031 |
|---|---|---|---|---|---|---|---|
| HIF121 | 0.3218 | HIF121/HOI | 0.1399 | SGI121 | 0.0105 | |SGI121|/(|SGI121| + TP1) | 0.0165 |
| HIF211 | 0.4614 | HIF211/HOI | 0.2006 | SGI211 | −0.0074 | |SGI211|/(|SGI211| + TP2) | 0.0257 |
| HIF212 | 1.2280 | HIF212/HOI | 0.5339 | SGI212 | 0.0625 | |SGI212|/(|SGI212| + TP2) | 0.1829 |
| HIF221 | 1.0511 | HIF221/HOI | 0.4570 | SGI221 | 0.1813 | |SGI221|/(|SGI221| + TP2) | 0.3938 |
| HIF311 | 0.7814 | HIF311/HOI | 0.3398 | SGI311 | 0.2029 | |SGI311|/(|SGI311| + TP3) | 0.3108 |
| HIF312 | 0.8749 | HIF312/HOI | 0.3804 | SGI312 | 0.2407 | |SGI312|/(|SGI312| + TP3) | 0.3486 |
| HIF313 | 1.0642 | HIF313/HOI | 0.4627 | SGI313 | 0.3187 | |SGI313|/(|SGI313| + TP3) | 0.4147 |
| HIF321 | 0.7130 | HIF321/HOI | 0.3100 | SGI321 | 0.1445 | |SGI321|/(|SGI321| + TP3) | 0.2432 |
| HIF411 | 0.6513 | HIF411/HOI | 0.2832 | SGI411 | 0.1113 | |SGI411|/(|SGI411| + TP4) | 0.3145 |

-continued

Values Related to Inflection Point of Fifth Embodiment
(Primary Reference Wavelength = 555 nm)

| | | | | | | | |
|---|---|---|---|---|---|---|---|
| HIF412 | 1.1612 | HIF412/HOI | 0.5049 | SGI412 | 0.1854 | \|SGI412\|/(\|SGI412\| + TP4) | 0.4331 |
| HIF511 | 0.3797 | HIF511/HOI | 0.1651 | SGI511 | −0.0042 | \|SGI511\|/(\|SGI511\| + TP5) | 0.0108 |
| HIF512 | 0.9361 | HIF512/HOI | 0.4070 | SGI512 | 0.0071 | \|SGI512\|/(\|SGI512\| + TP5) | 0.0181 |
| HIF521 | 0.6194 | HIF521/HOI | 0.2693 | SGI521 | −0.0910 | \|SGI521\|/(\|SGI521\| + TP5) | 0.1913 |
| HIF522 | 1.1104 | HIF522/HOI | 0.4828 | SGI522 | −0.1457 | \|SGI522\|/(\|SGI522\| + TP5) | 0.2748 |
| HIF611 | 0.2473 | HIF611/HOI | 0.1075 | SGI611 | 0.0157 | \|SGI611\|/(\|SGI611\| + TP6) | 0.0666 |
| HIF612 | 1.2186 | HIF612/HOI | 0.5298 | SGI612 | −0.1561 | \|SGI612\|/(\|SGI612\| + TP6) | 0.4149 |
| HIF621 | 0.3588 | HIF621/HOI | 0.1560 | SGI621 | 0.0550 | \|SGI621\|/(\|SGI621\| + TP6) | 0.1999 |

Sixth Embodiment

Figure 6A:
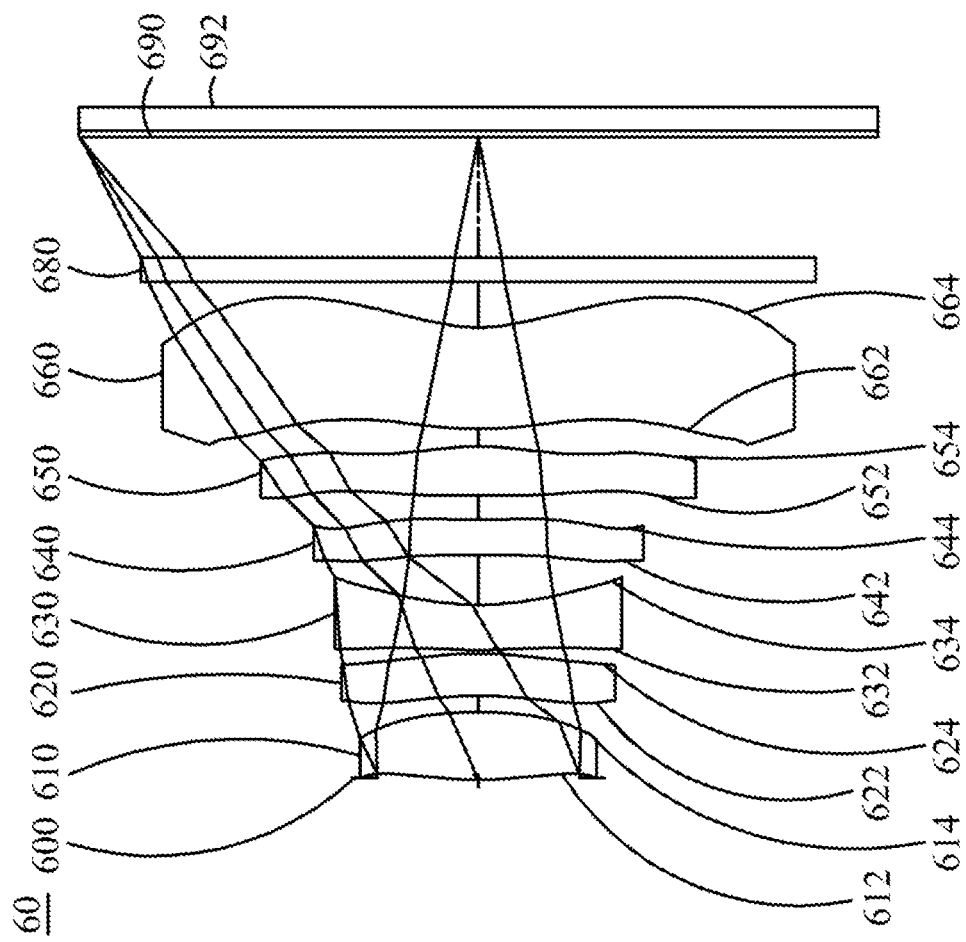
FIG. 6A is a schematic view of the optical image capturing system according to the sixth embodiment of the present invention.
Figure 6B:
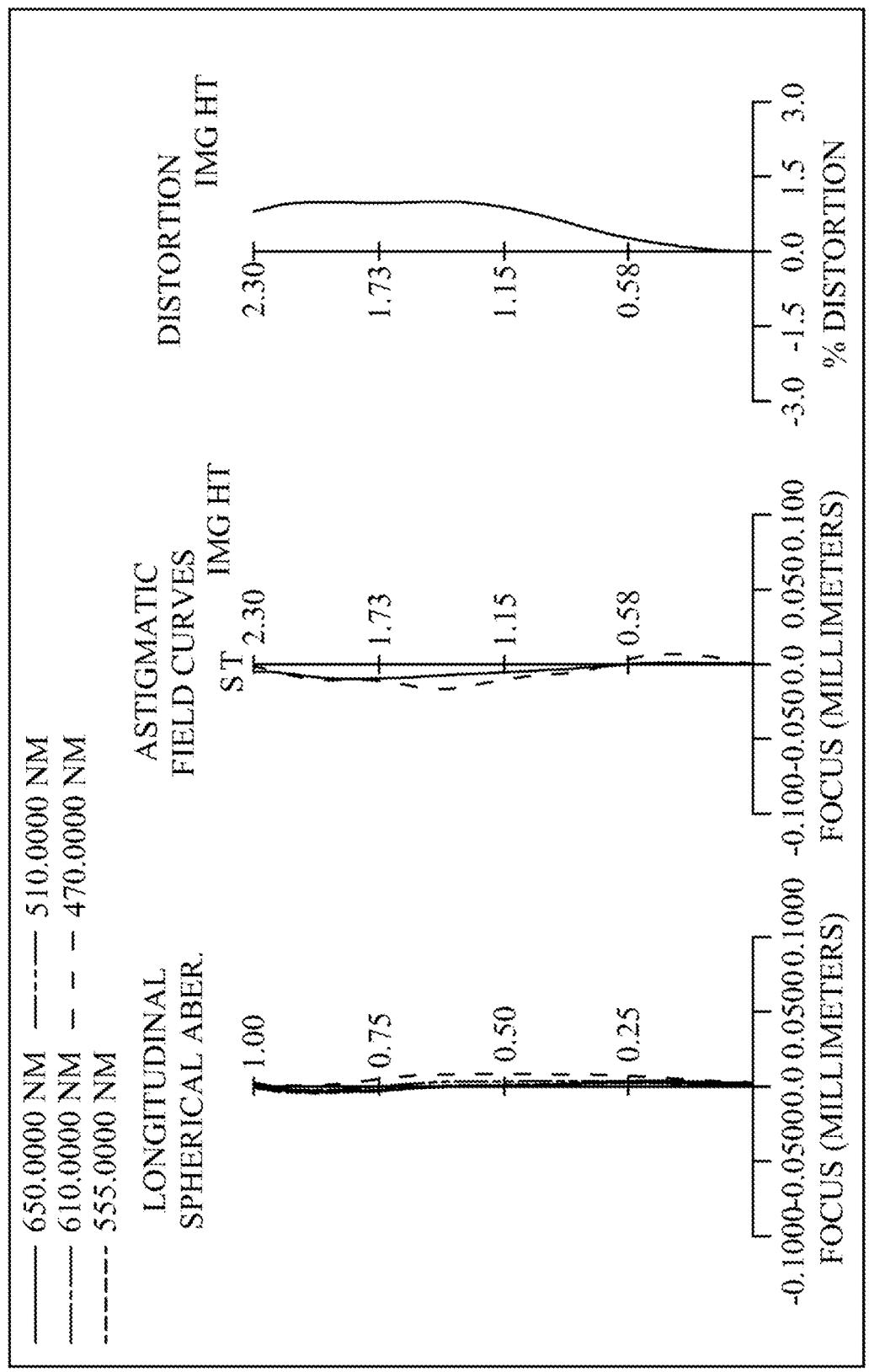
FIG. 6B shows the longitudinal spherical aberration curves, astigmatic field curves, and optical distortion curve of the optical image capturing system in the order from left to right according to the sixth embodiment of the present invention.
Figure 6C:
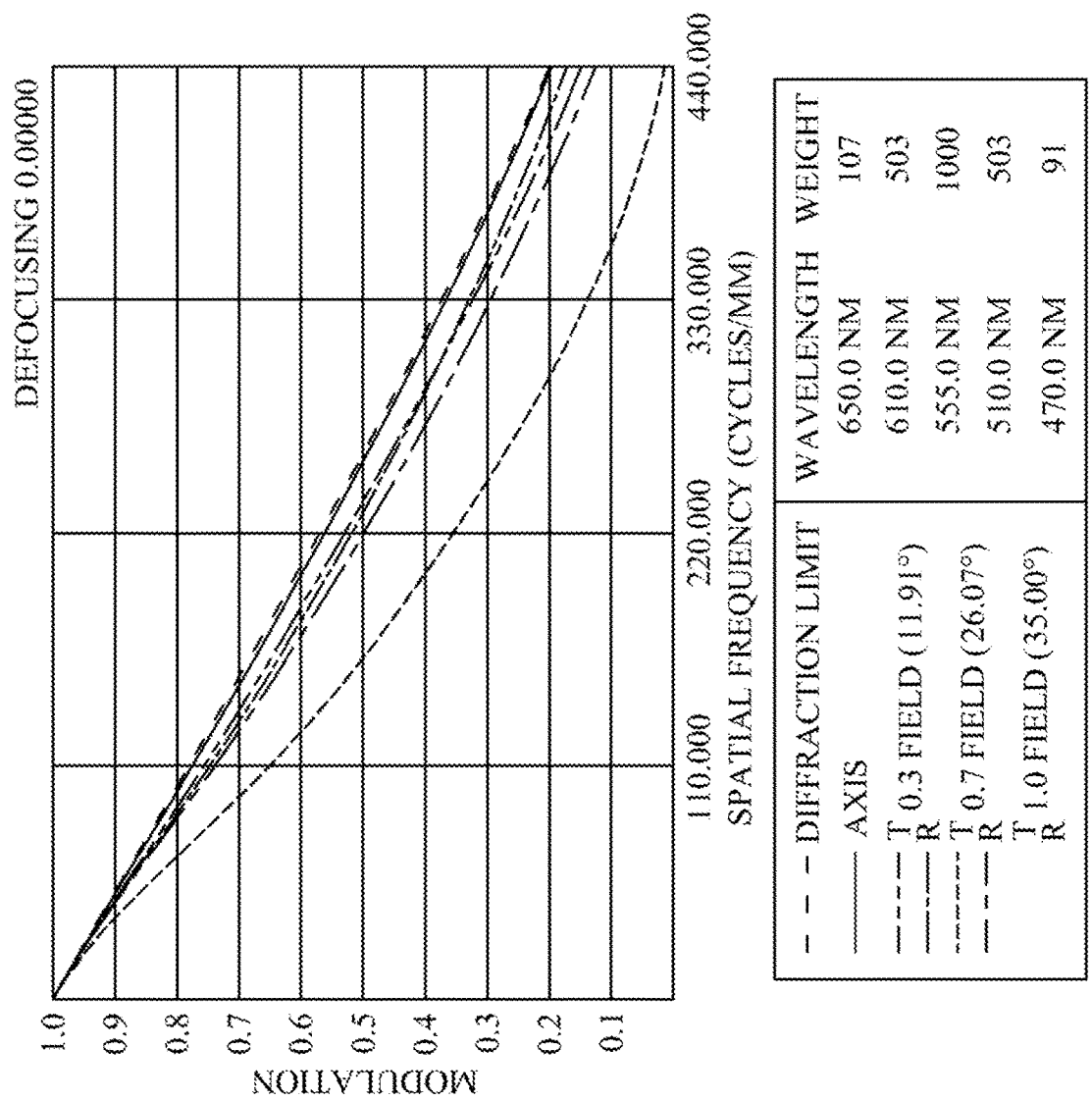
FIG. 6C is a characteristic diagram of modulation transfer of visible light spectrum for the optical image capturing system according to the sixth embodiment of the present invention.
Figure 6D:
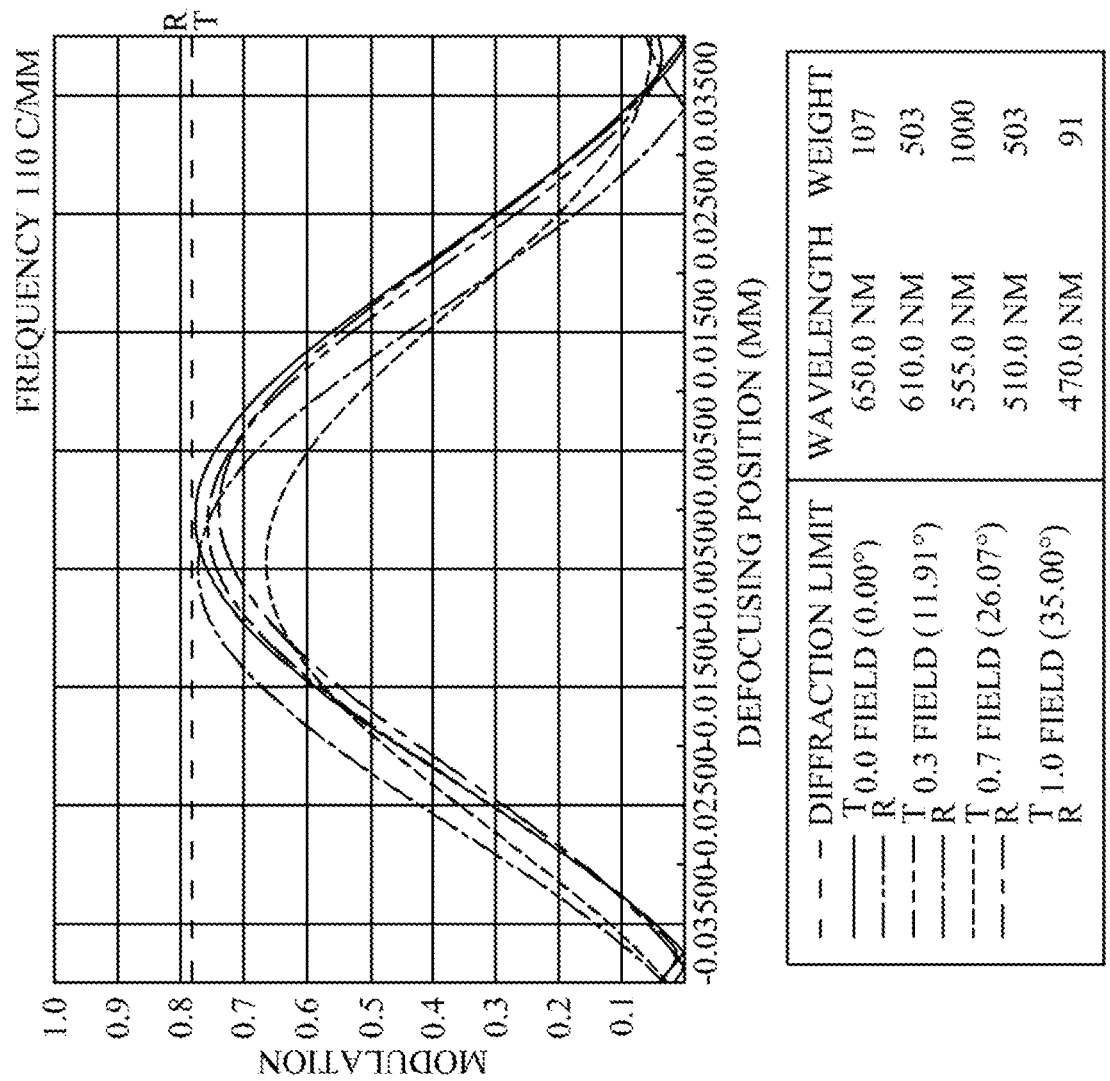
FIG. 6D is a diagram showing the through focus MTF values of the visible light spectrum at the central field of view, 0.3 field of view and 0.7 field of view of the sixth embodiment of the present invention.
Figure 6E:
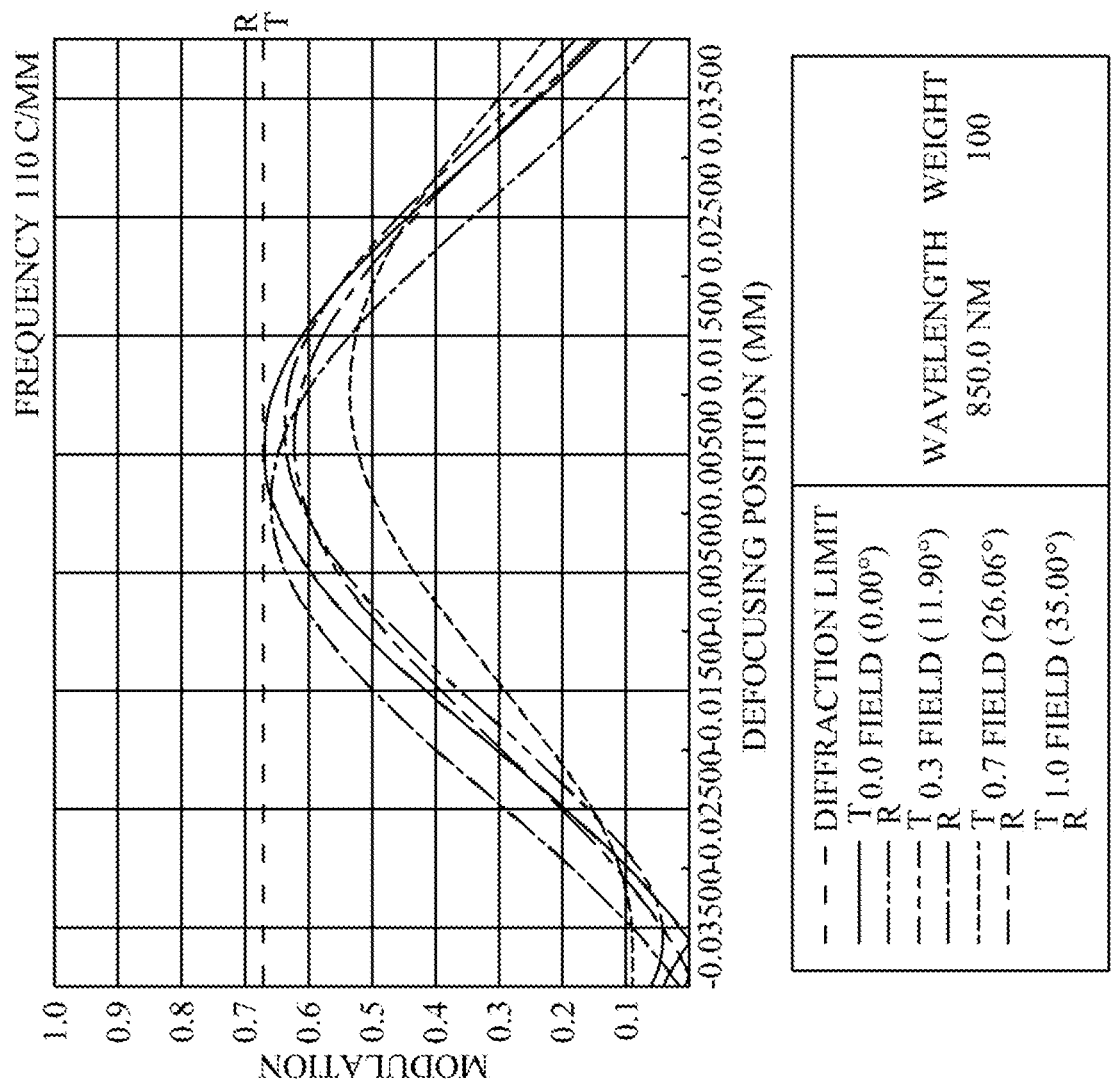
FIG. 6E is a diagram showing the through focus MTF values of the infrared light spectrum at the central field of view, 0.3 field of view, and 0.7 field of view of the sixth embodiment of the present disclosure.

Please refer to FIGS. 6A to 6E. FIG. 6A is a schematic view of the optical image capturing system according to the sixth embodiment of the present invention. FIG. 6B shows the longitudinal spherical aberration curves, astigmatic field curves, and optical distortion curve of the optical image capturing system, in the order from left to right, according to the sixth embodiment of the present invention. FIG. 6C is a characteristic diagram of modulation transfer of visible light spectrum for the optical image capturing system according to the sixth embodiment of the present invention. FIG. 6D is a diagram showing the through focus MTF values of the visible light spectrum at central field of view, 0.3 field of view, and 0.7 field of view of the sixth embodiment of the present invention. FIG. 6E is a diagram showing the through focus MTF values of the infrared light spectrum at central field of view, 0.3 field of view, and 0.7 field of view of the sixth embodiment of the present invention. As shown in FIG. 6A, in the order from an object side to an image side, the optical image capturing system 60 includes an aperture 600, a first lens 610, a second lens 620, a third lens 630, a fourth lens 640, a fifth lens 650, a sixth lens 660, an IR-bandstop filter 680, a first image plane 690, a second image plane and an image sensing device 692.

The first lens 610 has positive refractive power and is made of plastic. The object side 612 of the first lens 610 is a convex surface and the image side 614 of the first lens 610 is a convex surface, and the object side 612 and the image side 614 of the first lens 610 are both aspheric. The object side 612 of the first lens 610 has one inflection point.

The second lens 620 has positive refractive power and is made of plastic. The object side 622 of the second lens 620 is a concave surface and the image side 624 of the second lens 620 is a convex surface, and the object side 622 and the image side 624 of the second lens 620 are both aspheric. The object side 622 of the second lens 620 has one inflection point and the image side 624 of the second lens 620 has two inflection points.

The third lens 630 has negative refractive power and is made of plastic. The object side 632 of the third lens 630 is a convex surface and the image side 634 of the third lens 630 is a concave surface, and the object side 632 and the image side 634 of the third lens 630 are both aspheric. The object side 632 of the third lens 630 has two inflection points.

The fourth lens 640 has negative refractive power and is made of plastic. The object side 642 of the fourth lens 640 is a convex surface and the image side 644 of the fourth lens 640 is a concave surface, and the object side 642 and the image side 644 of the fourth lens 640 are both aspheric. Both of the object side 642 and the image side 644 of the fourth lens 640 have two inflection points.

The fifth lens 650 has positive refractive power and is made of plastic. The object side 652 of the fifth lens 650 is a concave surface and the image side 654 of the fifth lens 650 is a convex surface, and the object side 652 and the image side 654 of the fifth lens 650 are both aspheric. Both of the object side 652 and the image side 654 of the fifth lens 650 have two inflection points.

The sixth lens 660 has negative refractive power and is made of plastic. The object side 662 of the sixth lens 660 is a convex surface and the image side 664 of the sixth lens 660 is a concave surface, and the object side 662 and the image side 664 of the sixth lens 660 are aspheric. The object side 662 of the sixth lens 660 has two inflection points and the image side 664 of the sixth lens 660 has one inflection point. Hereby, this configuration is beneficial to shorten the back focal length of the optical image capturing system so as to keep its miniaturization. Furthermore, the incident angle of the off-axis rays can be reduced effectively, thereby further correcting the off-axis aberration.

The IR-bandstop filter 680 is made of glass and is disposed between the sixth lens 660 and the first image plane 690, without affecting the focal length of the optical image capturing system 60.

Please refer to the following Table 11 and Table 12.

TABLE 11

Lens Parameters for the Sixth Embodiment
f (focal length) = 3.259 mm; f/HEP = 2.8;
HAF (half angle of view) = 34.995 deg

| Surface No | | Curvature Radius | Thickness (mm) | Material |
|---|---|---|---|---|
| 0 | Object | 1E+18 | 1E+18 | |
| 1 | Aperture | 1E+18 | −0.034 | |
| 2 | First Lens | 2.33340894 | 0.420 | Plastic |
| 3 | | −2.442923647 | 0.100 | |
| 4 | Second Lens | −2.551265888 | 0.262 | Plastic |
| 5 | | −2.518044653 | 0.025 | |
| 6 | Third Lens | 4.12751668 | 0.281 | Plastic |
| 7 | | 1.551550186 | 0.310 | |
| 8 | Fourth Lens | −33.26759273 | 0.220 | Plastic |
| 9 | | 4.574652791 | 0.152 | |
| 10 | Fifth Lens | −9.648845416 | 0.303 | Plastic |
| 11 | | −1.547313915 | 0.111 | |
| 12 | Sixth Lens | 1.831977862 | 0.632 | Plastic |
| 13 | | 0.991532392 | 0.284 | |
| 14 | IR-bandstop filter | 1E+18 | 0.150 | BK_7 |
| 15 | | 1E+18 | 0.750 | |

TABLE 11-continued

Lens Parameters for the Sixth Embodiment
f (focal length) = 3.259 mm; f/HEP = 2.8;
HAF (half angle of view) = 34.995 deg

| | | | |
|---|---|---|---|
| 16 | First Image Plane | 1E+18 | 0.000 |

| Surface No | Refractive Index | Coefficient of Dispersion | Focal Length |
|---|---|---|---|
| 0 | | | |
| 1 | | | |
| 2 | 1.544 | 56.064 | 2.256 |
| 3 | | | |
| 4 | 1.544 | 56.064 | 93.503 |
| 5 | | | |
| 6 | 1.661 | 20.381 | −3.899 |
| 7 | | | |
| 8 | 1.661 | 20.381 | −6.017 |
| 9 | | | |
| 10 | 1.584 | 29.878 | 3.094 |
| 11 | | | |
| 12 | 1.544 | 56.064 | −5.392 |
| 13 | | | |
| 14 | 1.517 | 64.13 | |
| 15 | | | |
| 16 | | | |

Reference Wavelength: 555 nm

In the sixth embodiment, the form of the aspheric surface equation is similar to that in the first embodiment. Furthermore, the definitions of parameters in following tables are similar to those in the first embodiment, so the repetitive details will not be given here.

The following values for the conditional expressions can be obtained from the data in Table 11 and Table 12:

Sixth Embodiment (Primary Reference Wavelength = 555 nm)

| MTFE0 | MTFE3 | MTFE7 | MTFQ0 | MTFQ3 | MTFQ7 |
|---|---|---|---|---|---|
| 0.89 | 0.88 | 0.85 | 0.78 | 0.76 | 0.65 |
| ETP1 | ETP2 | ETP3 | ETP4 | ETP5 | ETP6 |
| 0.279 | 0.256 | 0.361 | 0.230 | 0.238 | 0.693 |
| ETP1/TP1 | ETP2/TP2 | ETP3/TP3 | ETP4/TP4 | ETP5/TP5 | ETP6/TP6 |
| 0.665 | 0.975 | 1.286 | 1.043 | 0.785 | 1.096 |
| ETL | EBL | EIN | EIR | PIR | EIN/ETL |
| 3.966 | 1.072 | 2.895 | 0.172 | 0.284 | 0.730 |
| SETP/EIN | EIR/PIR | SETP | STP | SETP/STP | BL |
| 0.710 | 0.604 | 2.057 | 2.118 | 0.971 | 1.184 |
| ED12 | ED23 | ED34 | ED45 | ED56 | EBL/BL |
| 0.162 | 0.089 | 0.187 | 0.190 | 0.210 | 0.9054 |
| SED | SIN | ED12/SED/SIN | ED23/ED23 | ED34 | ED34/ED45 |
| 0.838 | 0.698 | 1.201 | 1.818 | 0.477 | 0.984 |
| ED12/IN12 | ED23/IN23 | ED34/IN34 | ED45/IN45 | ED56/IN56 | ED45/ED56 |

TABLE 12

The Aspheric Coefficients of the Sixth Embodiment
Table 12: Aspheric Coefficients

| | Surface No | | | |
|---|---|---|---|---|
| | 2 | 3 | 4 | 5 |
| k | −2.488173E+00 | −7.390055E+01 | −9.000000E+01 | −8.999799E+01 |
| A4 | −1.962203E−01 | −1.111807E+00 | −9.046433E−01 | −9.714797E−01 |
| A6 | −1.530912E−01 | 4.234868E+00 | 5.756202E+00 | 6.904298E+00 |
| A8 | −1.740203E+00 | −1.701441E+01 | −1.742666E+01 | −2.440798E+01 |
| A10 | 8.174918E+00 | 5.253937E+01 | 3.718911E+01 | 5.354621E+01 |
| A12 | −2.693658E+01 | −1.131683E+02 | −5.617550E+01 | −7.614167E+01 |
| A14 | 4.761614E+01 | 1.416843E+02 | 5.323864E+01 | 6.509418E+01 |
| A16 | −3.549130E+01 | −7.639429E+01 | −2.314811E+01 | −2.519374E+01 |
| A18 | 0.000000E+00 | 0.000000E+00 | 0.000000E+00 | 0.000000E+00 |

| | Surface No | | | |
|---|---|---|---|---|
| | 6 | 7 | 8 | 9 |
| k | −8.244903E+01 | −1.674888E+01 | −9.000000E+01 | −6.765856E+01 |
| A4 | −2.861944E−01 | 4.347277E−01 | −5.316535E−01 | −5.505770E−01 |
| A6 | 9.891824E−01 | −2.262169E+00 | 1.512182E+00 | 8.584775E−02 |
| A8 | −2.132742E+00 | 8.152567E+00 | −3.854223E+00 | 8.010068E−01 |
| A10 | −2.520618E+00 | −1.936325E+01 | 1.124987E+01 | −3.456791E−01 |
| A12 | 1.621849E+01 | 2.766690E+01 | −1.969452E+01 | 4.191651E−01 |
| A14 | −2.109778E+01 | −2.105459E+01 | 1.718829E+01 | −9.856484E−01 |
| A16 | 8.944542E+00 | 6.595217E+00 | −5.997049E+00 | 4.763460E−01 |
| A18 | 0.000000E+00 | 0.000000E+00 | 0.000000E+00 | 0.000000E+00 |

| | Surface No | | | |
|---|---|---|---|---|
| | 10 | 11 | 12 | 13 |
| k | −8.987857E+01 | −1.140641E+01 | −1.677673E+00 | −6.189549E+00 |
| A4 | 8.091406E−01 | 3.851836E−01 | −4.257327E−01 | −1.613246E−01 |
| A6 | −2.672546E+00 | 3.850875E−02 | 2.541568E−01 | 8.426052E−02 |
| A8 | 5.178412E+00 | −8.796014E−01 | 2.985709E−02 | −3.192093E−02 |
| A10 | −6.715373E+00 | 1.031794E+00 | −1.572542E−01 | 3.320292E−03 |
| A12 | 5.289732E+00 | −5.752418E−01 | 9.557755E−02 | 2.435797E−03 |
| A14 | −2.215245E+00 | 1.732503E−01 | −2.234026E−02 | −1.026126E−03 |
| A16 | 3.733982E−01 | −2.371705E−02 | 1.601580E−03 | 1.215181E−04 |
| A18 | 0.000000E+00 | 0.000000E+00 | 0.000000E+00 | 0.000000E+00 |

-continued

Sixth Embodiment (Primary Reference Wavelength = 555 nm)

| 1.622 | 3.568 | 0.603 | 1.251 | 1.889 | 0.903 |
|---|---|---|---|---|---|
| \|f/f1\| | \|f/f2\| | \|f/f3\| | \|f/f4\| | \|f/f5\| | \|f/f6\| |
| 1.44445 | 0.03486 | 0.83599 | 0.54164 | 1.05326 | 0.60448 |
| ΣPPR | ΣNPR | ΣPPR/\|ΣNPR\| | IN12/f | IN56/f | TP4/(IN34 + TP4 + IN45) |
| 3.03935 | 1.47533 | 2.06012 | 0.03068 | 0.03417 | 0.32270 |
| \|f1/f2\| | \|f2/f3\| | (TP1 + IN12)/TP2 | | (TP6 + IN56)/TP5 | |
| 0.02413 | 23.98409 | 1.98073 | | 2.45698 | |
| HOS | InTL | HOS/HOI | InS/HOS | ODT % | TDT % |
| 4.00005 | 2.81621 | 1.73915 | 0.99161 | 1.00108 | 0.19832 |
| HVT51 | HVT52 | HVT61 | HVT62 | HVT62/HOI | HVT62/HOS |
| 0 | 0 | 0.72443 | 1.08141 | 0.47018 | 0.27035 |
| TP2/TP3 | TP3/TP4 | InRS61 | InRS62 | TP6 \|InRS61\| | TP6 \|InRS62\| |
| 0.93324 | 1.27785 | -0.05164 | -0.05003 | 0.08167 | 0.07913 |
| PSTA | PLTA | NSTA | NLTA | SSTA | SLTA |
| 0.0002 mm | -0.003 mm | 0.006 mm | -0.002 mm | 0.0003 mm | 0.0004 mm |
| VSFS0 | VSFS3 | VSFS7 | VTFS0 | VTFS3 | VTFS7 |
| -0.000 | -0.005 | -0.000 | -0.000 | -0.000 | -0.005 |
| VSMTF0 | VSMTF3 | VSMTF7 | VTMTF0 | VTMTF3 | VTMTF7 |
| 0.776 | 0.772 | 0.739 | 0.776 | 0.756 | 0.665 |
| ISFS0 | ISFS3 | ISFS7 | ITFS0 | ITFS3 | ITFS7 |
| 0.005 | -0.000 | 0.005 | 0.005 | 0.005 | 0.010 |
| ISMTF0 | ISMTF3 | ISMTF7 | ITMTF0 | ITMTF3 | ITMTF7 |
| 0.670 | 0.658 | 0.622 | 0.670 | 0.635 | 0.535 |
| | FS | AIFS | AVFS | AFS | |
| | 0.005 | 0.005 | -0.002 | 0.007 | |
| IN12 | IN23 | IN34 | IN45 | IN56 | TP1 |
| 0.100 mm | 0.025 mm | 0.310 mm | 0.152 mm | 0.111 mm | 0.420 mm |

The following values for the conditional expressions can be obtained from the data in Table 11 and Table 12:

Values Related to Inflection Point of sixth Embodiment
(Primary Reference Wavelength = 555 nm)

| HIF111 | 0.3403 | HIF111/HOI | 0.1480 | SGI111 | 0.0216 | \|SGI111\|/(\|SGI111\| + TP1) | 0.0489 |
|---|---|---|---|---|---|---|---|
| HIF211 | 0.3600 | HIF211/HOI | 0.1565 | SGI211 | -0.0255 | \|SGI211\|/(\|SGI211\| + TP2) | 0.0886 |
| HIF221 | 0.3768 | HIF221/HOI | 0.1638 | SGI221 | -0.0279 | \|SGI221\|/(\|SGI221\| + TP2) | 0.0960 |
| HIF222 | 0.7265 | HIF222/HOI | 0.3159 | SGI222 | -0.0652 | \|SGI222\|/(\|SGI222\| + TP2) | 0.1991 |
| HIF311 | 0.2827 | HIF311/HOI | 0.1229 | SGI311 | 0.0075 | \|SGI311\|/(\|SGI311\| + TP3) | 0.0259 |
| HIF312 | 0.6750 | HIF312/HOI | 0.2935 | SGI312 | 0.0081 | \|SGI312\|/(\|SGI312\| + TP3) | 0.0281 |
| HIF411 | 0.5155 | HIF411/HOI | 0.2241 | SGI411 | -0.0229 | \|SGI411\|/(\|SGI411\| + TP4) | 0.0944 |
| HIF412 | 0.8157 | HIF412/HOI | 0.3546 | SGI412 | -0.0350 | \|SGI412\|/(\|SGI412\| + TP4) | 0.1374 |
| HIF421 | 0.1716 | HIF421/HOI | 0.0746 | SGI421 | 0.0027 | \|SGI421\|/(\|SGI421\| + TP4) | 0.0120 |
| HIF422 | 0.6393 | HIF422/HOI | 0.2780 | SGI422 | -0.0318 | \|SGI422\|/(\|SGI422\| + TP4) | 0.1262 |
| HIF511 | 0.1075 | HIF511/HOI | 0.0467 | SGI511 | -0.0005 | \|SGI511\|/(\|SGI511\| + TP5) | 0.0016 |
| HIF512 | 0.5411 | HIF512/HOI | 0.2353 | SGI512 | 0.0146 | \|SGI512\|/(\|SGI512\| + TP5) | 0.0460 |
| HIF521 | 0.2997 | HIF521/HOI | 0.1303 | SGI521 | -0.0236 | \|SGI521\|/(\|SGI521\| + TP5) | 0.0722 |
| HIF522 | 0.7533 | HIF522/HOI | 0.3275 | SGI522 | -0.0438 | \|SGI522\|/(\|SGI522\| + TP5) | 0.1263 |
| HIF611 | 0.3563 | HIF611/HOI | 0.1549 | SGI611 | 0.0281 | \|SGI611\|/(\|SGI611\| + TP6) | 0.0425 |
| HIF612 | 1.2378 | HIF612/HOI | 0.5382 | SGI612 | -0.0162 | \|SGI612\|/(\|SGI612\| + TP6) | 0.0250 |
| HIF621 | 0.4670 | HIF621/HOI | 0.2030 | SGI621 | 0.0823 | \|SGI621\|/(\|SGI621\| + TP6) | 0.1152 |

Although the present invention is disclosed by the aforementioned embodiments, those embodiments do not serve to limit the scope of the present invention. A person skilled in the art could perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
   a first lens with refractive power;
   a second lens with refractive power;
   a third lens with refractive power;
   a fourth lens with refractive power;
   a fifth lens with refractive power;
   a sixth lens with refractive power;
   wherein the first lens to the sixth lens are configured to form a first image plane, which is an image plane specifically for visible light with a wavelength of 555 nm and perpendicular to an optical axis, and a through focus modulation transfer rate (MTF) of central field of view of the first image plane having a maximum value at a first spatial frequency;

wherein the first lens to the sixth lens are configured to form a second image plane, which is an image plane specifically for infrared light with a wave length of 850 nm and perpendicular to the optical axis, and a through focus modulation transfer rate (MTF) of central field of view of the second image plane having a maximum value at the first spatial frequency;

wherein the optical image capturing system has six lenses with refractive power, and the optical image capturing system has a maximum image height HOI on the first image plane, at least one lens among the first lens to the sixth lens has positive refractive power, focal lengths of the six lenses are respectively expressed as f1, f2, f3, f4, f5 and f6, a focal length of the optical image capturing system is expressed as f, an entrance pupil diameter of the optical image capturing system is expressed as HEP, a distance on the optical axis from an object side of the first lens to the first image plane is expressed as HOS, a distance on the optical axis from the object side of the first lens to an image side of the sixth lens is expressed as InTL, a half maximum angle of view of the optical image capturing system is expressed as HAF, a distance on the optical axis between the first image plane and the second image plane is expressed as FS, thicknesses of the first lens to the sixth lens at height of ½ HEP parallel to the optical axis are respectively expressed as ETP1, ETP2, ETP3, ETP4, ETP5 and ETP6, a sum of ETP1 to ETP6 described above is expressed as SETP, thicknesses of the first lens to the sixth lens on the optical axis are respectively expressed as TP1, TP2, TP3, TP4, TP5 and TP6, a sum of TP1 to TP6 described above is expressed as STP, and the following conditions are satisfied: 1.0≤f/HEP≤10.0; 0 deg<HAF≤35 deg; 0.2≤SETP/STP<1 and |FS|≤15 μm;

wherein a sequence of refraction powers from the first lens to the sixth lens is +−+−+−, ++−−+−, +−++−− or +−+++−;

wherein a distance on the optical axis between the second lens and the third lens is expressed as IN23, a distance on the optical axis between the third lens and the fourth lens is expressed as IN34, a distance on the optical axis between the fourth lens and the fifth lens is expressed as IN45, and the following conditions are satisfied: IN45>IN23 and IN45>IN34.

2. The optical image capturing system of claim 1, wherein a wavelength of the infrared light is from 700 nm to 1300 nm, and the first spatial frequency is expressed as SP1, and the following condition is satisfied: SP1≤440 cycles/mm.

3. The optical image capturing system of claim 1, wherein a distance on the optical axis between the second lens and the third lens is expressed as IN23, a distance on the optical axis between the third lens and the fourth lens is expressed as IN34, a distance on the optical axis between the fourth lens and the sixth lens is expressed as IN56, the following conditions are satisfied: IN56>IN23 and IN56>IN34.

4. The optical image capturing system of claim 1, wherein the following condition is satisfied: HOS/f≤1.5.

5. The optical image capturing system of claim 1, wherein a horizontal distance parallel to the optical axis from a first coordinate point on the object side of the first lens at height of ½ HEP to the first image plane is expressed as ETL, a horizontal distance parallel to the optical axis from the first coordinate point on the object side of the first lens at height of ½ HEP to a second coordinate point on the image side of the sixth lens at height of ½ HEP is expressed as EIN, and the following condition is satisfied: 0.2≤EIN/ETL<1.

6. The optical image capturing system of claim 1, wherein thicknesses of the first lens to the sixth lens at height of ½ HEP parallel to the optical axis are respectively expressed as ETP1, ETP2, ETP3, ETP4, ETP5 and ETP6, a sum of ETP1 to ETP5 described above is expressed as SETP, and the following condition is satisfied: 0.2≤SETP/EIN<1.

7. The optical image capturing system of claim 1, wherein a horizontal distance parallel to the optical axis from a second coordinate point on the image side of the sixth lens at height of ½ HEP to the first image plane is expressed as EBL, a horizontal distance parallel to the optical axis from an intersection point where the image side of the sixth lens crosses the optical axis to the first image plane is expressed as BL, and the following condition is satisfied: 0.1≤EBL/BL≤1.1.

8. The optical image capturing system of claim 1, further comprising an aperture, wherein a distance on the optical axis from the aperture to the first image plane is expressed as InS, and the following condition is satisfied: 0.2≤InS/HOS≤1.1.

9. An optical image capturing system, from an object side to an image side, comprising:
a first lens with refractive power;
a second lens with refractive power;
a third lens with refractive power;
a fourth lens with refractive power; with a concave surface of image side thereof on the optical axis;
a fifth lens with refractive power;
a sixth lens with refractive power;
wherein the first lens to the sixth lens are configured to form a first image plane, which is an image plane specifically for visible light with a wavelength of 555 nm and perpendicular to an optical axis, and a through focus modulation transfer rate (MTF) of central field of view of the first image plane having a maximum value at a first spatial frequency with a value of 110 cycles/mm;
wherein the first lens to the sixth lens are configured to form a second image plane, which is an image plane specifically for infrared light with a wavelength of 850 nm and perpendicular to the optical axis, and the through focus modulation transfer rate (MTF) of central field of view of the second image plane having a maximum value at the first spatial frequency with a value of 110 cycles/mm;
wherein the optical image capturing system has six lenses with refractive power, the optical image capturing system has a maximum image height HOI on the first image plane, at least one lens among the first lens to the sixth lens has positive refractive power, focal lengths of the six lenses are respectively expressed as f1, f2, f3, f4, f5 and f6, and a focal length of the optical image capturing system is expressed as f, an entrance pupil diameter of the optical image capturing system is expressed as HEP, a distance on the optical axis from an object side of the first lens to the first image plane is expressed as HOS, a distance on the optical axis from the object side of the first lens to an image side of the sixth lens is expressed as InTL, a half maximum angle of view of the optical image capturing system is expressed as HAF, a distance on the optical axis between the first image plane and the second image plane is expressed as FS, a horizontal distance parallel to the optical axis from a first coordinate point on the object side of the first lens at height of ½ HEP to the first image plane is expressed as ETL, a horizontal distance parallel to the optical axis from the first coordinate point on the object side of the first lens at height of ½ HEP to a second coordinate point on the image side of the sixth lens at height of ½ HEP is expressed as EIN and the following conditions are satisfied: 1≤f/HEP≤10; 0 deg<HAF≤35 deg; 0.2≤EIN/ETL<1 and |FS|≤15 μm;

wherein a sequence of refraction powers from the first lens to the sixth lens is +−+−+−, ++−−+−, +−++−− or +−+++−;

wherein thicknesses of the first lens through the sixth lens on the optical axis are respectively expressed as TP1, TP2, TP3, TP4, TP5, and TP6, and the following condition is satisfied: TP1 is more than any one of TP2, TP3, TP4, TP5 and TP6.

10. The optical image capturing system of claim 9, wherein modulation transfer rates (MTF value) of visible light at spatial frequency of 110 cycles/mm at positions of the optical axis, 0.3 HOI and 0.7 HOI on the first image plane are respectively expressed as MTFQ0, MTFQ3 and MTFQ7, and the following conditions are satisfied: MTFQ0≥0.2; MTFQ3≥0.01 and MTFQ7≥0.01.

11. The optical image capturing system of claim 9, wherein an image side of the second lens on the optical axis is a concave surface.

12. The optical image capturing system of claim 9, wherein at least one lens among the first lens to the sixth lens is made of plastic.

13. The optical image capturing system of claim 9, wherein the following condition is satisfied: HOS/HOI≤3.92.

14. The optical image capturing system of claim 9, wherein at least one lens among the first lens, the second lens, the third lens, the fourth lens, the fifth lens and the sixth lens is a light filter element filtering light which is less than 500 nm.

15. The optical image capturing system of claim 9, wherein the following condition is satisfied: InTL/HOS≤0.87.

16. The optical image capturing system of claim 9, wherein at least one lens among the first lens, the second lens, the third lens, the fourth lens, the fifth lens and the sixth lens is a light filter element filtering light which is less than 500 nm.

17. The optical image capturing system of claim 9, wherein at least one surface of at least three lenses among the first lens through the sixth lens has respectively at least one inflection point.

18. An optical image capturing system, from an object side to an image side, comprising:
  a first lens with refractive power;
  a second lens with refractive power;
  a third lens with refractive power;
  a fourth lens with refractive power;
  a fifth lens with refractive power;
  a sixth lens with refractive power;
  wherein the first lens to the sixth lens are configured to form a first average image plane, which is an image plane specifically for visible light with a wavelength of 555 nm and perpendicular to an optical axis, and the first average image plane is disposed at the average position of the defocusing positions, where through focus modulation transfer rates (values of MTF) of visible light at central field of view, 0.3 field of view, and 0.7 field of view of the optical image capturing system are respectively at corresponding maximum value at a first spatial frequency, the first spatial frequency being 110 cycles/mm;

wherein the first lens to the sixth lens are configured to form a second average image plane, which is an image plane specifically for infrared light with a wavelength of 850 nm and perpendicular to the optical axis, and the second average image plane is disposed at the average position of the defocusing positions, where through focus modulation transfer rates (values of MTF) of infrared light at central field of view, 0.3 field of view, and 0.7 field of view of the optical image capturing system are respectively at corresponding respective maximum at a first spatial frequency, the first spatial frequency being 110 cycles/mm;

wherein the optical image capturing system has six lenses with refractive power, the optical image capturing system has a maximum image height HOI on the first average image plane, focal lengths of the six lenses are respectively expressed as f1, f2, f3, f4, f5 and f6, a focal length of the optical image capturing system is expressed as f, an entrance pupil diameter of the optical image capturing system is expressed as HEP, a half maximum angle of view of the optical image capturing system is expressed as HAF, a distance on the optical axis from an object side of the first lens to the first average image plane is expressed as HOS, a distance on the optical axis from the object side of the first lens to an image side of the sixth lens is expressed as InTL, a distance on the optical axis between the second lens and the third lens is expressed as IN23, a distance on the optical axis between the third lens and the fourth lens is expressed as IN34, a distance on the optical axis between the fourth lens and the sixth lens is expressed as IN56, a distance on the optical axis between the first average image plane and the second average image plane is expressed as AFS, thicknesses of the first lens to the sixth lens at height of ½ HEP parallel to the optical axis are respectively expressed as ETP1, ETP2, ETP3, ETP4, ETP5 and ETP6, a sum of ETP1 to ETP6 described above is expressed as SETP, thicknesses of the first lens to the sixth lens on the optical axis are respectively expressed as TP1, TP2, TP3, TP4, TP5 and TP6, a sum of TP1 to TP6 described above is expressed as STP, and the following conditions are satisfied: 1.0≤f/HEP≤10.0; 0 deg<HAF≤35 deg; 0.2≤SETP/STP<1; |AFS|≤15 μm; IN56>IN23 and IN56>IN34;

wherein a sequence of refraction powers from the first lens to the sixth lens is +−+−+−, ++−−+−, +−++−− or +−+++−;

wherein a distance on the optical axis between the second lens and the third lens is expressed as IN23, a distance on the optical axis between the third lens and the fourth lens is expressed as IN34, a distance on the optical axis between the fourth lens and the fifth lens is expressed as IN45, the following conditions are satisfied: IN45>IN23 and IN45>IN34.

19. The optical image capturing system of claim 18, wherein the following condition is satisfied: HOS/f≤1.5.

20. The optical image capturing system of claim 18, wherein an image side of the fourth lens on the optical axis is a concave surface and an image side of the second lens on the optical axis is a concave surface.

21. The optical image capturing system of claim 18, wherein the following condition is satisfied: HOS/HOI≤4.

22. The optical image capturing system of claim 18, further comprising an aperture and an image sensing device, wherein the image sensing device is disposed on the first average image plane and is disposed with at least 100 thousand pixels, a distance on the optical axis from the aperture to the first average image plane is expressed as InS, and the following conditions are satisfied: $0.2 \leq InS/HOS \leq 1.1$ and $InTL/HOS \leq 0.87$.

\* \* \* \* \*